US008861344B2

(12) United States Patent
Trinh et al.

(10) Patent No.: US 8,861,344 B2
(45) Date of Patent: *Oct. 14, 2014

(54) NETWORK PROCESSOR ARCHITECTURE

(75) Inventors: Man D. Trinh, San Jose, CA (US);
Ryzsard Bleszynski, Saratoaga, CA (US); Barry T. Lee, Union City, CA (US); Steve C. Chen, Cupertino, CA (US); Eric K. Yang, Los Altos, CA (US); Simon S. Chong, Fremont, CA (US); Tony J. Chiang, Fremont, CA (US); Jun-Wen Tsong, San Jose, CA (US); Goichiro Ono, San Jose, CA (US); Charles F. Gershman, Pleasanton, CA (US)

(73) Assignee: Bay Microsystems, Inc., San Jose, CA (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/819,587

(22) Filed: Jun. 21, 2010

(65) Prior Publication Data

US 2010/0254387 A1     Oct. 7, 2010

Related U.S. Application Data

(63) Continuation of application No. 11/957,885, filed on Dec. 17, 2007, now Pat. No. 7,742,405, which is a
(Continued)

(51) Int. Cl.
| | |
|---|---|
| *H04L 12/56* | (2006.01) |
| *H04L 12/54* | (2013.01) |
| *G06F 15/00* | (2006.01) |
| *G06F 17/00* | (2006.01) |
| *G06F 9/38* | (2006.01) |
| *H04L 12/815* | (2013.01) |
| *H04L 12/801* | (2013.01) |
| *H04L 12/863* | (2013.01) |
| *H04L 12/28* | (2006.01) |

(52) U.S. Cl.
CPC ........... *H04L 47/22* (2013.01); *H04L 12/56* (2013.01); *G06F 15/00* (2013.01); *H04L 12/5693* (2013.01); *G06F 17/00* (2013.01); *G06F 9/3885* (2013.01); *H04L 47/10* (2013.01); *H04L 47/623* (2013.01); *H04L 12/28* (2013.01)
USPC .................................................... 370/229

(58) Field of Classification Search
CPC ... H04L 47/623; H04L 47/22; H04L 12/5693; H04L 47/10
USPC ............................... 370/229, 230, 230.1, 231
See application file for complete search history.

(56) References Cited

U.S. PATENT DOCUMENTS 5,313,454 A  5/1994  Bustini et al.
5,475,682 A  12/1995  Choudhury et al.
(Continued)

OTHER PUBLICATIONS

International Search Report mailed on Oct. 6, 2003, for PCT patent application No. PCT/US03/11617 filed on Apr. 14, 2003, 8 pages.

*Primary Examiner* — Chi Pham
*Assistant Examiner* — Robert Lopata

(57) ABSTRACT

A network processor for processing information elements is described. Each information element is associated with a flow and comprises at least one information element segment. A policy controller stores an information element into at least one information segment storage unit within a memory, and determines whether an information element segment conforms to a predetermined quality of service ("QoS"). A traffic processor selects the information element segment for forwarding based on at least one QoS parameter. A forwarding processor forwards the selected information element segment to an egress port.

52 Claims, 38 Drawing Sheets

Related U.S. Application Data continuation of application No. 10/413,776, filed on Apr. 14, 2003, now Pat. No. 7,310,348, application No. 12/819,587, which is a continuation-in-part of application No. 10/251,946, filed on Sep. 19, 2002, now Pat. No. 6,996,117.

(60) Provisional application No. 60/382,437, filed on May 20, 2002, provisional application No. 60/372,507, filed on Apr. 14, 2002, provisional application No. 60/323,627, filed on Sep. 19, 2001, provisional application No. 60/382,217, filed on May 20, 2002, provisional application No. 60/372,656, filed on Apr. 14, 2002.

(56) References Cited

U.S. PATENT DOCUMENTS

| | | | | |
|---|---|---|---|---|
| 5,796,719 | A * | 8/1998 | Peris et al. | 370/231 |
| 6,052,375 | A * | 4/2000 | Bass et al. | 370/412 |
| 6,198,723 | B1 * | 3/2001 | Parruck et al. | 370/230.1 |
| 6,259,699 | B1 | 7/2001 | Opalka et al. | |
| 6,434,155 | B1 * | 8/2002 | Jones et al. | 370/398 |
| 6,477,166 | B1 | 11/2002 | Sanzi et al. | |
| 6,512,741 | B1 * | 1/2003 | Kohzuki et al. | 370/230.1 |
| 6,532,213 | B1 * | 3/2003 | Chiussi et al. | 370/230.1 |
| 6,553,000 | B1 | 4/2003 | Ganesh et al. | |
| 6,570,875 | B1 | 5/2003 | Hegde | |
| 6,674,718 | B1 | 1/2004 | Heddes et al. | |
| 6,731,603 | B1 * | 5/2004 | Motobayashi | 370/232 |
| 6,771,596 | B1 | 8/2004 | Angle et al. | |
| 6,904,014 | B1 * | 6/2005 | Gai et al. | 370/230.1 |
| 6,920,109 | B2 * | 7/2005 | Yazaki et al. | 370/230.1 |
| 6,950,400 | B1 * | 9/2005 | Tran et al. | 370/236 |
| 7,006,438 | B2 | 2/2006 | West et al. | |
| 7,230,948 | B2 * | 6/2007 | Agnevik et al. | 370/395.6 |
| 7,324,521 | B2 * | 1/2008 | Kohzuki et al. | 370/395.4 |
| 7,330,430 | B2 * | 2/2008 | Lodha | 370/230.1 |
| 7,489,701 | B2 * | 2/2009 | Lodha | 370/412 |
| 7,523,188 | B2 * | 4/2009 | Teraslinna | 709/223 |
| 7,697,430 | B2 * | 4/2010 | Gracon et al. | 370/232 |
| 7,782,776 | B2 * | 8/2010 | Shankar et al. | 370/234 |
| 2002/0034162 | A1 | 3/2002 | Brinkerhoff et al. | |
| 2002/0107908 | A1 | 8/2002 | Dharanikota | |
| 2002/0110134 | A1 | 8/2002 | Gracon et al. | |
| 2002/0141351 | A1 | 10/2002 | Maltz et al. | |
| 2002/0174227 | A1 | 11/2002 | Hartsell et al. | |
| 2002/0188732 | A1 | 12/2002 | Buckman et al. | |
| 2003/0002506 | A1 | 1/2003 | Moriwaki et al. | |
| 2003/0012147 | A1 | 1/2003 | Buckman et al. | |
| 2003/0035371 | A1 | 2/2003 | Reed et al. | |
| 2004/0202176 | A1 * | 10/2004 | Kojima | 370/395.1 |
| 2005/0018601 | A1 * | 1/2005 | Kalkunte et al. | 370/229 |

* cited by examiner

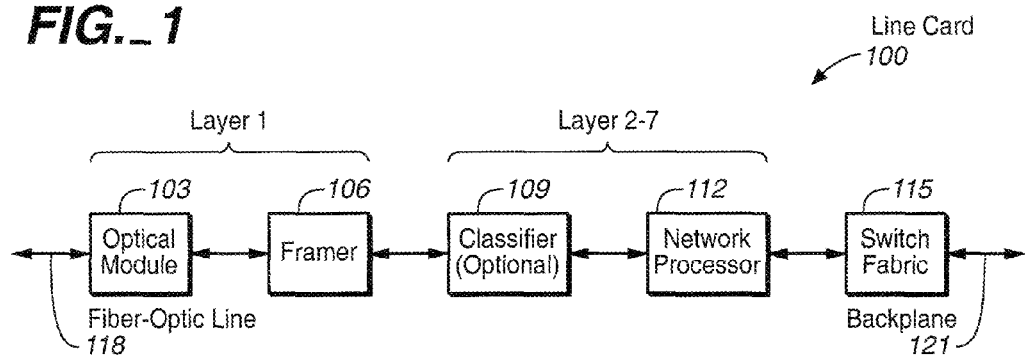
FIG._1
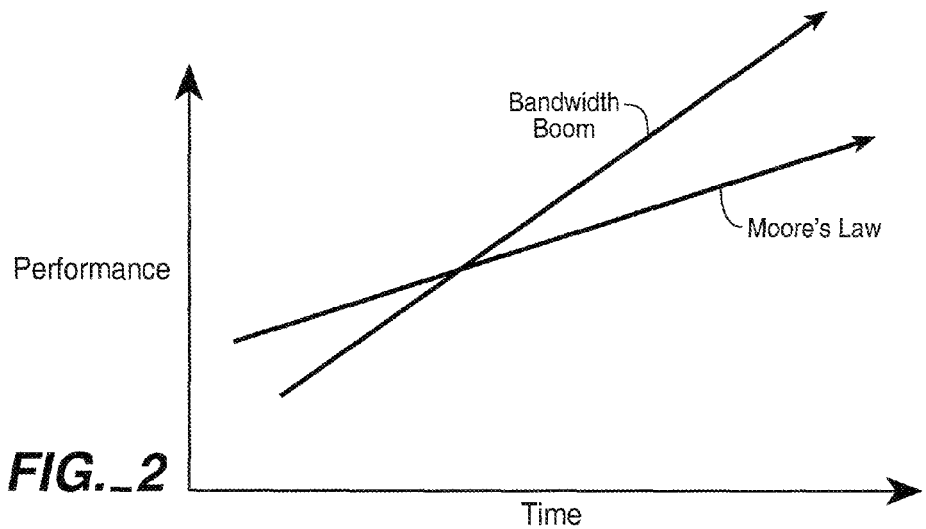
FIG._2
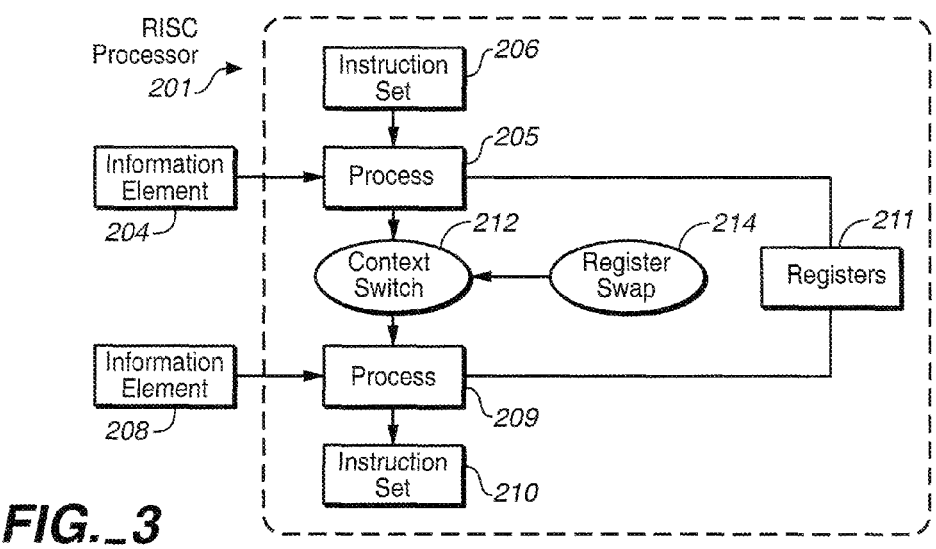
FIG._3

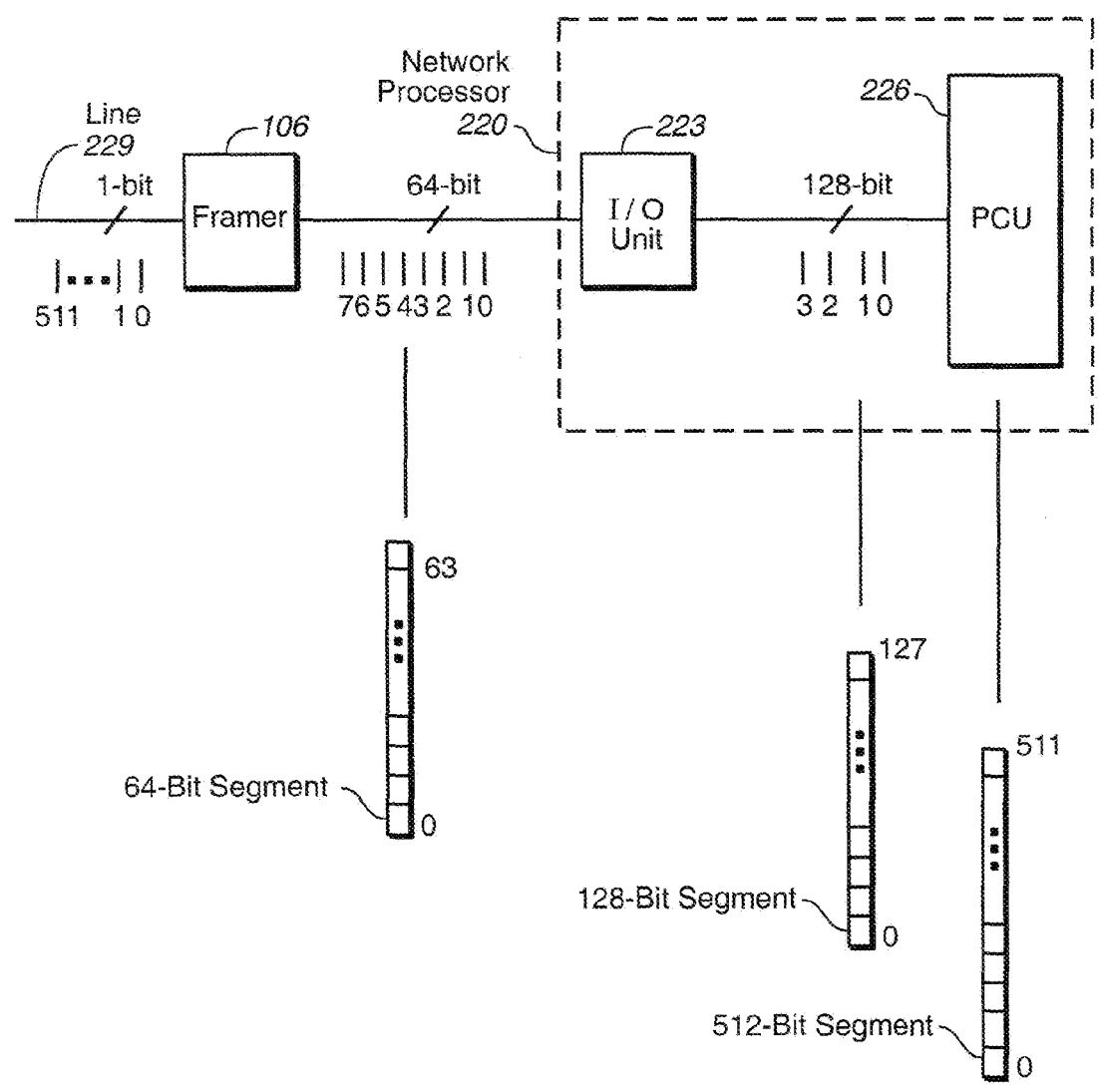
FIG._4

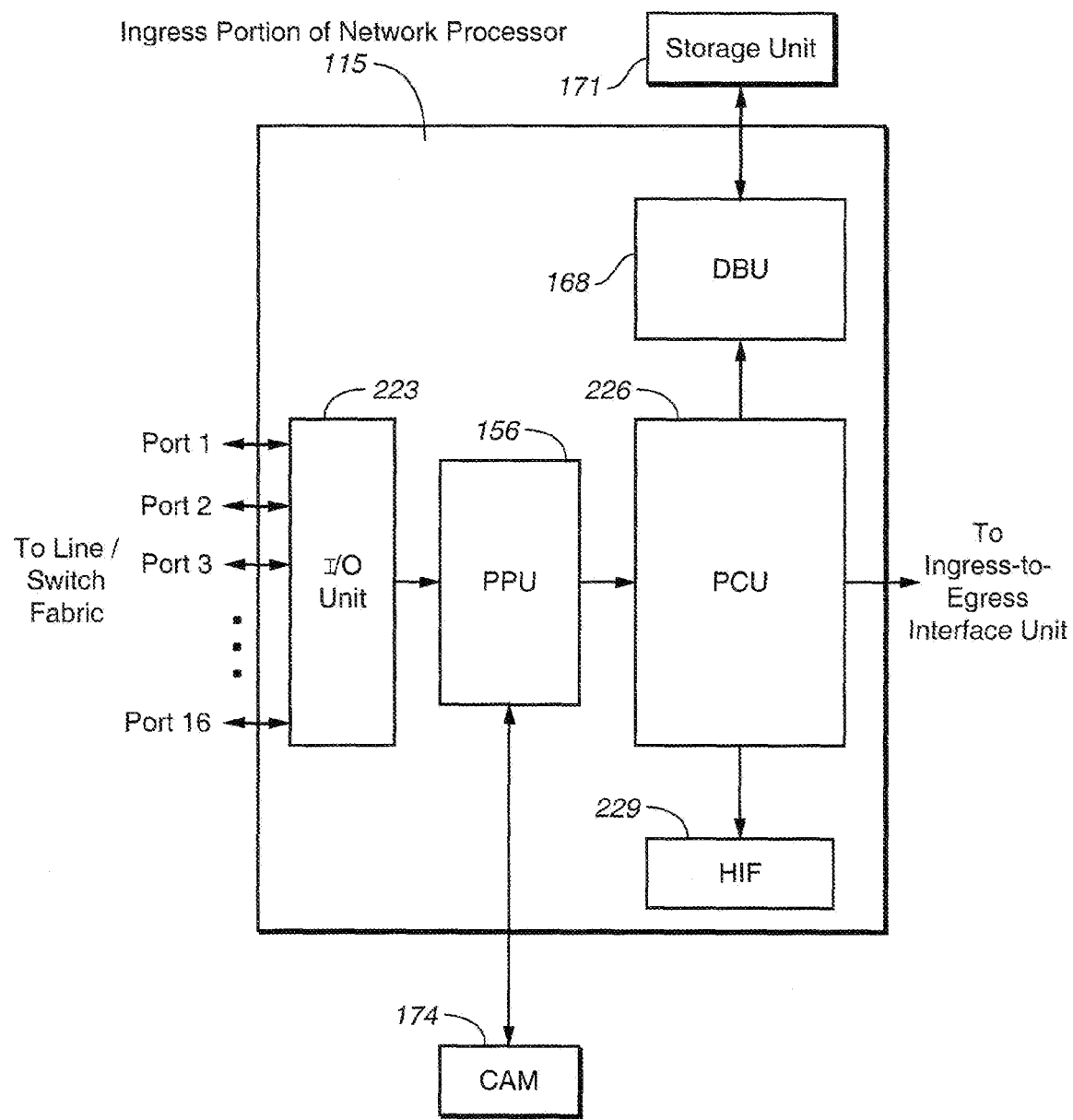
FIG._5

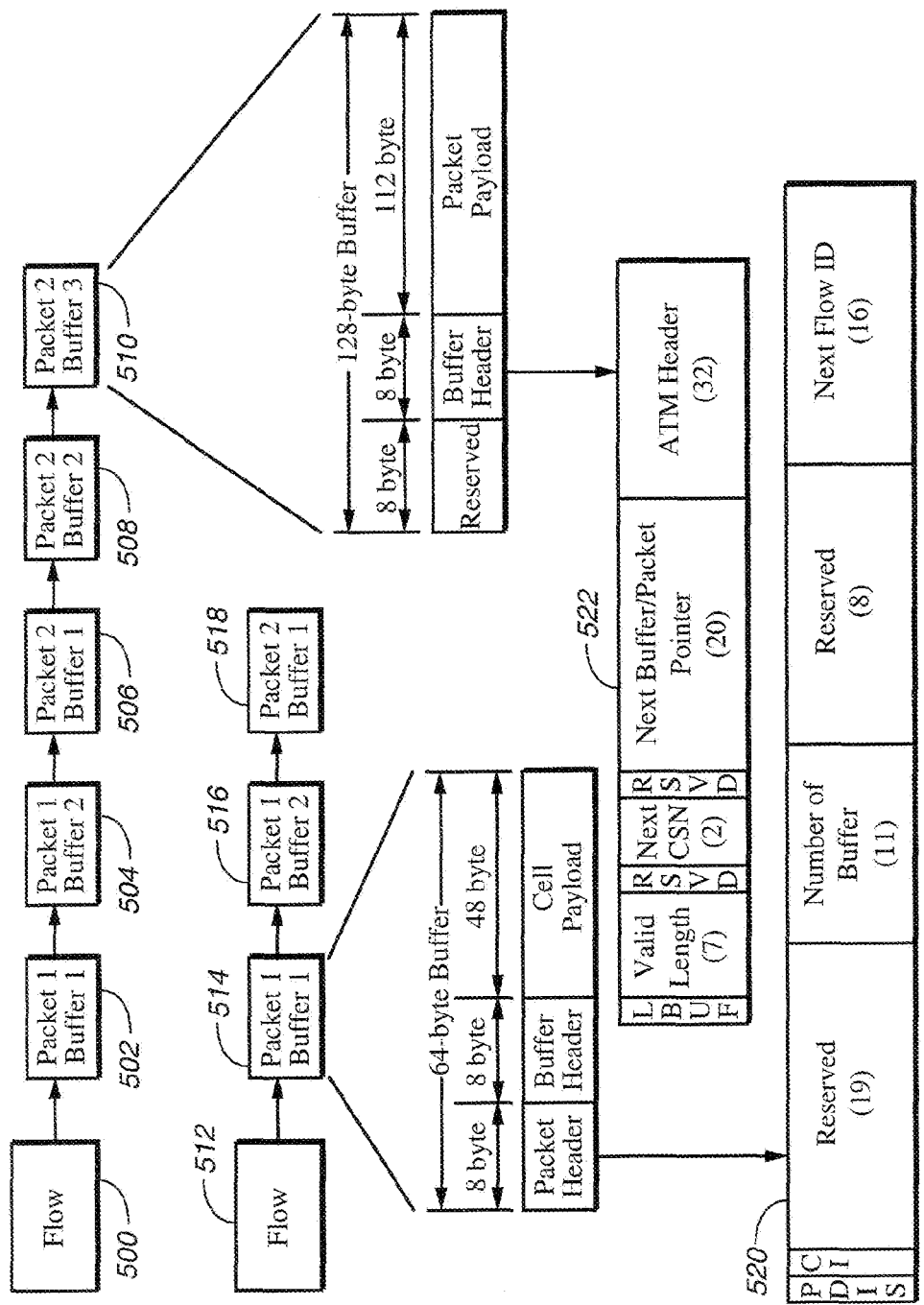
FIG._6

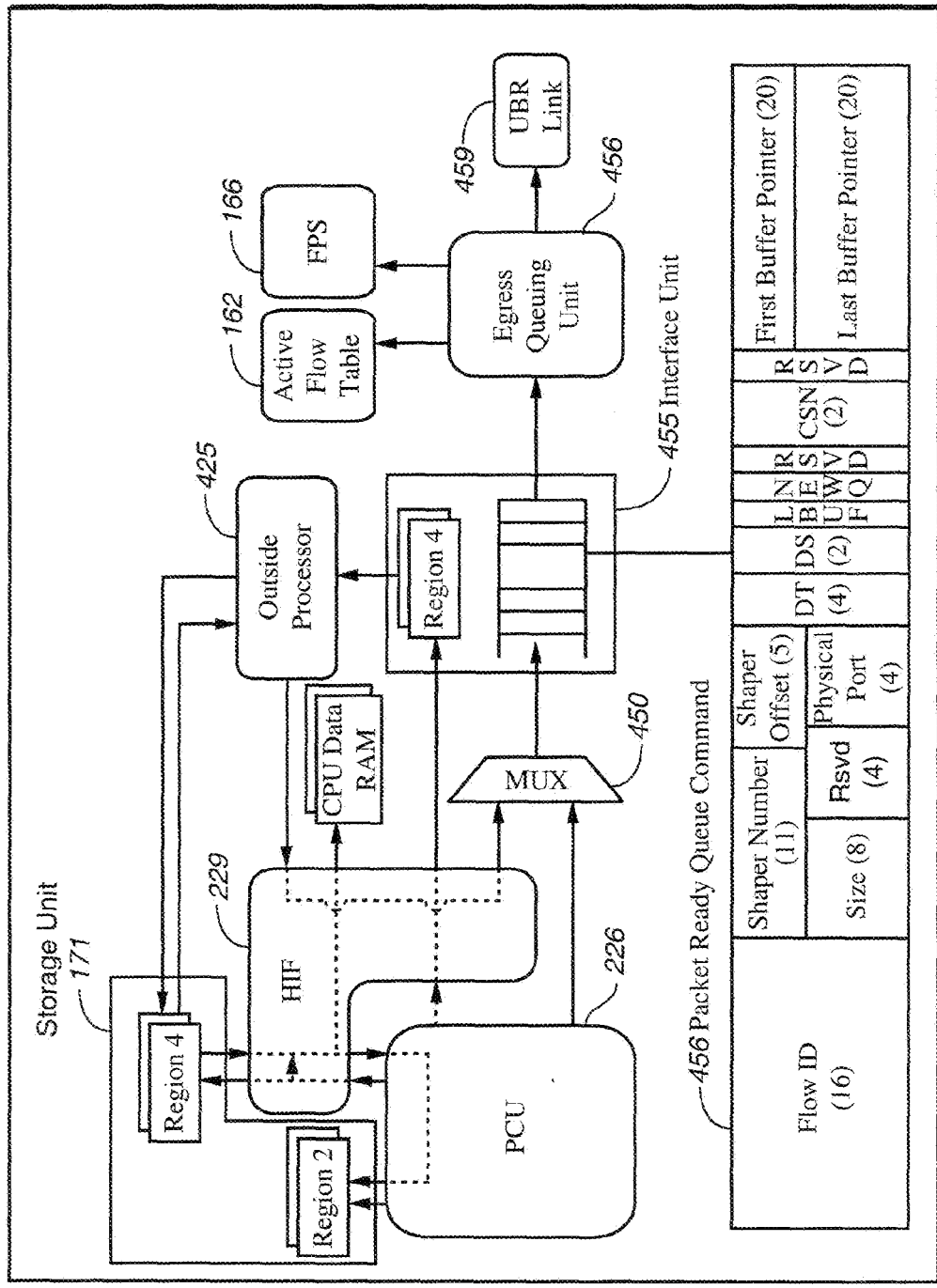
FIG._7

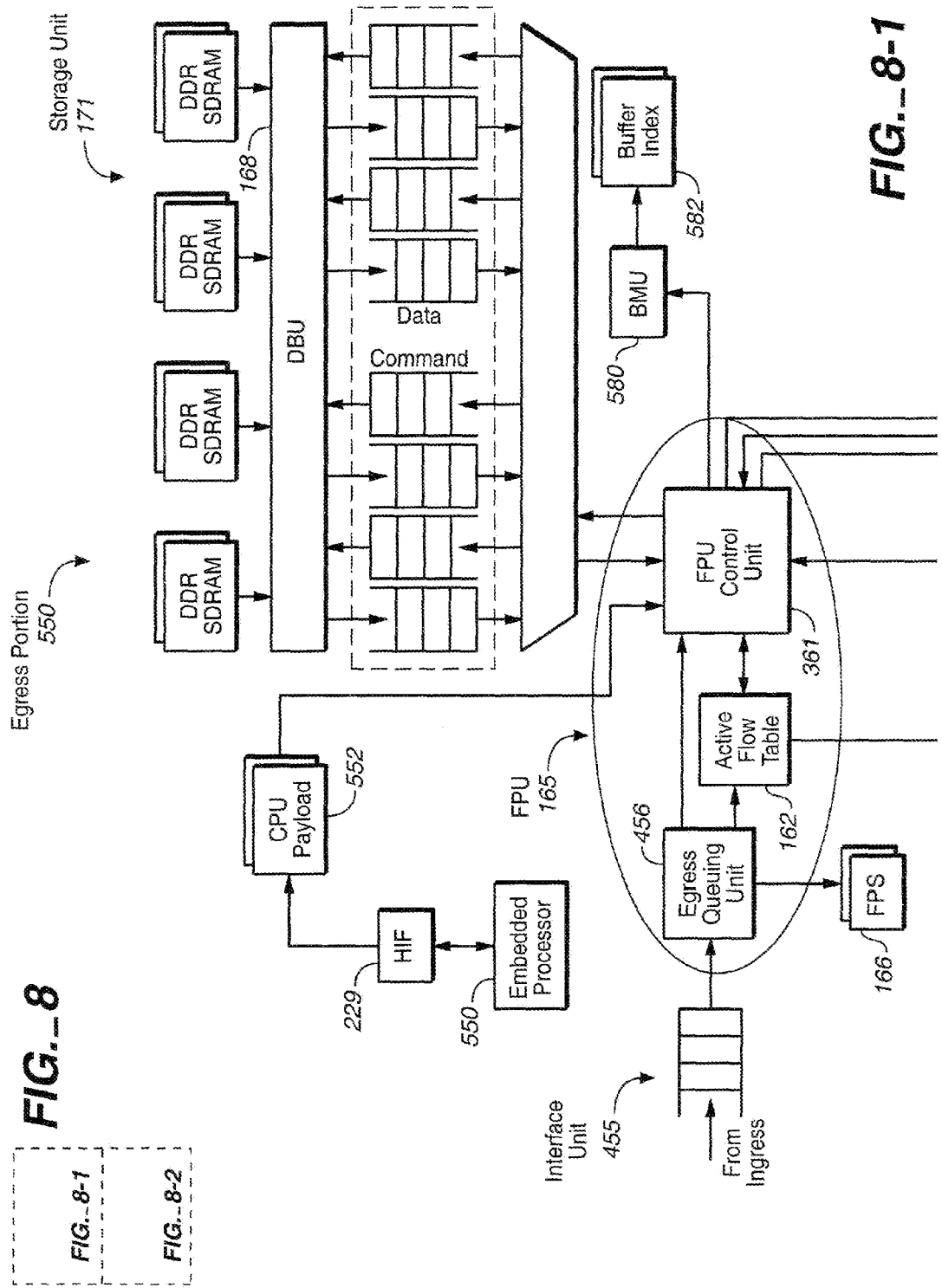

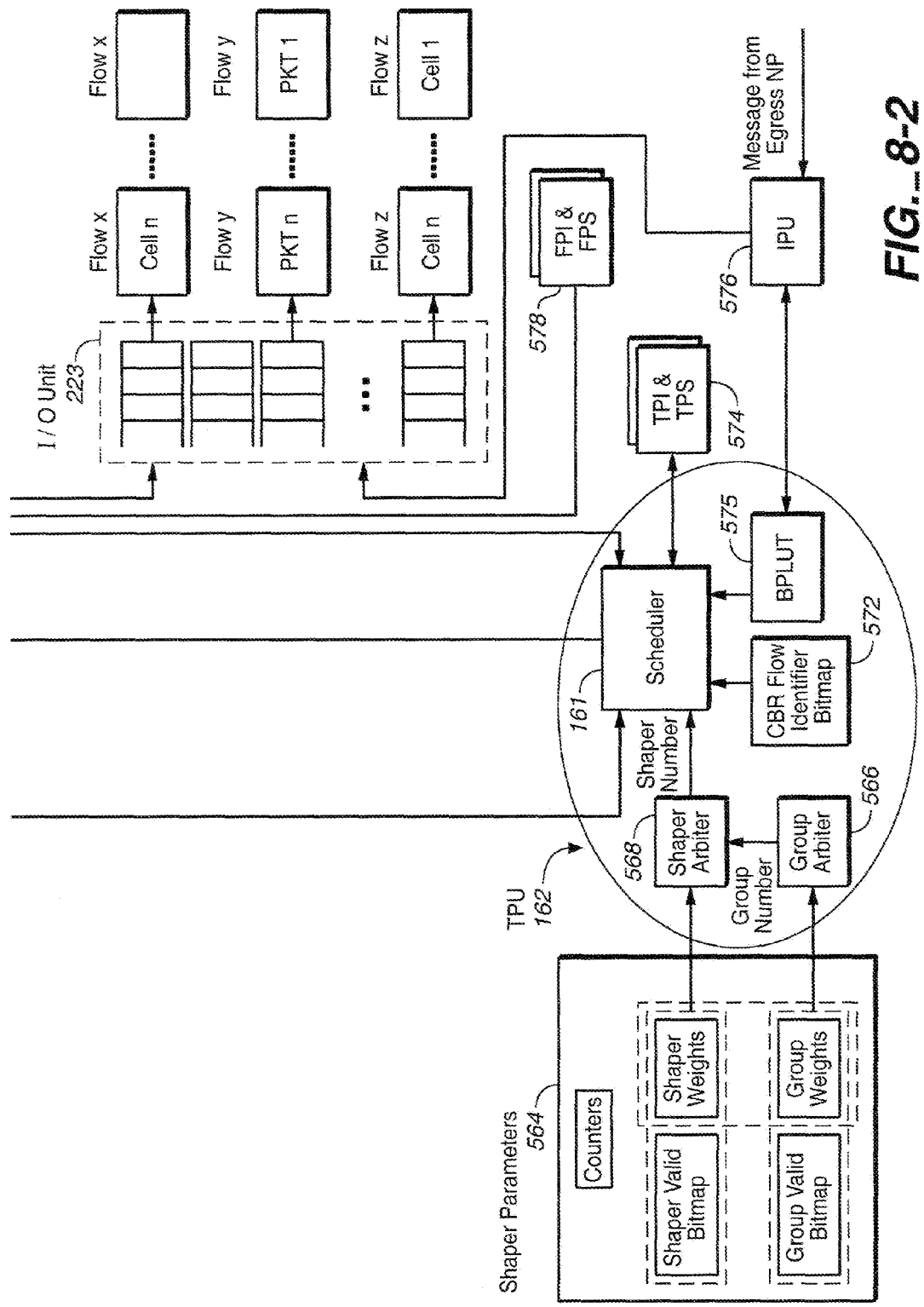
FIG._8-2

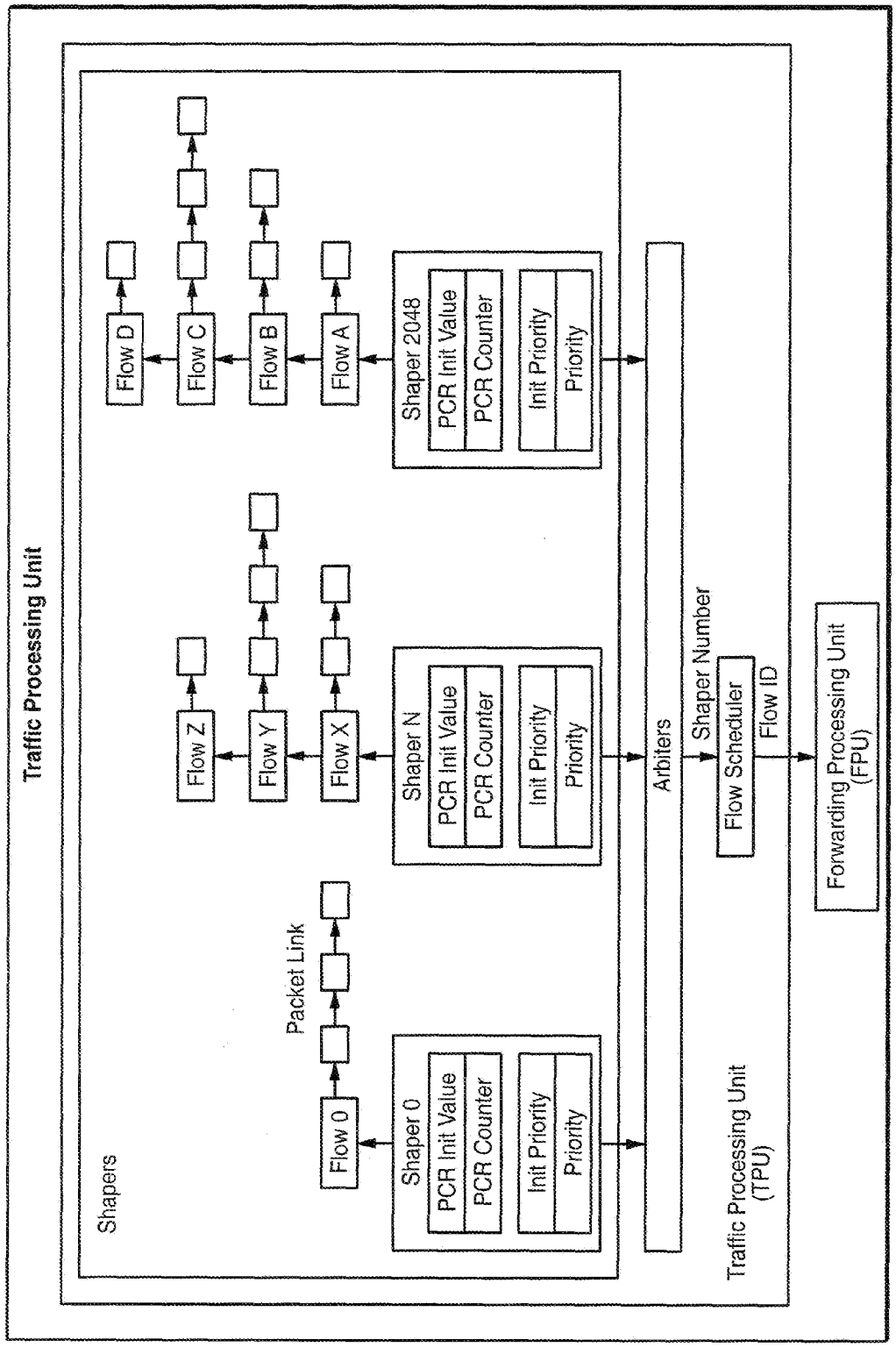
FIG._8A

Port, Shaper Group, and Shaper Data Structure

| Port Information | Port 15 | Port 14 | ... | Port 2 | Port 1 | Port 0 |
|---|---|---|---|---|---|---|
| | Rate / Priority | Rate / Priority | | Rate / Priority | Rate / Priority | Rate / Priority |
| | 1 Bit | 1 Bit | | 1 Bit | 1 Bit | 1 Bit |

| Shaper Group Information | 4 Bit | 2 Bit | 1 Bit | 4 Bit | 4 Bit |
|---|---|---|---|---|---|
| | Initial Weight | Weight Control | Valid | Current Weight | Physical Port No. |
| | Initial Weight | Weight Control | Valid | Current Weight | Physical Port No. |
| | Initial Weight | Weight Control | Valid | Current Weight | Physical Port No. |
| | Initial Weight | Weight Control | Valid | Current Weight | Physical Port No. |

| Shaper Information | 1 Bit | 1 Bit | 4 Bit | 1 Bit | 4 Bit | |
|---|---|---|---|---|---|---|
| | VBR / GFR | Shaper Elapsed | Initial Weight | Valid | Current Weight | Shaper 0 |
| | VBR / GFR | Shaper Elapsed | Initial Weight | Valid | Current Weight | Shaper 1 |
| | VBR / GFR | Shaper Elapsed | Initial Weight | Valid | Current Weight | Shaper 2 |
| | | | ... | | | |
| | VBR / GFR | Shaper Elapsed | Initial Weight | Valid | Current Weight | Shaper 2046 |
| | VBR / GFR | Shaper Elapsed | Initial Weight | Valid | Current Weight | Shaper 2047 |

*FIG._8B*

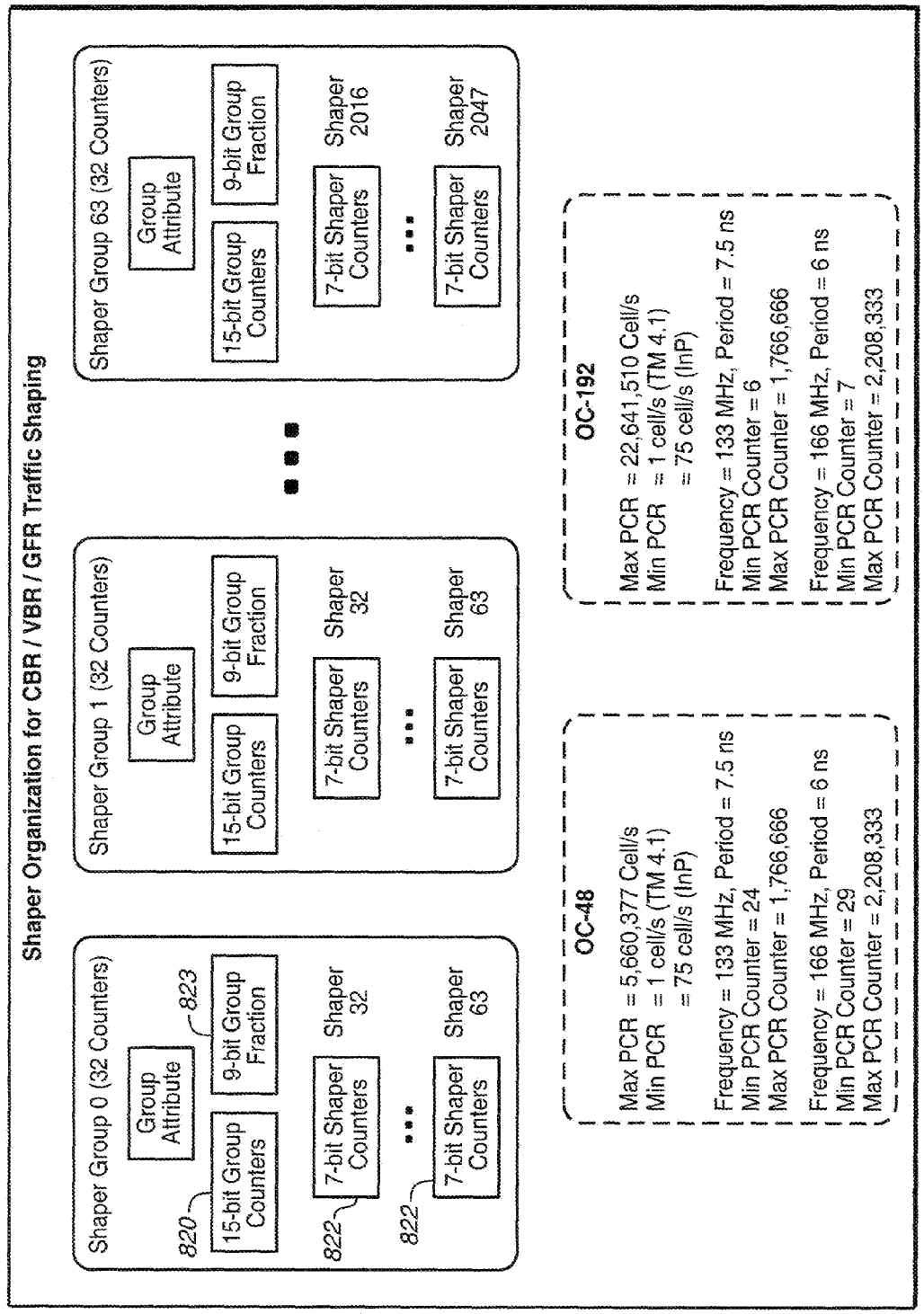
FIG._8C

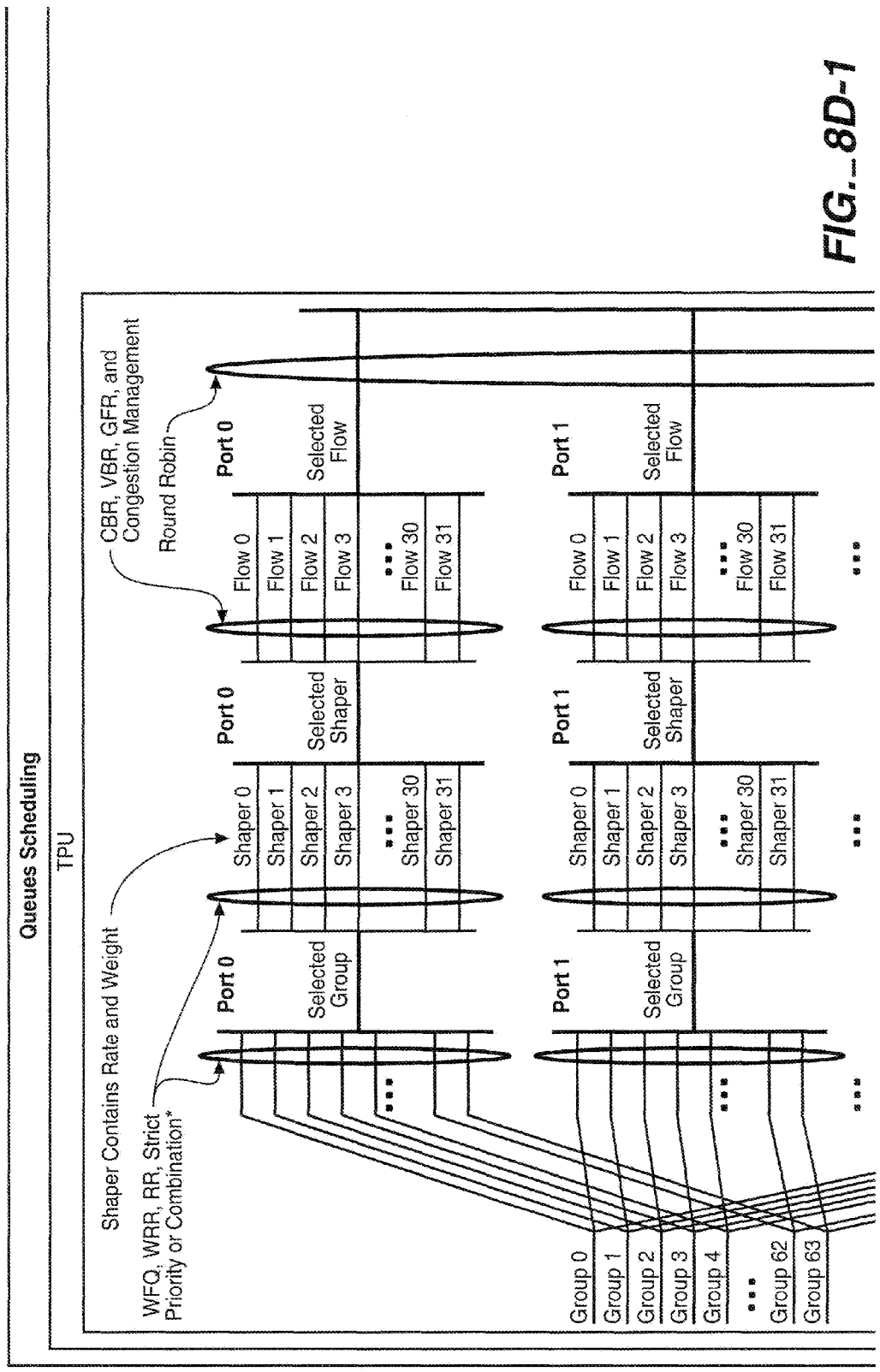
FIG._8D-1

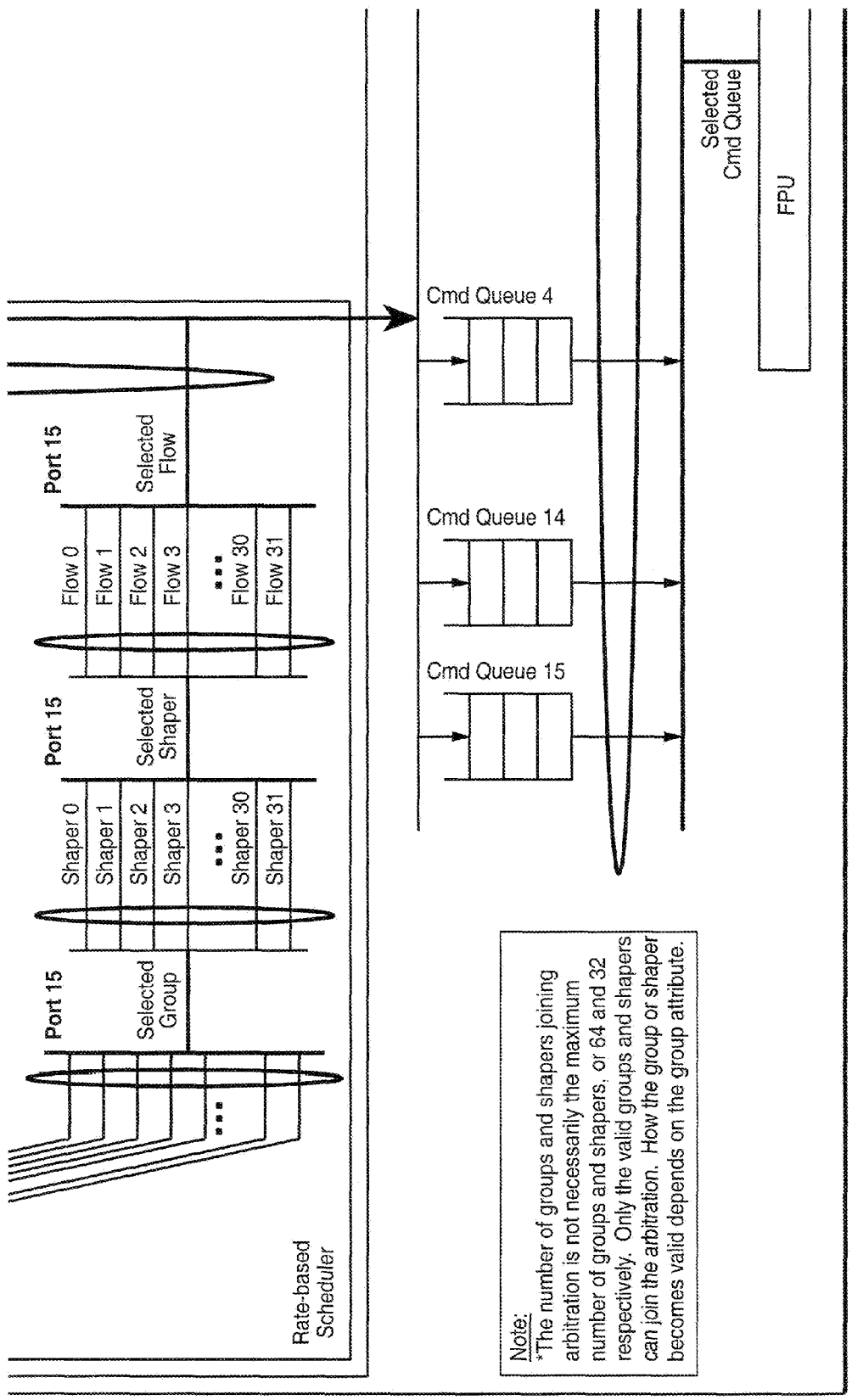
FIG._8D-3

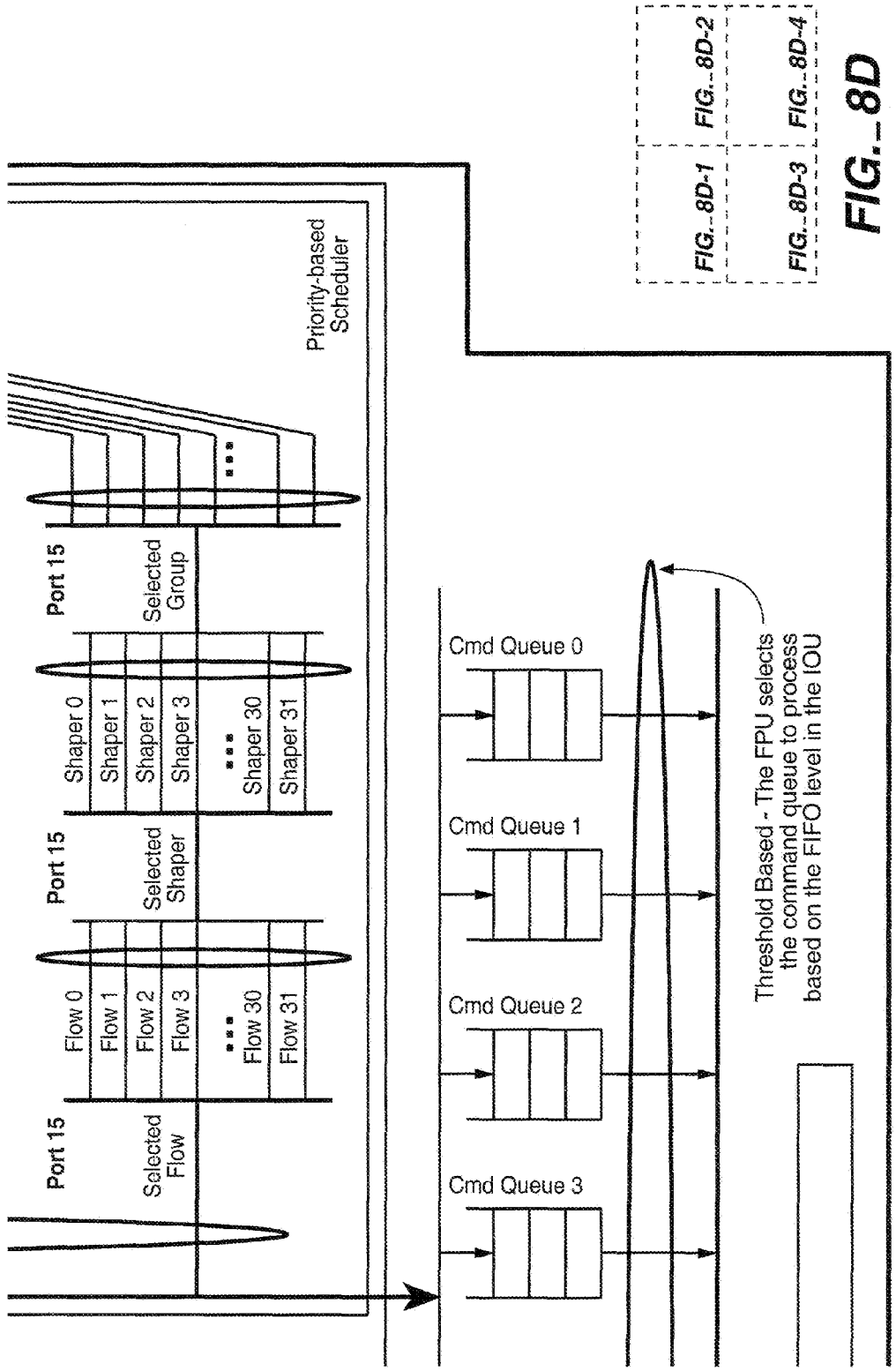

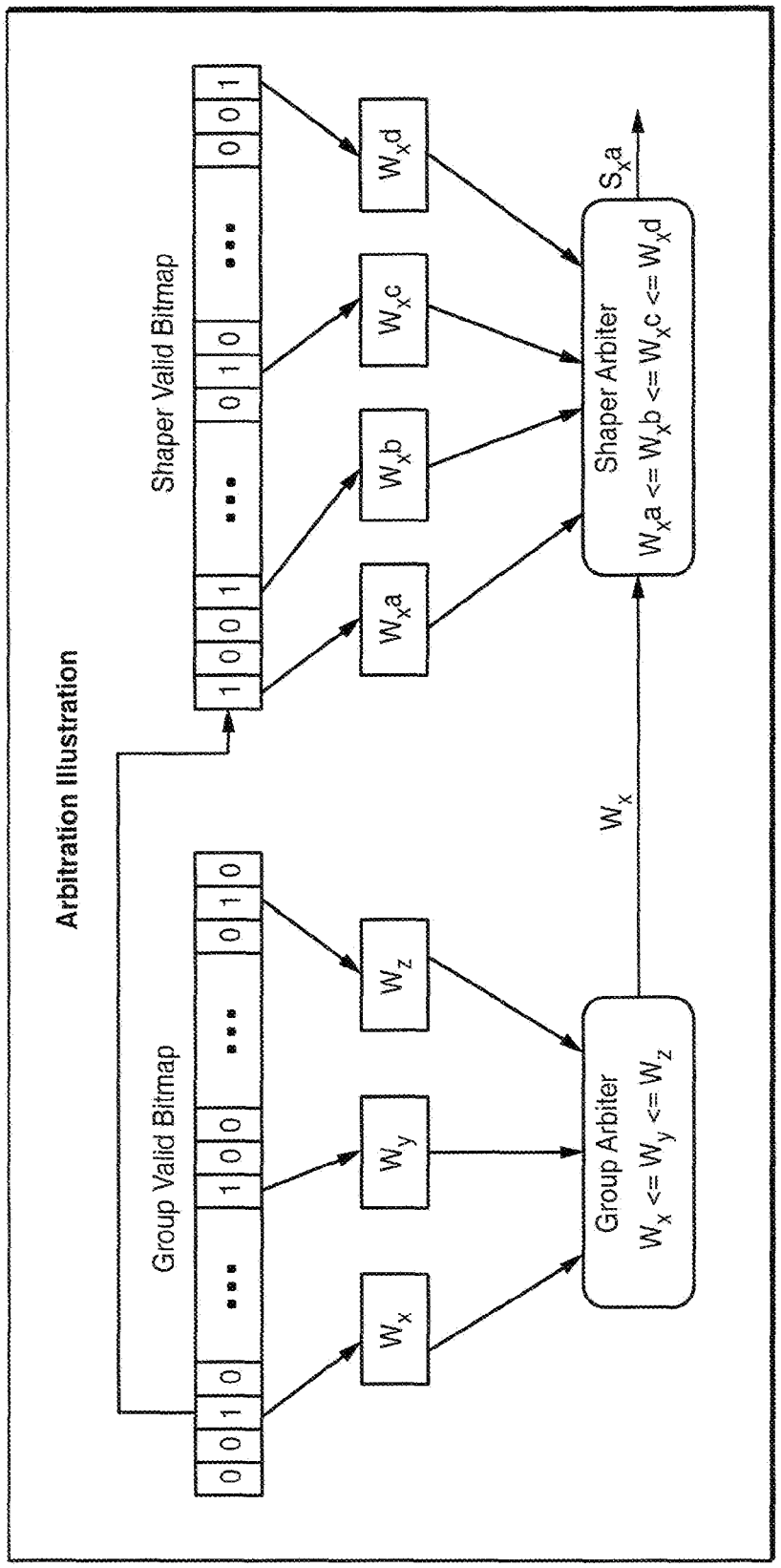
FIG._8E

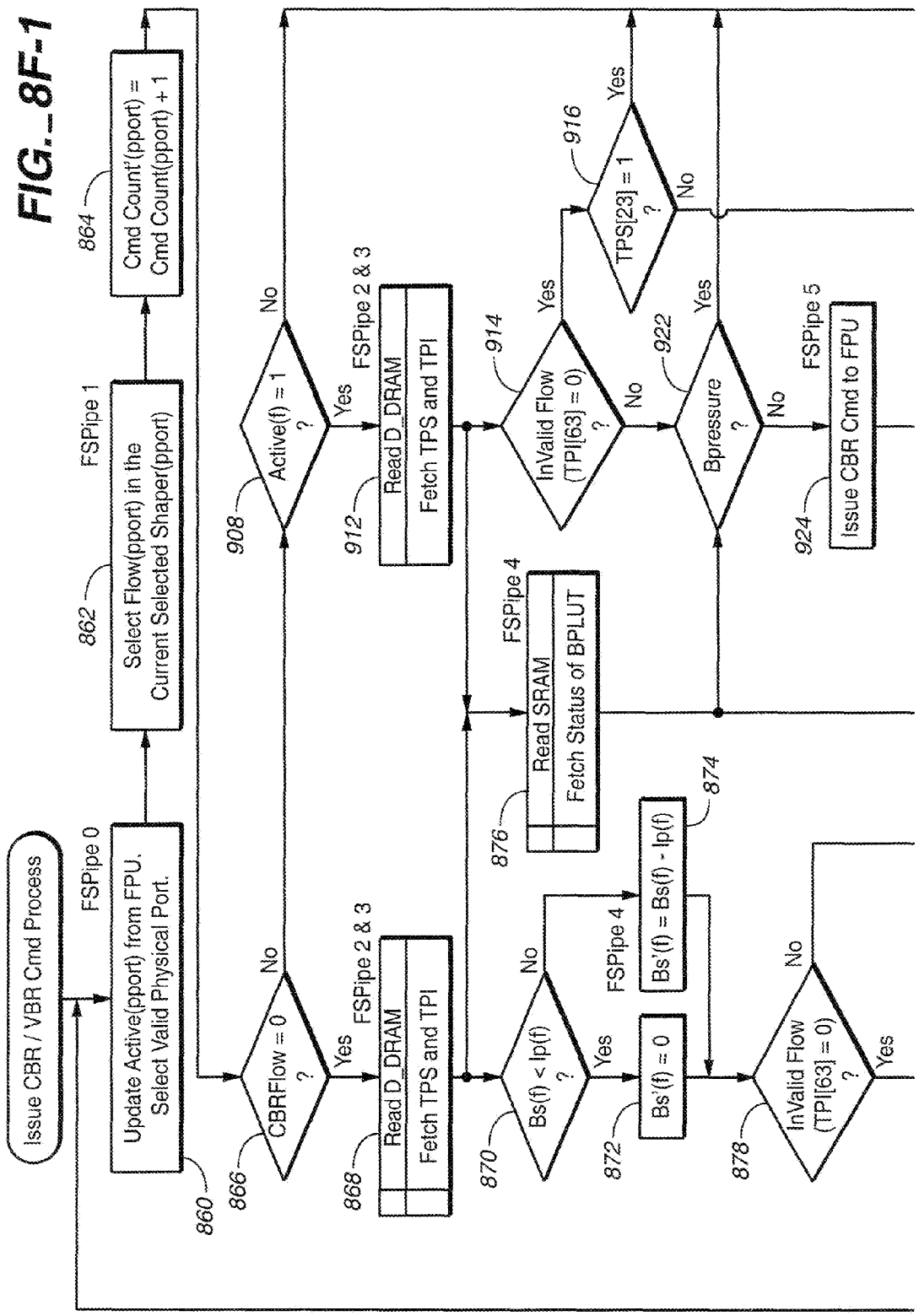
FIG._8F-1

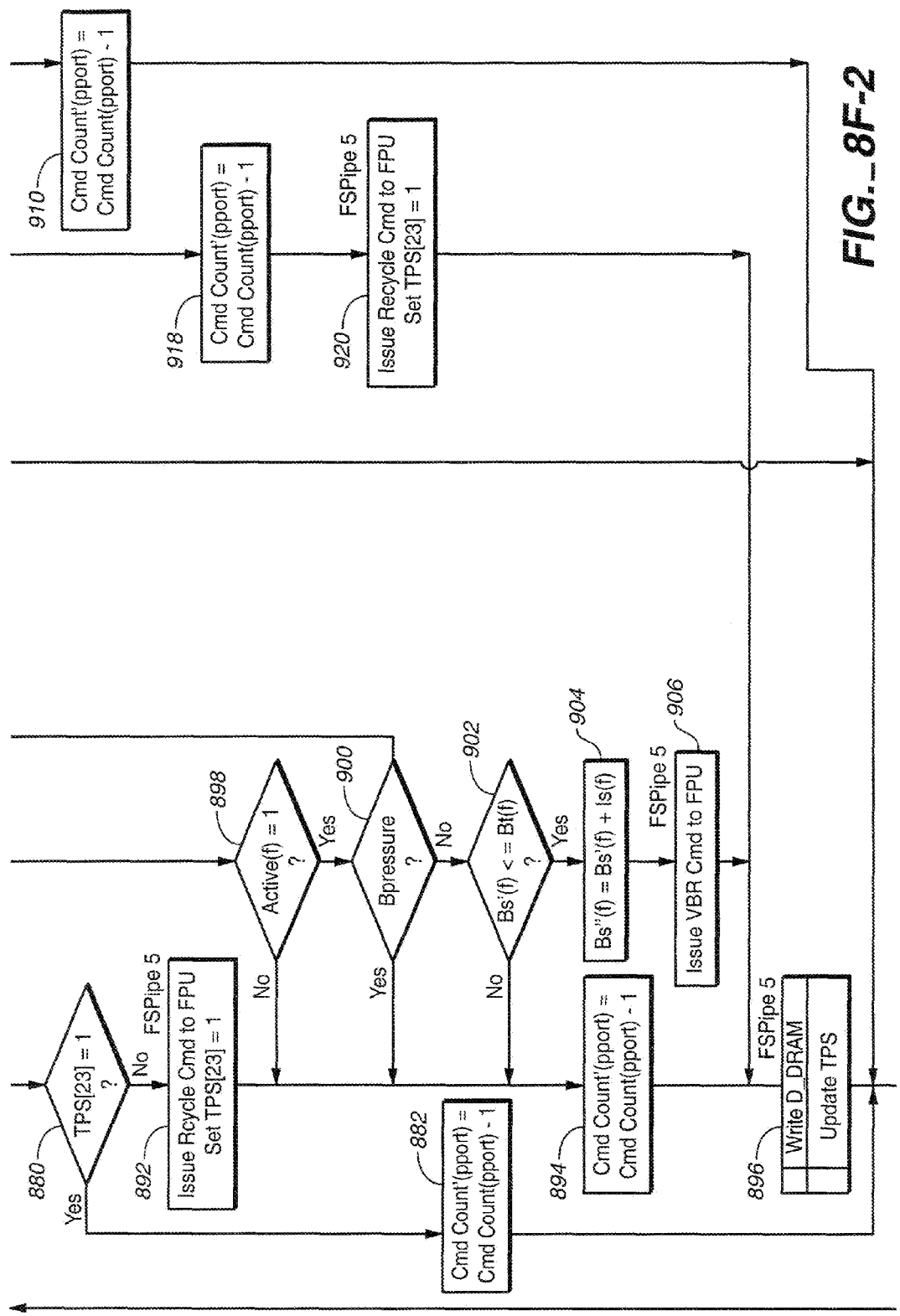
FIG._8F-2

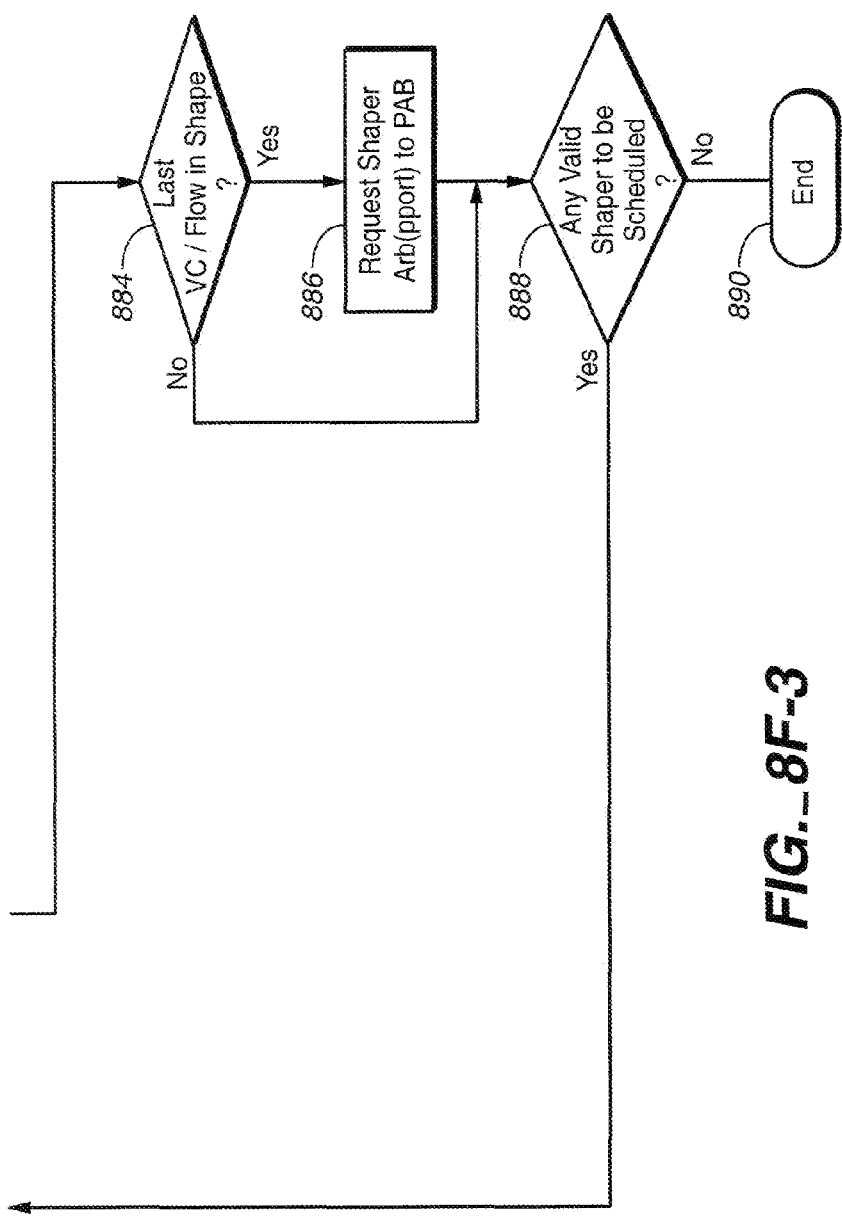

Traffic Processing Instruction

DW0:
- VALID
- SVC (2)
- RSVD
- PKT
- MCAST
- EGRESS PORT (12)
- PRIORITY (8)
- SUSTAINED CELL RATE (CELL SLOT) (19)
- PEAK CELL RATE (CELL SLOT) (19)

DW1:
- RSVD (5)
- RSVD (4)
- RSVD (11)
- RSVD (3)
- BURST TOLERANCE (23)
- RSVD (2)
- CURRENT FLOW ID (16)
- RSVD (2)
- RSVD (16)

*FIG._8G*

Traffic Processing State*

- INVAL
- BUCKET (23)
- RESERVED (40)

*FIG._8H*

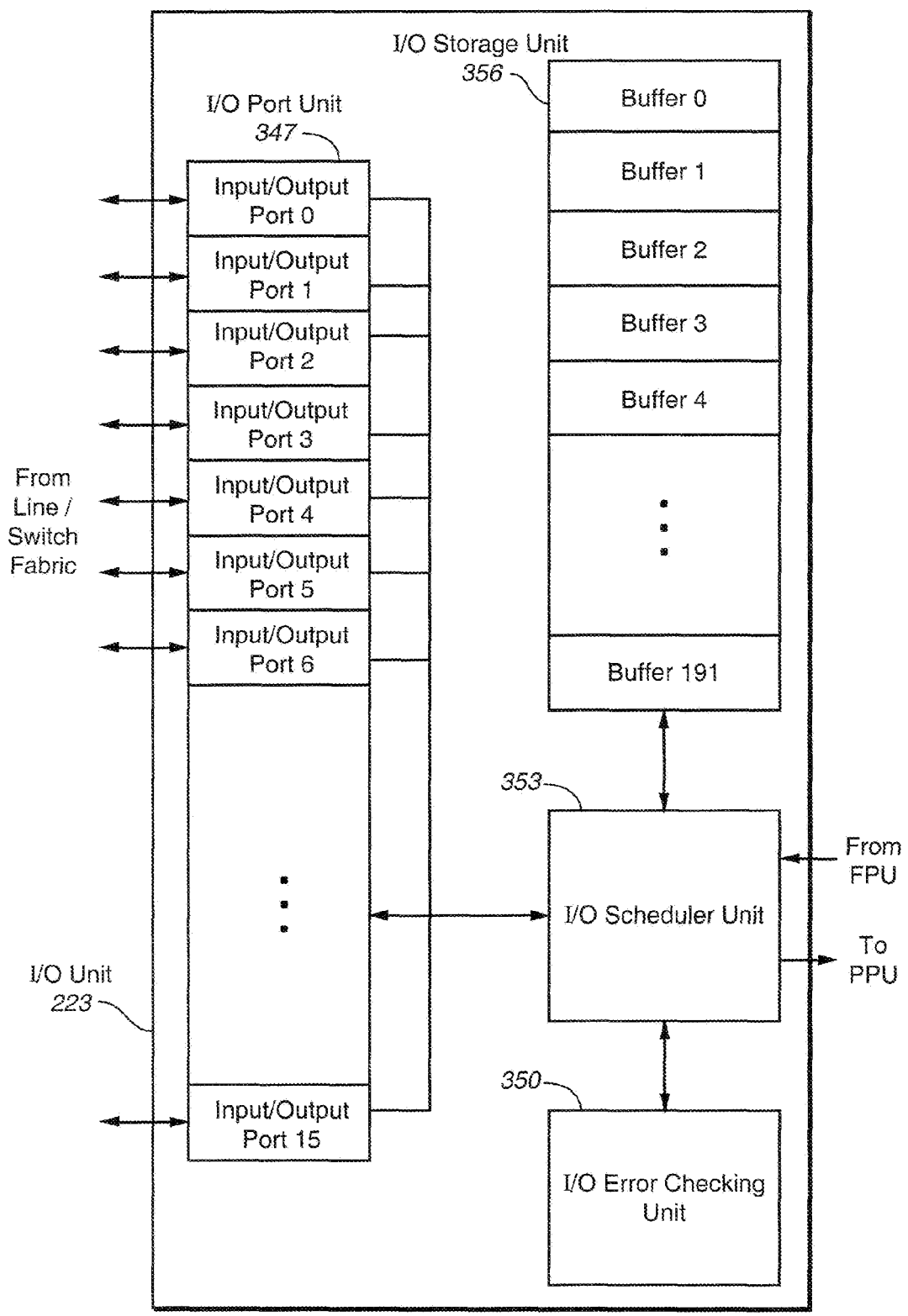
FIG._9

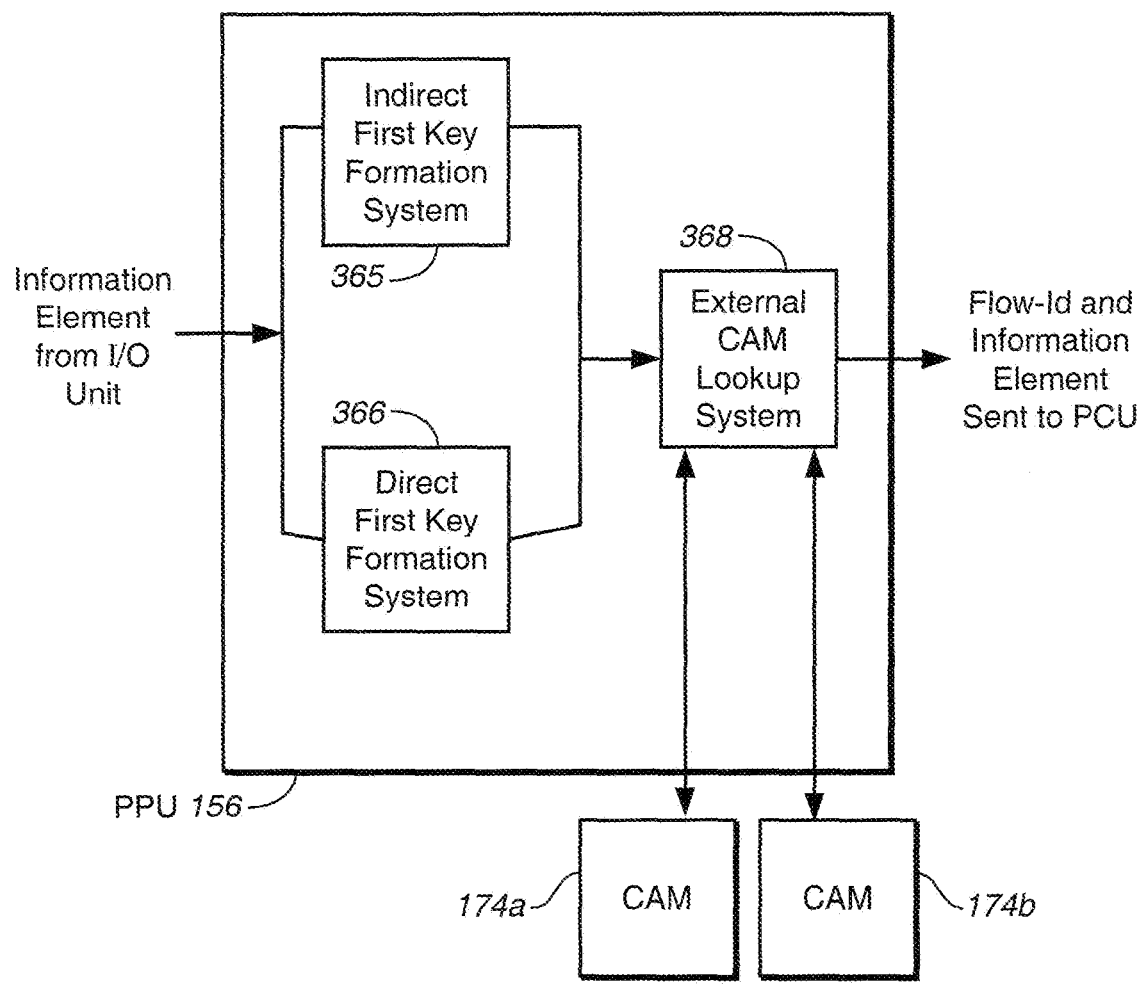
FIG._10

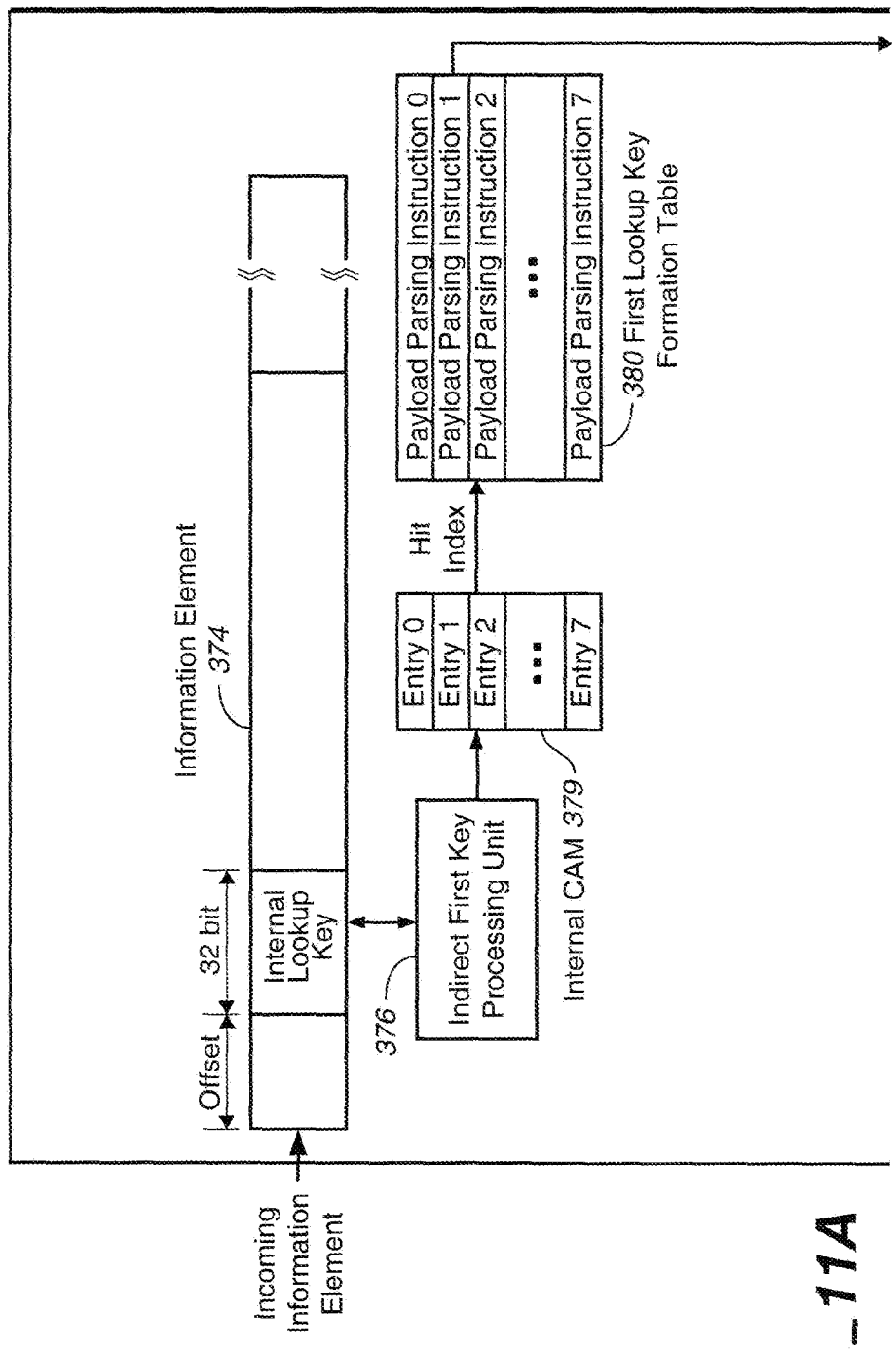
FIG._11A

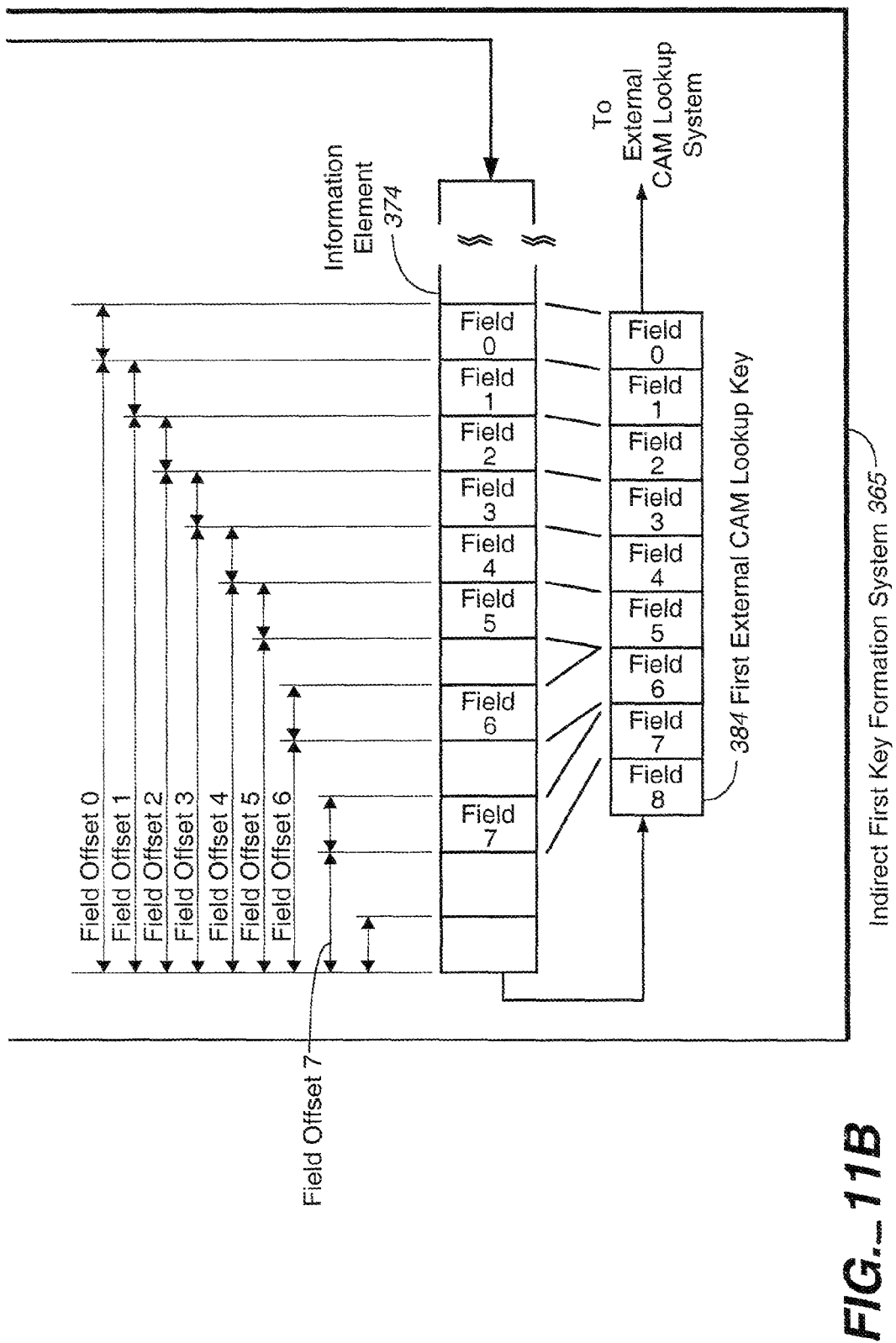
FIG._11B

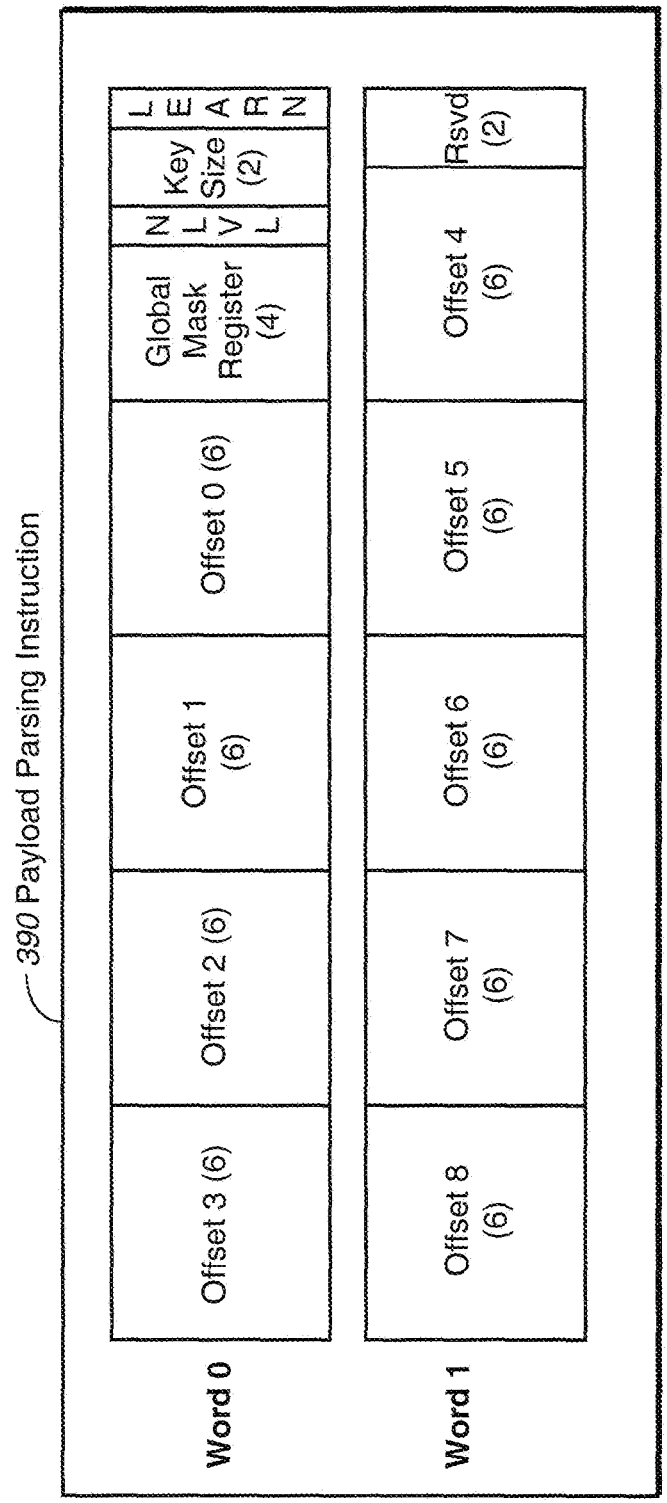
FIG._12

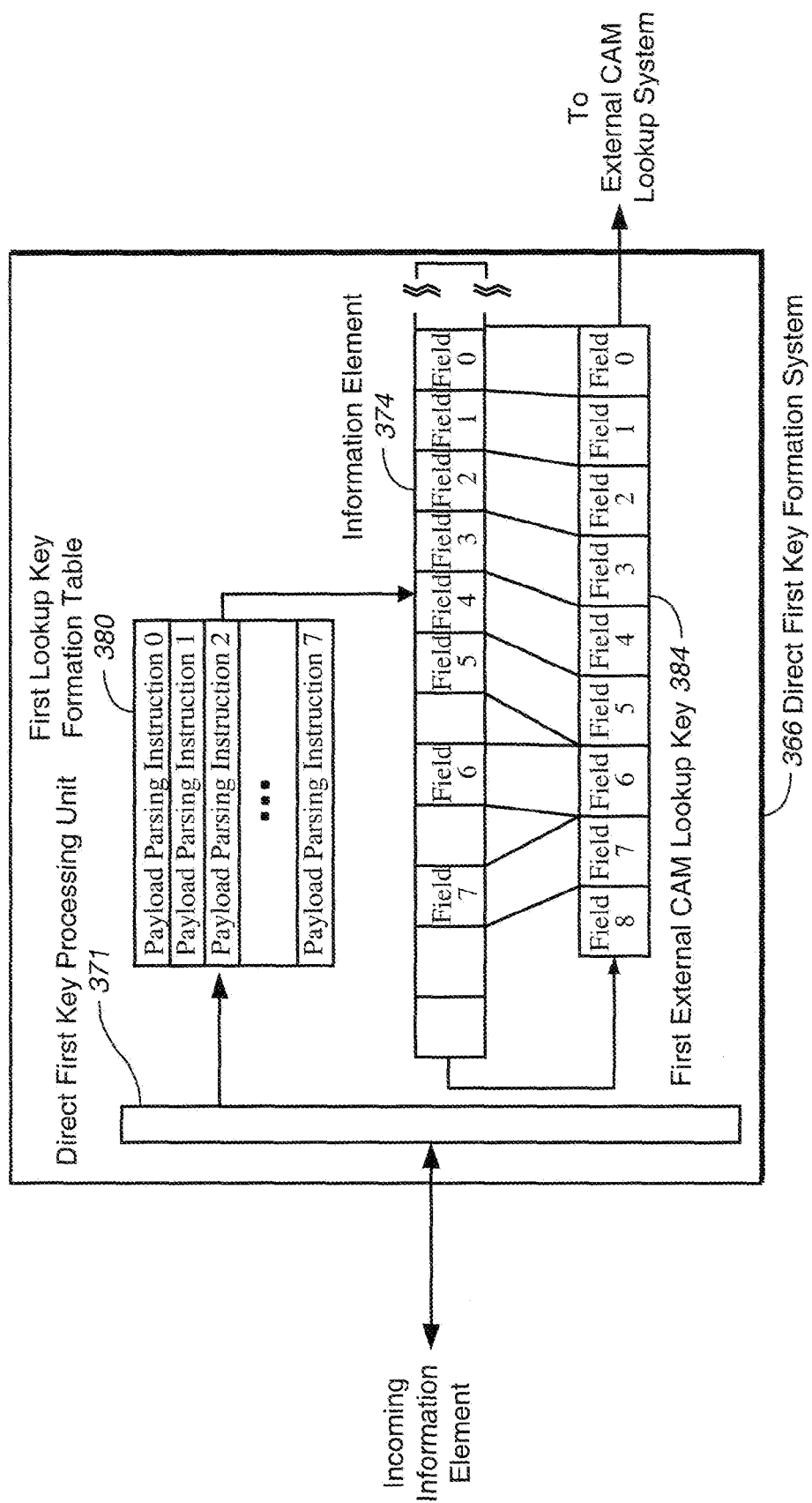
FIG._13

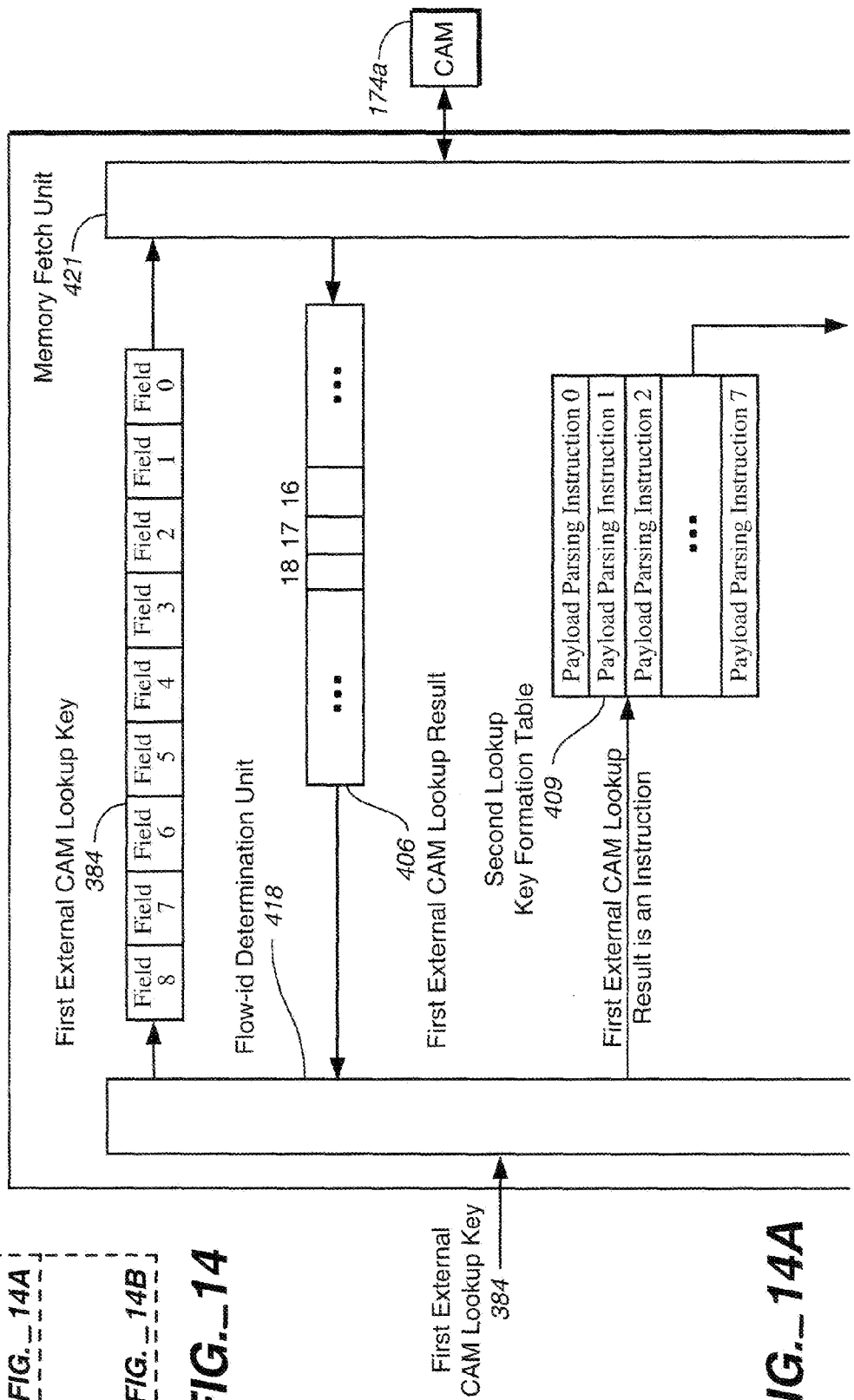

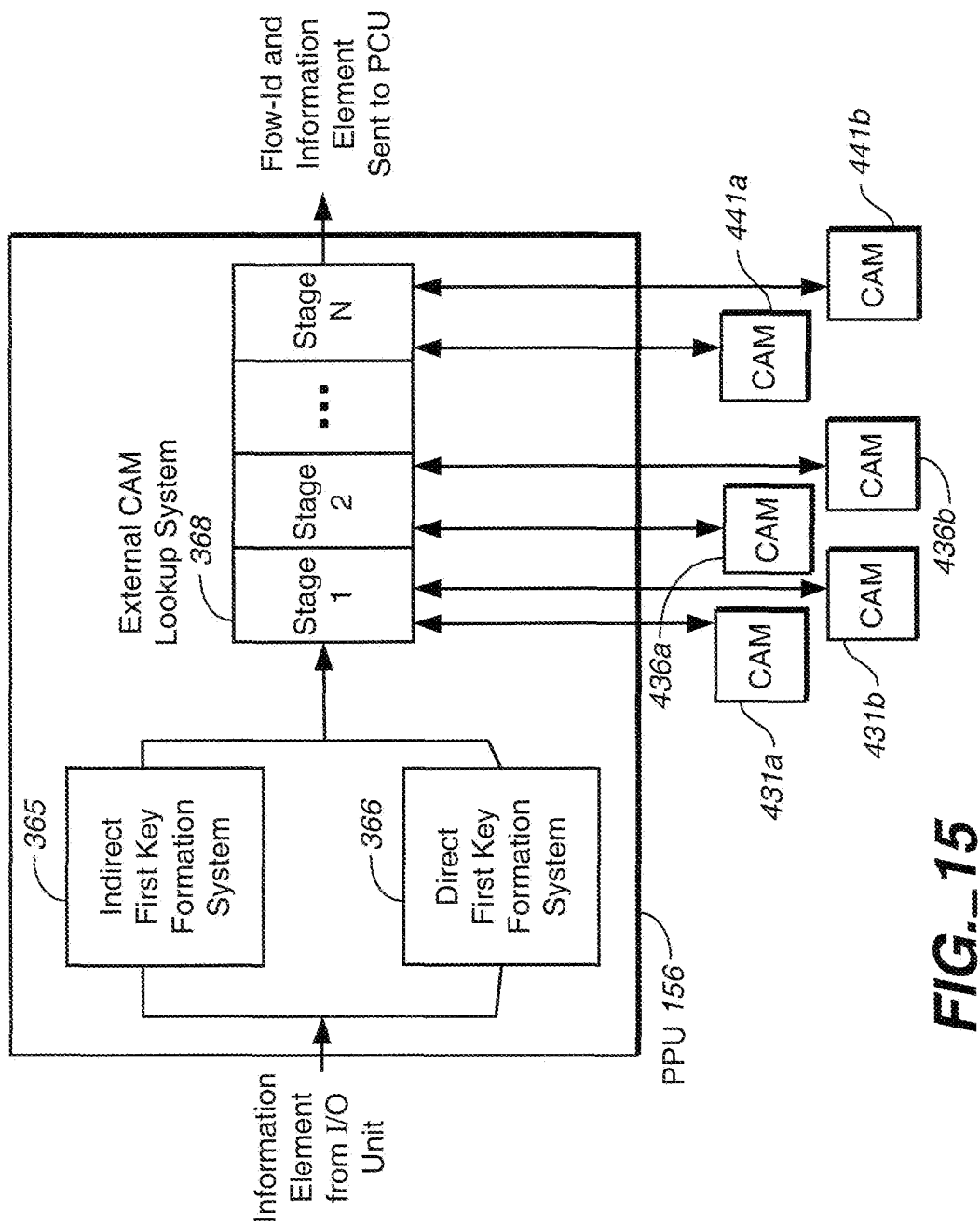
FIG._15

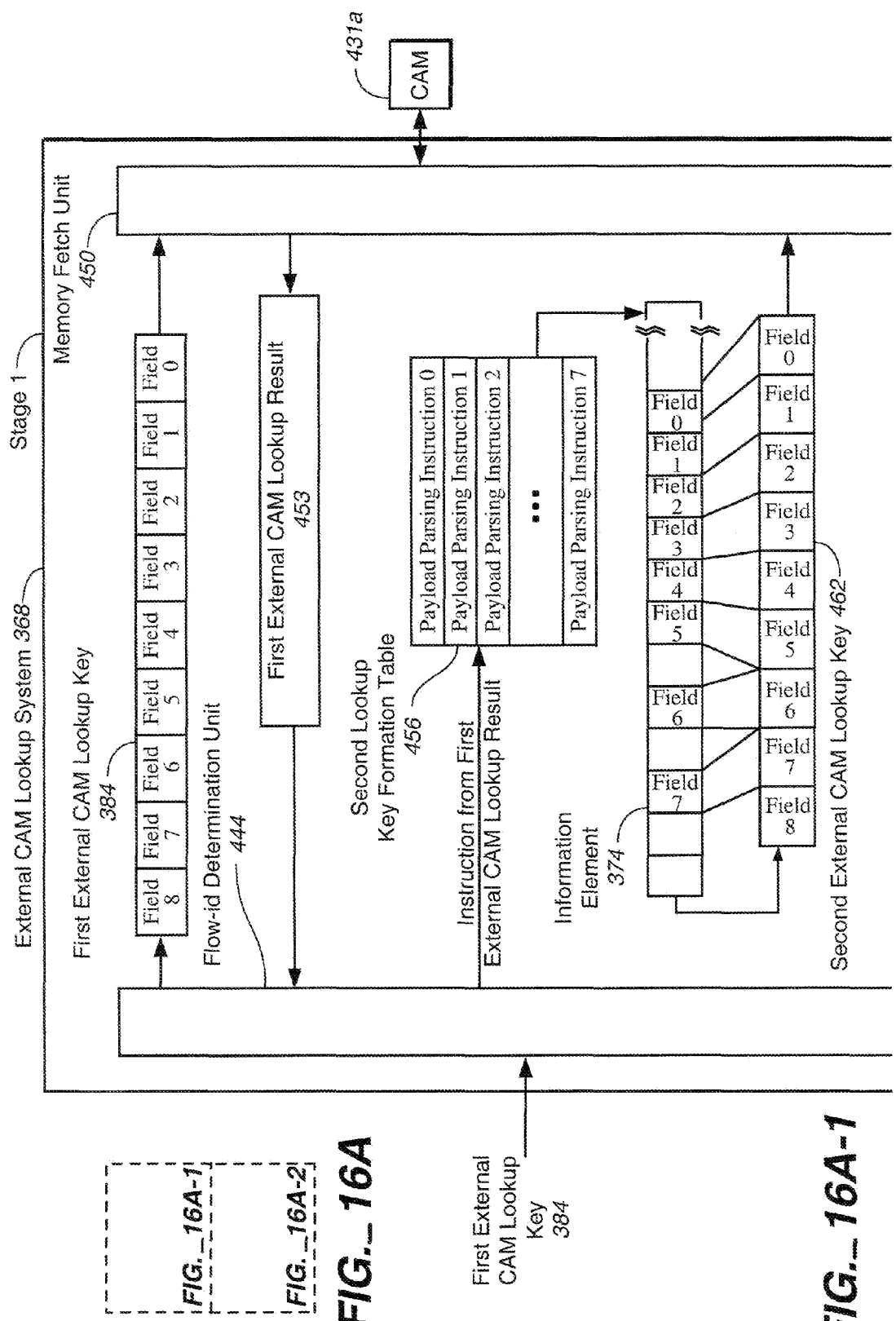

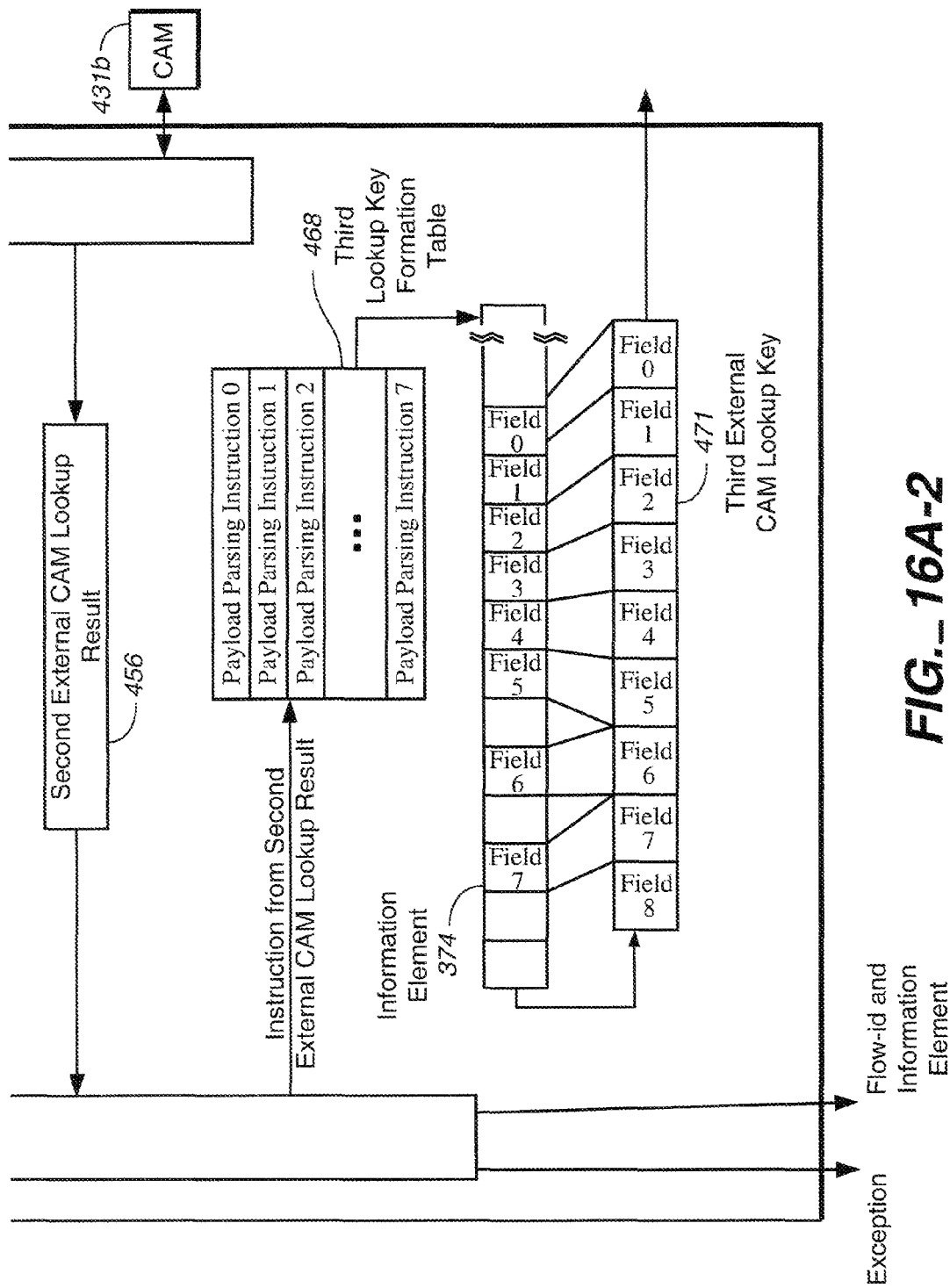
FIG._16A-2

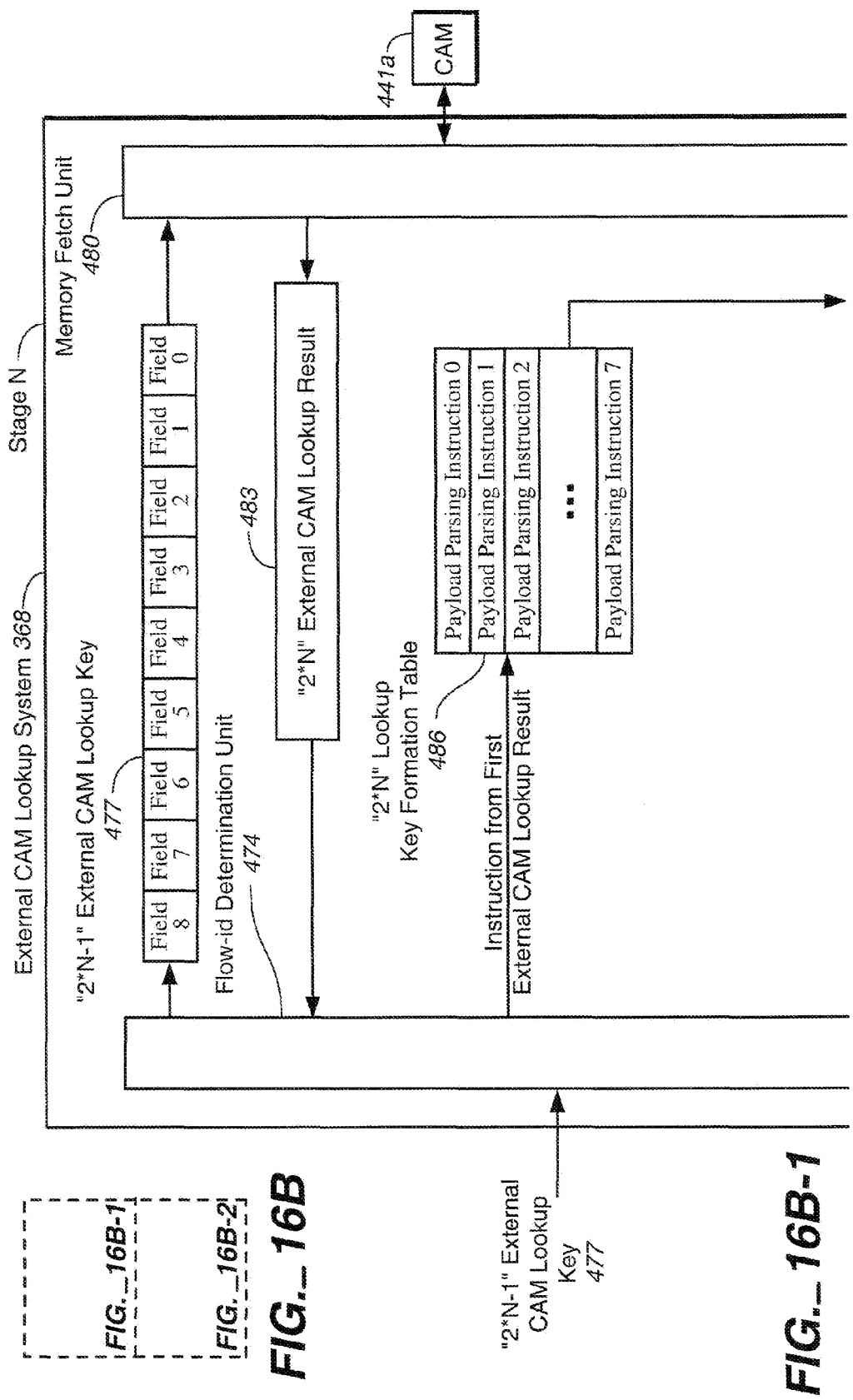

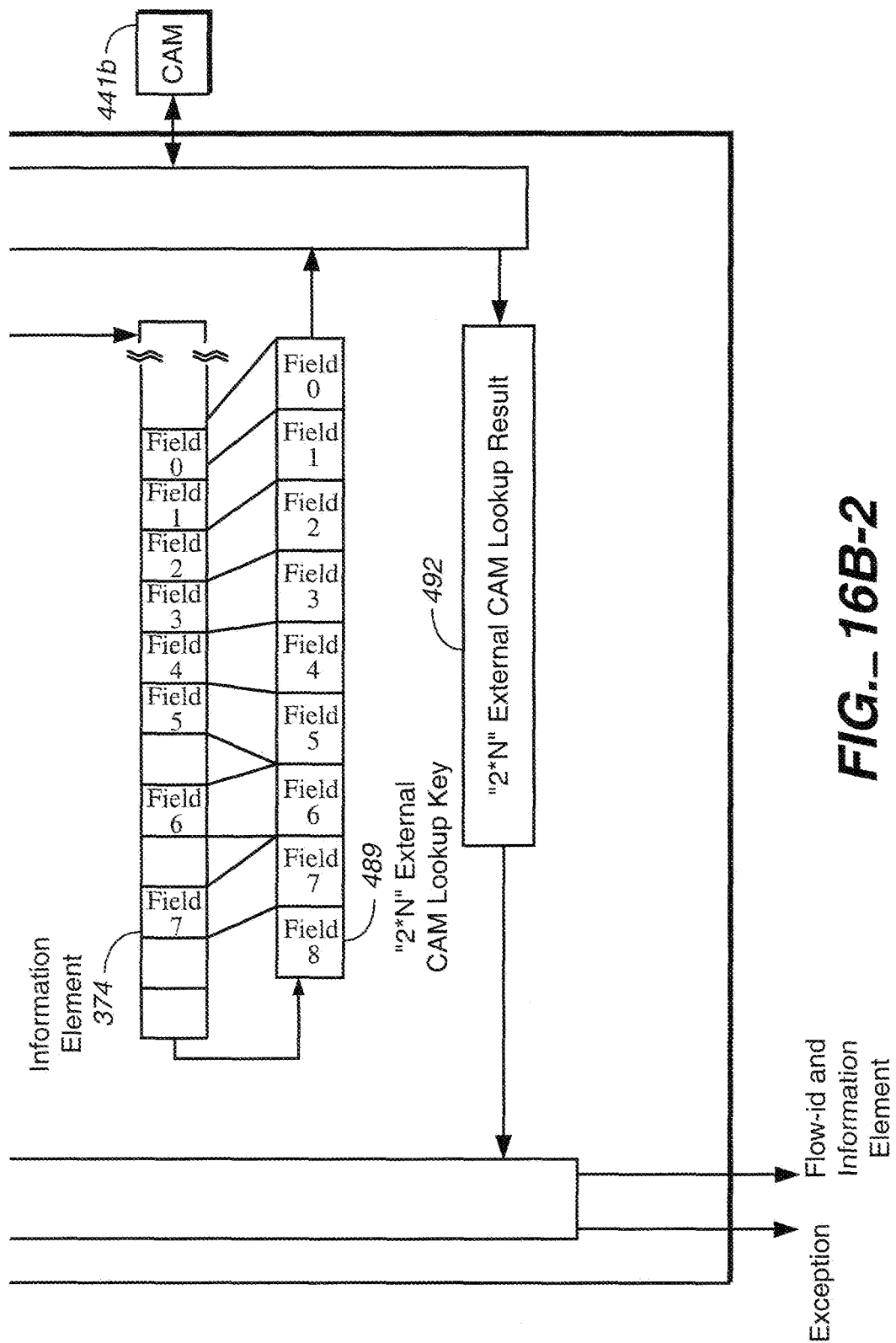
FIG._16B-2

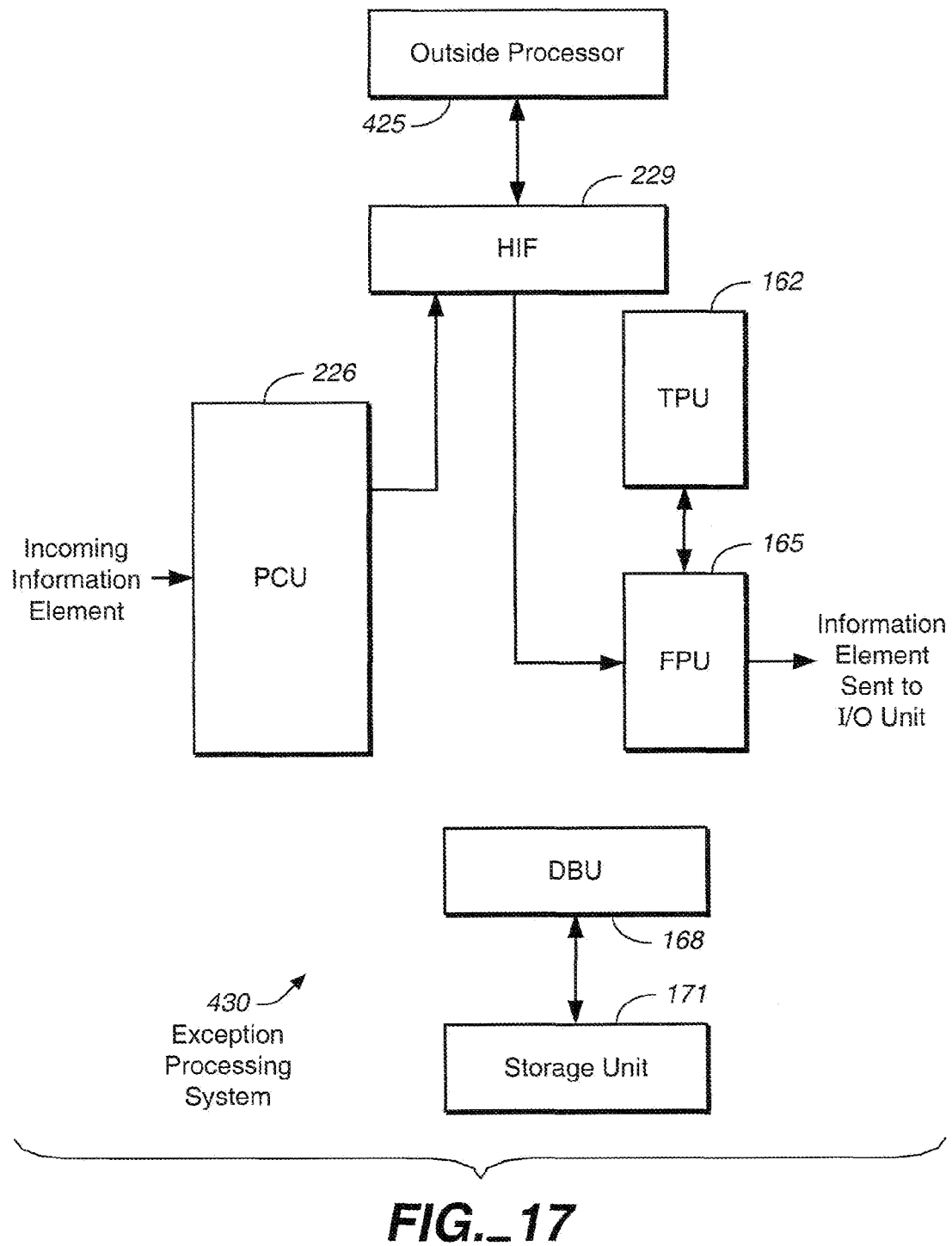
FIG._17

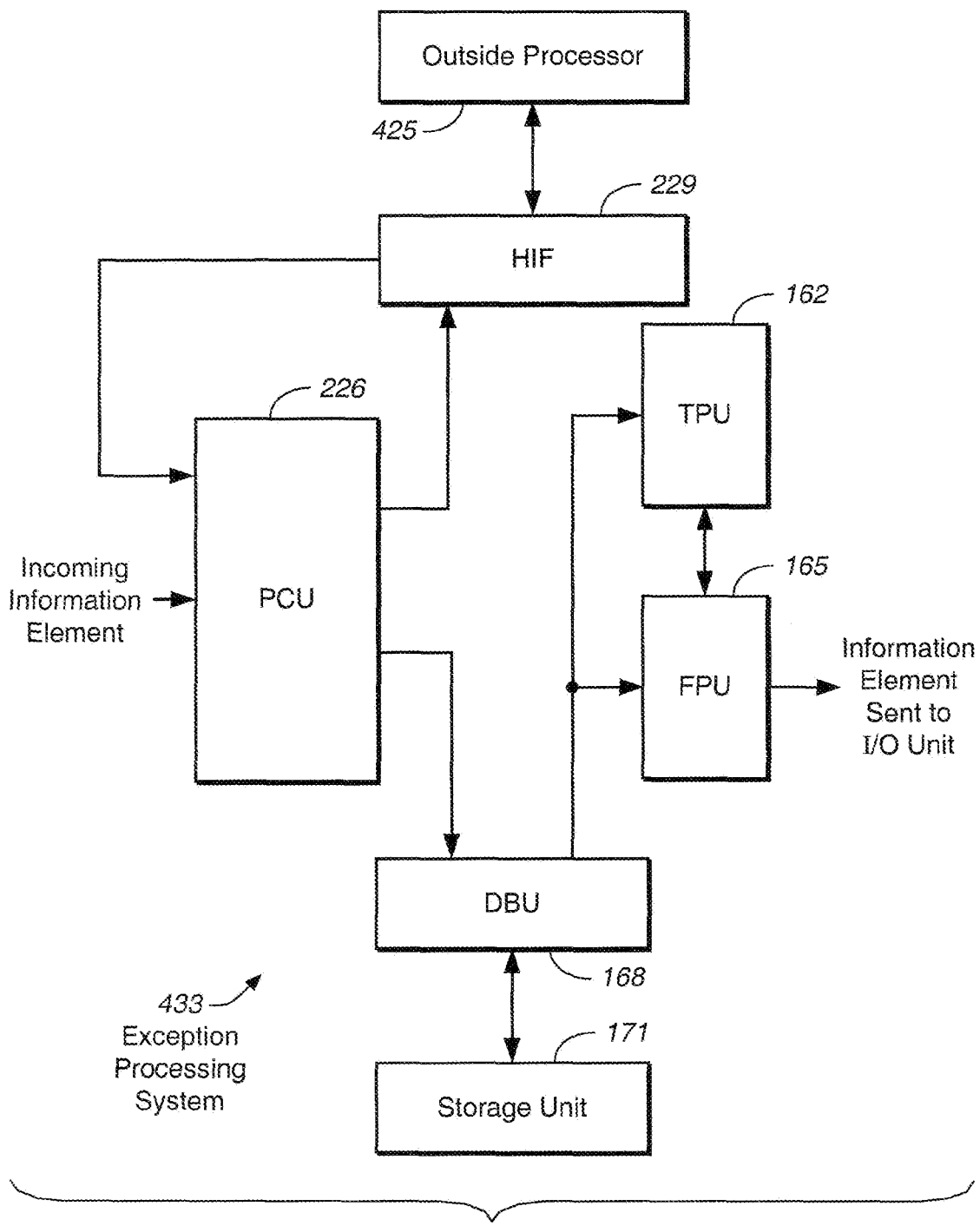
FIG._18

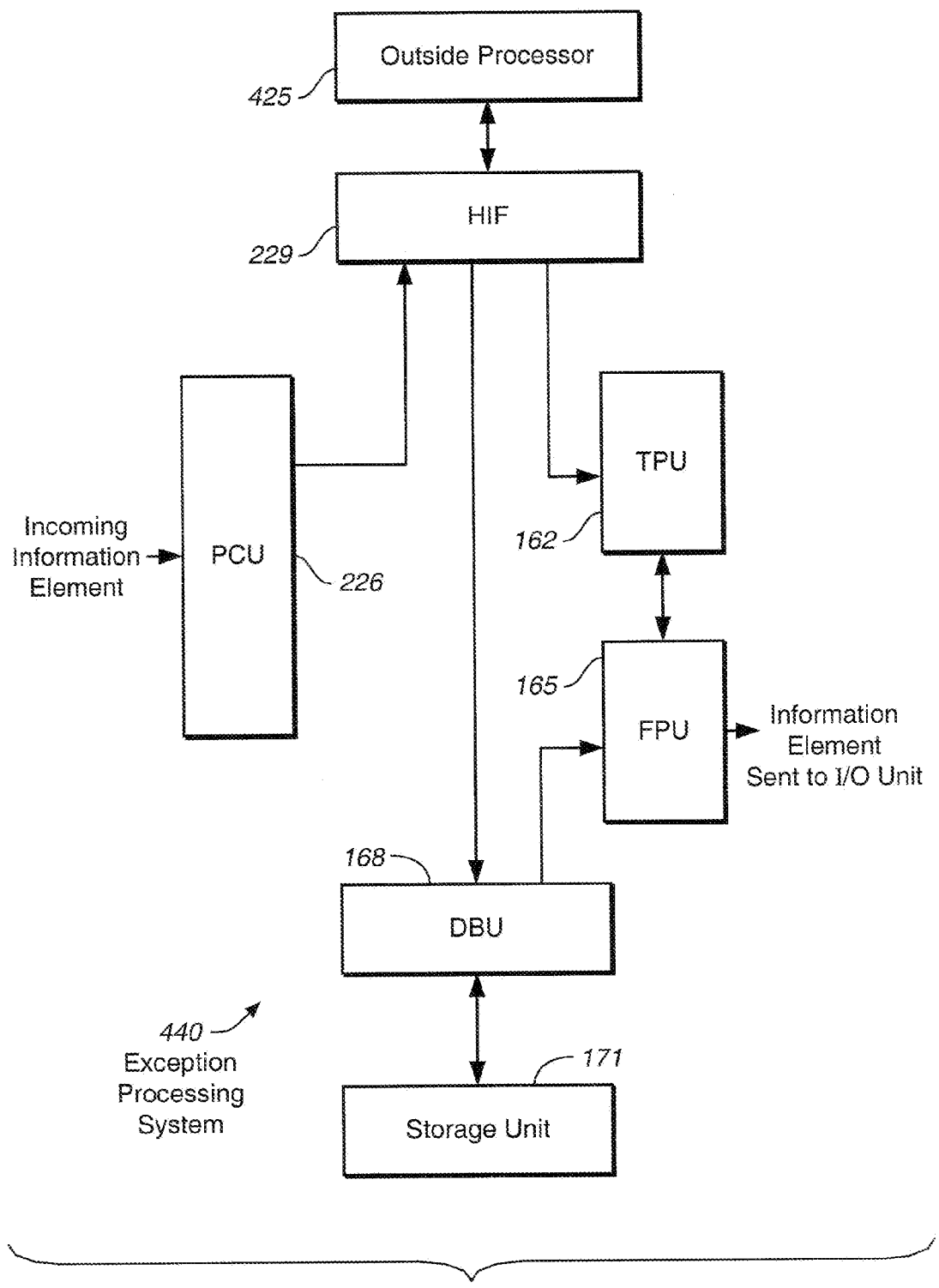
FIG._19

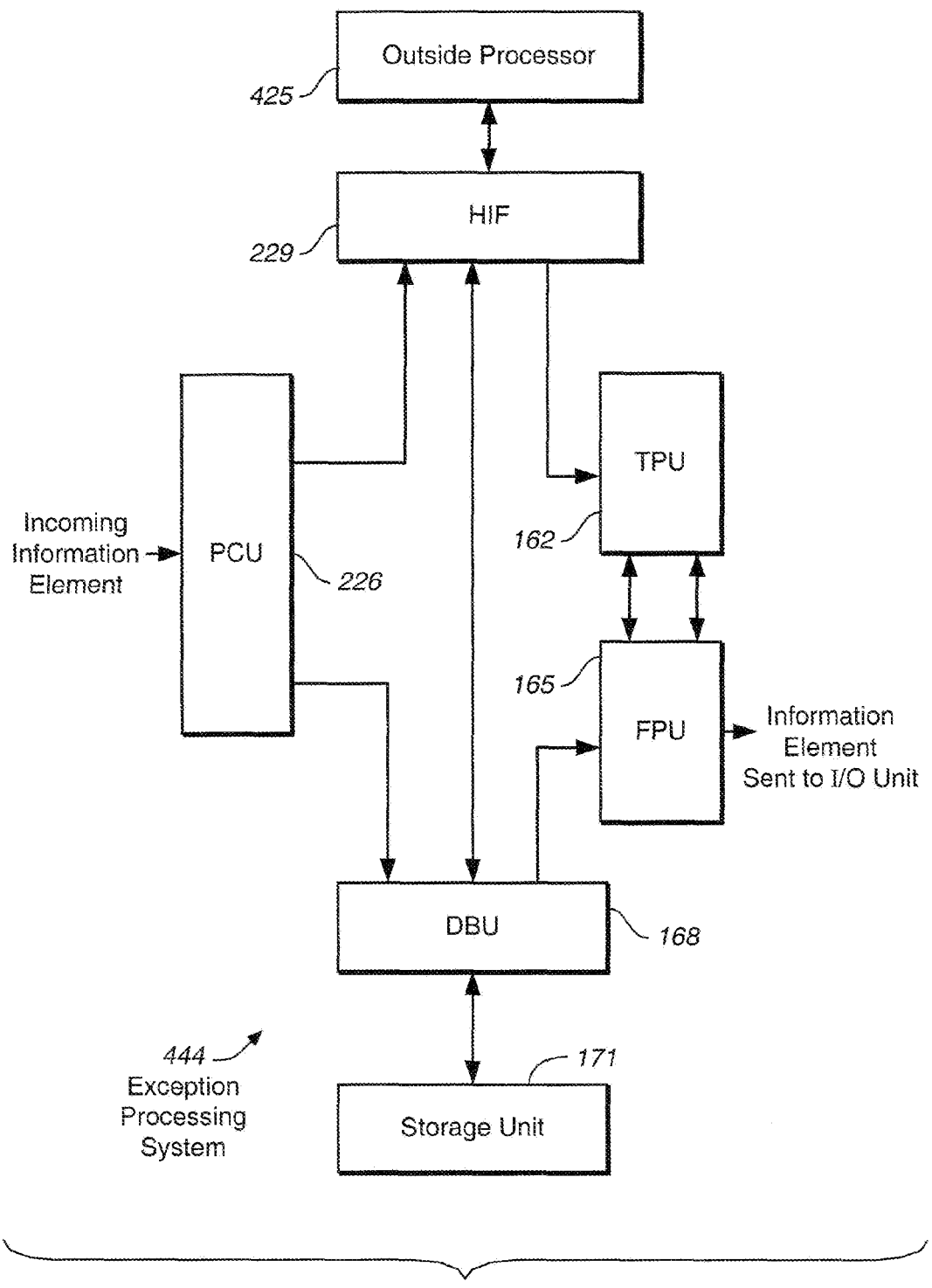
FIG._20

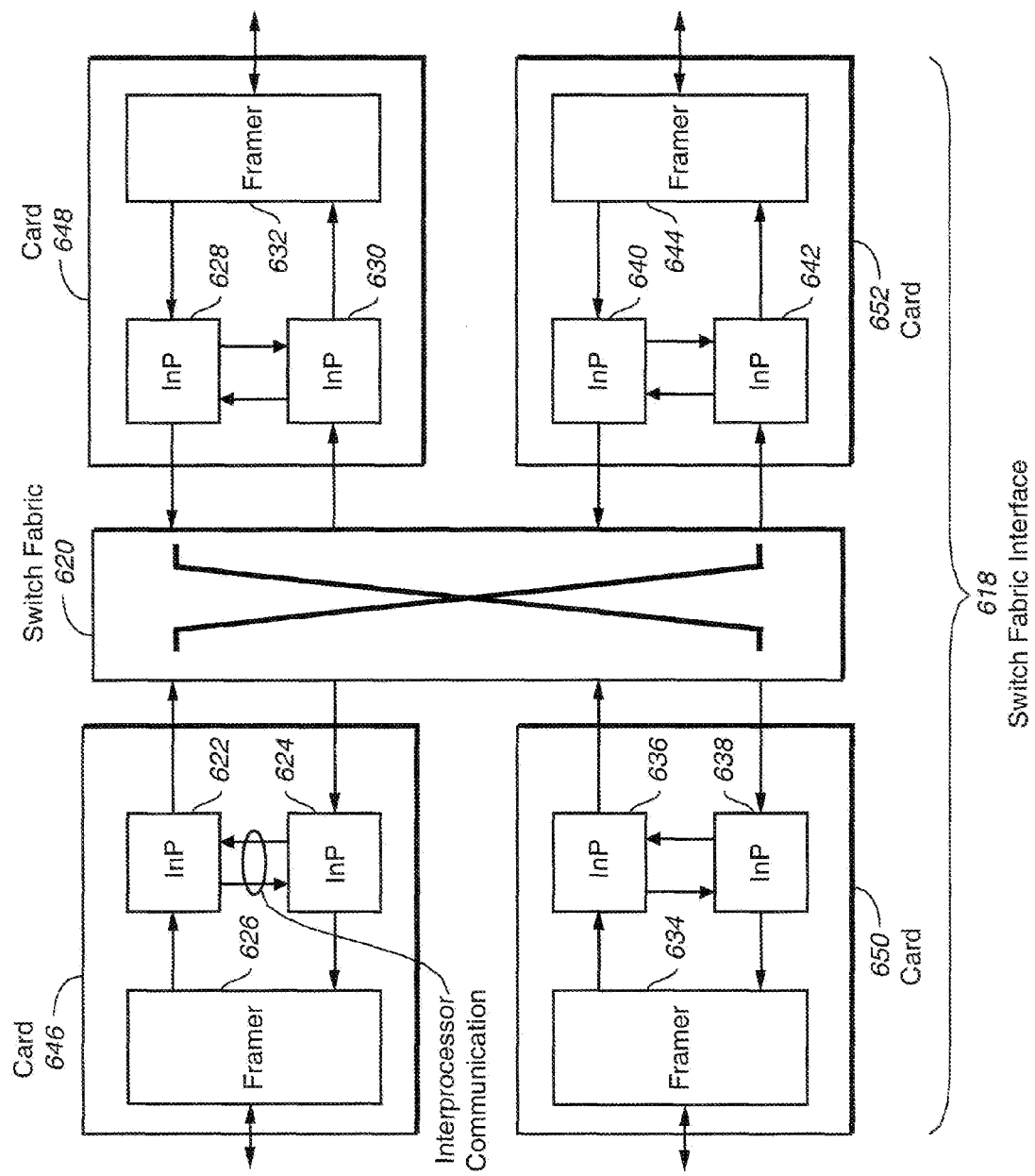
FIG._21

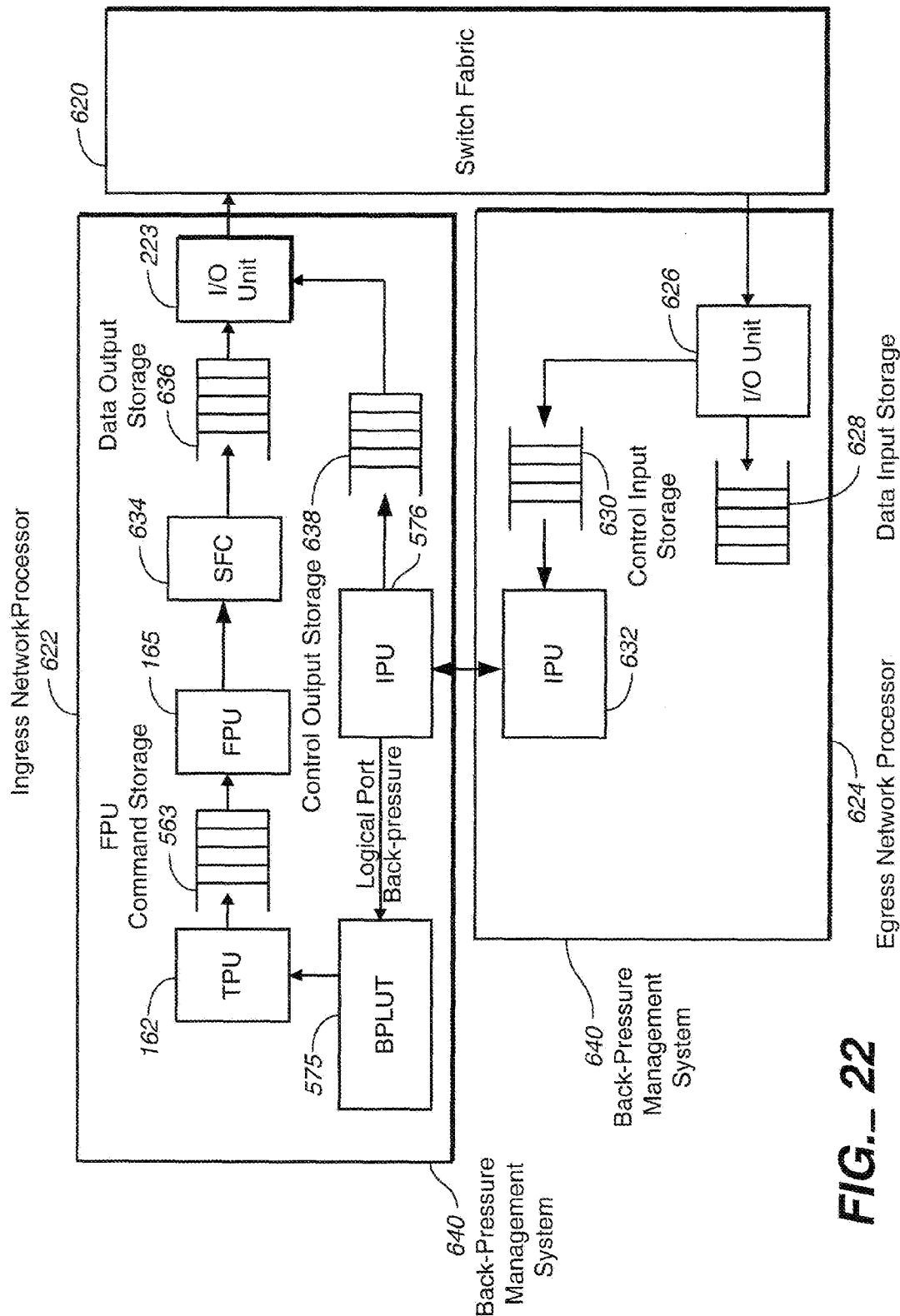
FIG._22

NETWORK PROCESSOR ARCHITECTURE

CROSS-REFERENCE TO RELATED APPLICATIONS

This application claims the benefit of U.S. Provisional Application Ser. No. 60/382,217, filed May 20, 2002, and U.S. Provisional Application Ser. No. 60/372,656, filed Apr. 14, 2002, both entitled "Network Processor Architecture," and both incorporated by reference herein in their entirety.

This is a continuation of copending application Ser. No. 11/957,885, filed on Dec. 17, 2007, which is a continuation of application Ser. No. 10/413,776, filed on Apr. 14, 2003, now issued U.S. Pat. No. 7,310,348, issued Dec. 18, 2007, the entire disclosure of which is incorporated into this application by reference.

This application is a continuation-in-part of U.S. patent application Ser. No. 10/251,946, filed Sep. 19, 2002, entitled "Vertical Instruction and Data Processing in a Network Processor Architecture," which claims the benefit of U.S. Provisional Application Ser. No. 60/382,437, filed May 20, 2002, entitled "Vertical Instruction and Data Processing in a Network Processor Architecture," U.S. Provisional Application Ser. No. 60/372,507, filed Apr. 14, 2002, entitled "Differentiated Services for a Network Processor," and U.S. Provisional Application Ser. No. 60/323,627, filed Sep. 19, 2001, entitled "System and Method for Vertical Instruction and Data Processing in a Network Processor Architecture," all of which are incorporated by reference herein in their entirety.

BACKGROUND OF THE INVENTION

1. Field of the Invention

This invention relates generally to a computer system and more particularly to a processor that operates on network traffic.

2. Description of the Related Art

FIG. 1 illustrates a prior art line card 100 and its components. In the line card 100, the fiber-optic line 118 is coupled to the optical module 103. The other end of the fiber-optic line 118 typically connects to an external router or another communications device. Among other functions, the optical module 103 converts the optical signal into an electrical signal. The optical module 103 presents the electrical signal to the framer 106. The framer 106 performs functions such as: framing, error checking and statistical gathering. The framer 106 provides the framed information to a classifier 109 if the classifier 109 is present. The classifier 109 performs deeper classification and more complex classification than that provided by a network processor 112. For example, the classifier 109 may perform layer 5 through layer 7 classification. The network processor 112 processes the incoming information element and forwards it into the appropriate line card 100 within the system's backplane 121 using a switch fabric 115. Logically, the optical module 103 and the framer 106 perform layer one of the seven-layer Open Systems Interconnection ("OSI") Reference Model, whereas the network processor 112 and the classifier 109 handle layers 2 through 7. Processing intelligence, power, and bandwidth capacity are the biggest differentiation factors between network processors.

Among the single biggest limiting factor preventing the network processor 112 from meeting the internet bandwidth demand is Moore's law. Moore's law limits the advancement in semiconductor process technology to 18 months in order to achieve a 100% performance improvement. FIG. 2 shows Moore's law versus the internet bandwidth demand curve. As shown in FIG. 2, doubling every 18 months is far below the internet bandwidth demand, which doubles every four to six months. The current generation of network processors cannot scale by 4 times or 16 times within a two to three year window to meet the demand in internet bandwidth. The lifetime of today's network processors is short due to the dependency upon Moore's law. Breaking the Moore's law barrier is a non-trivial process.

The current techniques in network processor architectures are bounded by Moore's law. In general there are three approaches to the network processor architecture: using multiple reduced instruction set computing ("RISC") processors, using configurable hardware, and using a mix of RISC and configurable hardware.

For the first approach of using multiple RISC processors, the RISC processor architecture focuses on rapid and efficient processing of a relatively small set of simple instructions that includes most of the instructions a processor decodes and executes. The RISC processor architecture and instruction set are optimized for human-to-machine interaction. They are, however, not optimized for the high-bandwidth machine-to-machine interaction occurring in network equipment. With multiple RISC processors, it is not clear whether there is an actual increase in performance due to the parallel processing. The multiple RISC processors do not increase the performance in a linear fashion due to a decrease in efficiency incurred with the bookkeeping and coordination resulting from the multiple processor implementation. The multiple processor approach may serve aggregated traffic through intelligently distributing threads of traffic to different processors. The balancing of each processor's load itself is an expensive task for the processor to perform. The process of balancing the load uses otherwise productive bandwidth and will not provide enough horsepower for a single heavy traffic stream. The parallelism in such traffic may not exist.

When using multiple RISC processors, another severe limiting factor is the complexity of the software compiler, scheduler, and kernel to efficiently control the processor's operation. Creating a new customized network processor operating system ("NPOS") is not the solution to the explosive demand in bandwidth, especially when Moore's law (hardware) cannot even meet this demand. Use of the NPOS means significant software resources to architect, create, implement, test, support and maintain it. Use of the NPOS results in significant performance degradation coupled with a non-deterministic architecture.

For the second approach, use of configurable hardware results in the highest performance processor. In addition, the simple software interface usually used in configurable hardware minimizes performance degradation. Eliminating any software within the information path and replacing it with configurable gates and transistors significantly boosts the performance of the network processor. This approach, without any creativity within the architecture, is still bounded by Moore's law.

For the third approach, use of a mix of RISC processors and configurable hardware has two different variations. The first variation uses the RISC processor in a portion of the data path and the other variation uses the RISC processor in the control path only. For the first variation where the RISC processor is placed in the data path, the RISC processor in the path does not optimally process the high-bandwidth data traffic coming from network equipment because the RISC processor is not designed for this purpose. Currently, RISC processors are being used as graphics processors and digital signal processors ("DSPs") and have been tailored to meet the demands of these applications. Unfortunately, the general nature of network traffic processing is completely different from graphics processing or digital signal processing, and the RISC processor architecture, which is based on techniques created decades ago, becomes a big burden for network traffic processing. For example, in a DSP, the execution unit is processing at a rate that is orders of magnitude faster than the data it is executing (i.e., the execution unit can easily process the incoming data). In other words, the data is relatively static in comparison to the execution unit. This is the case in both graphics and digital signal processing. In contrast, the information, data, voice and video entering at the ingress of a network processor is traveling at a very high speed and the growth rate of the line rate correlates with the bandwidth demand curve.

In addition, the RISC processor operands are typically either 32 or 64-bits, but these sizes are not suitable for network traffic processing where the information (operand) is much larger than 64-bits. In the prior art RISC processor architecture, the execution unit not only operates on short and fixed operands but also has a simple and primitive instruction set that performs functions such as load and store. The typical RISC instruction set is designed to process algorithms. Many critical networking functions cannot efficiently utilize the arithmetic logic unit found in RISC processors. As a result, in addition to the low performance provided when performing networking functions, these arithmetic logic units waste silicon space. Moreover, the RISC instruction set is optimized for register-to-register operations. Performance of memory and input and output ("I/O") operations are orders of magnitude behind the performance of register-to-register operations. When processing network traffic, the performance of memory and I/O operations are as important or more important than register-to-register operations.

When RISC processors are used in the data path, they do not take advantage of the memory hierarchy of the RISC processor (e.g., in a RISC processor, the memory hierarchy may include a cache memory, main memory, etc.) that is optimized for memory locality. In networking applications, the traffic flows through the RISC processor without any locality. Placing a RISC processor in the data path causes only a small number of registers within the processor to be used by the traffic in the data path. In this case, the memory performance is almost as bad as the I/O performance.

Minimizing or eliminating context switching is important when processing dynamic traffic patterns of multiple streams and multiple services. Context switching is the act of turning the processor's resources from one task to another. An additional problem of using RISC processors in the data path is the context-switching penalty. When multiple processes share the same processor, the small register set and window of the processor causes frequent context switching. The frequent context switching takes away useable bandwidth from the processor. In networking functions, thousands of unpredictable traffic streams enter the processor and utilize different services and thus different processing units are invoked which, when using the RISC processor, result in a large number of context switches.

In addition to taking up otherwise useful processing bandwidth, context switching introduces a non-deterministic nature when processing networking functions. The non-deterministic nature includes, for example, not being able to predict or know when a packet will be output from the egress point. It is desirable that the processing of real time networking functions be deterministic. FIG. 3 shows the processing and context switching occurring in a prior art RISC processor 201 performing networking functions. Here, an incoming information element 204 (the information element is described below) belonging to a first flow is processed by a process 205. The process 205 executes primitive instruction set 206 such as "load", "store", "add", and "sub" instructions to accomplish complex networking functions such as policing, encapsulation, forwarding, and switching. Another incoming information element 208 belonging to a second flow is processed by process 209. Similar to the process 205, the process 209 also executes a primitive instruction set 210 such as "load", "store", "add", and "sub" instructions.

Processes 205 and 209 use a common set of registers 211 to store information specific to that process. When the prior art processor changes from servicing process 205 to servicing process 209, a context switch 212 occurs in which the information pertaining to process 205 is removed from the registers 211 and stored in a stack and the information pertaining to process 209 is moved into the registers 211. The context switch 212 results in a register swap 214. The register swap 214 is the act of replacing, in the registers 211, the data of the old process with the data of the new process (i.e., the data in the registers for the old process is saved and the data for the new process is loaded into the registers). Because an indeterminate number of context switches occur before either the process 205 or the process 209 completes, these processes are non-deterministic as their time for completion is unknown. In addition to this non-deterministic nature, the context switching of processes that is inherent within the prior art RISC processor adds a substantial number of non-productive clock cycles (i.e., clock cycles are wasted storing the register data of the old process and loading the data of the new process into the registers).

As the number of flows supported increases, the number of different processes that the RISC processor supports also increases (each flow usually executes a different process since each flow uses a different service) resulting in the RISC processor performing more context switches. The flow is a connection of two end nodes in a connectionless protocol. The end node can be two computers or the software running in the computers. As more context switches occur, the performance of the RISC processor degrades due in part to the overhead involved with increased context switching. This overhead includes the time used for scheduling and the time used to perform the register swaps.

For the second variation, using a RISC processor in only the control path does not produce improved processor performance or overcome Moore's Law without creativity in the architecture that processes the incoming network traffic.

The present invention pertains to a processor that overcomes the problems described earlier for processing network traffic. In addition, the processor provides deterministic behavior in processing real time network traffic.

SUMMARY OF THE INVENTION

The present invention includes a network processor for processing information elements, wherein each information element is associated with a flow and comprises at least one information element segment. A policy controller stores an information element into at least one information segment storage unit within a memory, and determines whether an information element segment conforms to a predetermined quality of service ("QoS"). A traffic processor selects the information element segment for forwarding based on at least one QoS parameter. A forwarding processor forwards the selected information element segment to an egress port.

The traffic processor may include at least one shaper and at least one group of shapers. Each shaper may be associated with an egress port and at least one flow. The shaper may be governed by at least one QoS parameter. A group arbiter arbitrates among the at least one group to select a group. A shaper arbiter arbitrates among the at least one shaper within the selected group to select a shaper. A traffic scheduler schedules for forwarding an information element segment associated with the selected shaper.

BRIEF DESCRIPTION OF THE DRAWINGS

FIG. 1 illustrates a prior art line card 100 and its components.

FIG. 3 shows the processing and context switching occurring in a prior art RISC processor performing networking functions.

FIG. 4 shows an embodiment of the parallelized segment generation according to the present invention.

FIG. 5 shows an embodiment of the ingress portion of a network processor according to the present invention.

FIG. 6 shows an example of information element chains according to the present invention.

FIG. 7 shows an embodiment of an ingress-to-egress interface according to the present invention.

FIG. 8 shows an embodiment of an egress portion according to the present invention.

FIG. 8A illustrates a traffic processor according to an embodiment of the invention.

FIG. 8B illustrates data structures relating to port parameters, group parameters and shaper parameters according to an embodiment of the invention.

FIG. 8C illustrates the organization of the shapers of an embodiment of the invention, including group arbitration counters and shaper counters.

FIG. 8E illustrates an example of arbitration for a single-port configuration, according to an embodiment of the invention.

FIG. 8F is a flow chart illustrating a scheduling algorithm according to an embodiment of the invention.

FIG. 8G illustrates a traffic processing instruction according to an embodiment of the invention.

FIG. 8H illustrates a traffic processing state according to an embodiment of the invention.

FIG. 9 shows an embodiment of an input/output unit according to the present invention.

FIG. 10 shows an embodiment of the packet parsing unit according to the present invention.

FIG. 11 shows an embodiment of the indirect first key formation system according to the present invention.

FIG. 12 shows an embodiment of a payload parsing instruction according to the present invention.

FIG. 13 shows an embodiment of a direct first key formation system according to the present invention.

FIG. 15 shows a second embodiment of the packet parsing unit according to the present invention.

FIGS. 16a-b show a second embodiment of the external CAM lookup system according to the present invention.

FIG. 17 shows a prior art exception processing system.

FIG. 18 shows a first embodiment of an exception processing system according to the present invention.

FIG. 19 shows a second embodiment of an exception processing system according to the present invention.

FIG. 20 shows a third embodiment of an exception processing system according to the present invention.

FIG. 21 shows an embodiment of a switch fabric interface according to the present invention.

FIG. 22 shows an embodiment of a backpressure management system according to the present invention.

DETAILED DESCRIPTION OF THE INVENTION

Figures 2, 8D:
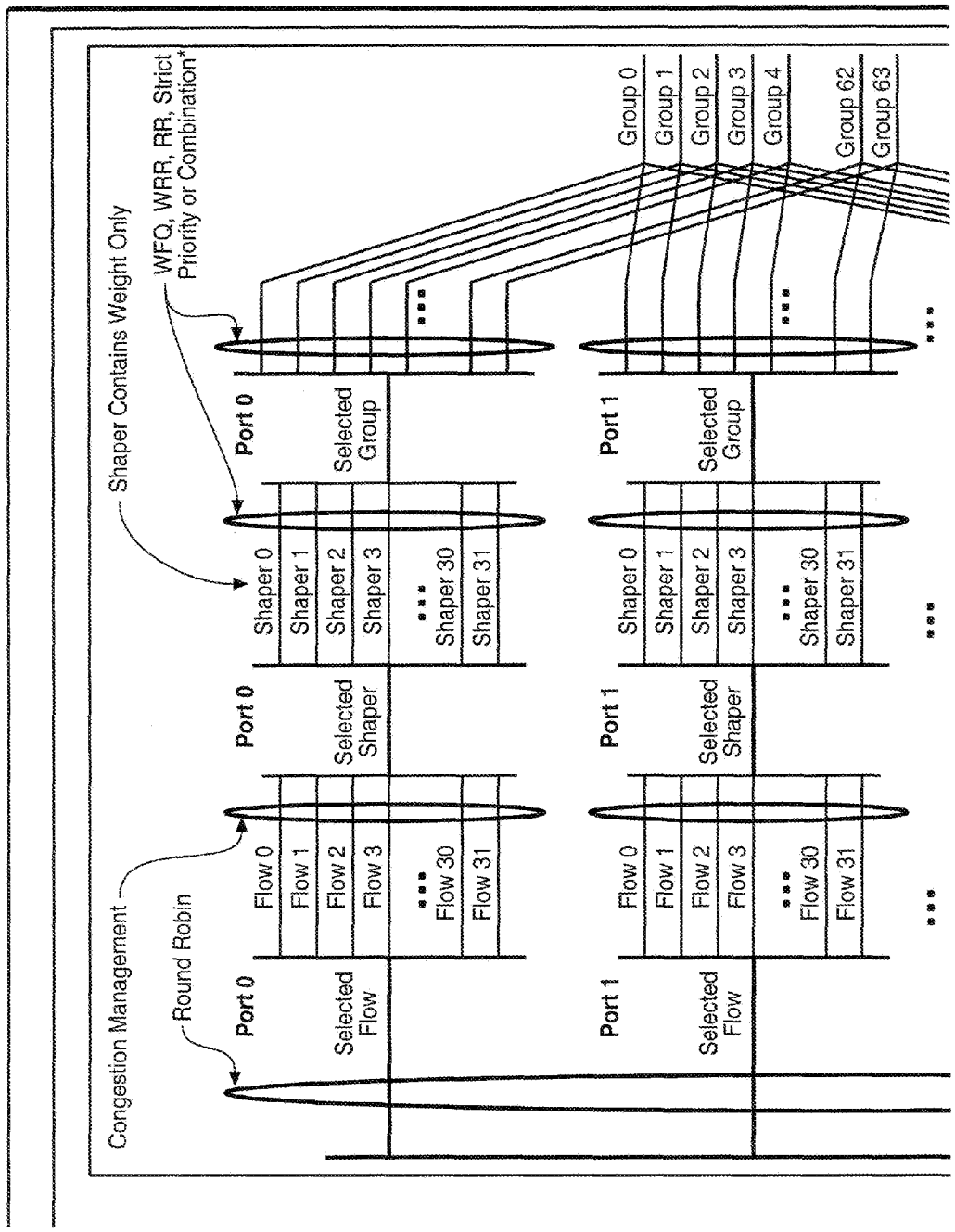
FIG. 2 shows Moore's law versus the internet bandwidth demand curve.
FIG. 8D summarizes the hierarchy of arbitration and an example of what algorithms may be supported at each level, according to an embodiment of the invention.

One embodiment of the present invention is a processor that optimally processes network traffic (this processor is hereinafter referred to as a "network processor"). In this embodiment, the network processor guarantees deterministic behavior by eliminating context switching. Also, multiple instruction single data ("MISD") processors are used in some units within the network processor (e.g., the policy control unit ("PCU") uses a MISD processor). As described below, these processors are configured to directly process the incoming data segments that are in a parallel format. In order to process the parallelized data segments, the pipeline has a large width. Very long instructions instruct the MISD processor to perform various functions on the incoming data segments. This embodiment is able to guarantee and sustain a particular line rate performance regardless of incoming traffic patterns and network services contracted for by the subscriber. The line rate is guaranteed regardless of the number of processing functions executing in parallel. The network processor also includes a traffic manager.

This embodiment of the network processor divides the incoming information element into 64-byte segments, rotates each segment 90 degrees, and sends each segment serially through one of several pipelines. Note that the term "information element segment" or "information segment" as used herein may encompass the entire information element (e.g., when the information element is not divided into multiple segments for storage into multiple buffers) or only a portion of the information element (e.g., when the information element is divided into multiple segments for storage into multiple buffers). FIG. 4 shows an embodiment of the parallelized segment generation according to the present invention. A framer 106 groups the serial bits arriving from a line 229 into segments. In this embodiment, the framer 106 groups 512 serial bits into eight 64-bit segments (e.g., as shown in FIG. 4, each of the segments has a dimension of 64×1 and each of the bits are parallel to each other in the vertical direction). A network processor 220 includes an input/output unit ("I/O Unit") 223 and a PCU 226. Each of the 64-bit segments are sent to the I/O Unit 223 via a 64-bit bus. The I/O unit 223 groups the 8 64-bit segments into 4 128-bit segments (e.g., as shown in FIG. 4, each of the segments has a dimension of 128×1 and each of the bits are parallel to each other in the vertical direction). Each of the 128-bit segments are sent to a PCU 226 via, for example, a 128-bit bus. The PCU 226 groups the 4 128-bit segments into a single 512-bit segment and sends this 512-bit segment through a pipeline. The pipeline is 512-bits wide. As shown in FIG. 4, the 512-bit segment has a dimension of 512×1 and each of the bits are parallel to each other in the vertical direction. Grouping and rotating a segment means that a group of incoming segments arriving serially are combined to create a single segment that includes all the bits of the incoming segments, and the single segment has all of its bits parallel to each other in the vertical direction.

The PCU 226 and an access processing unit ("APU") within a forward processing unit are MISD processors. All the stages within the pipeline of the MISD processor are working on information elements in parallel. As the data moves to the next stage of the PCU pipeline, a new information element segment can be processed by the previous stage. By using the present embodiment of the MISD processor, multiple instructions are fetched in one memory access and these instructions operate on a single one of the incoming information element segments. On the other hand, in single instruction multiple data ("SIMD") processing within a multithreaded prior art RISC processor, one instruction is fetched and this instruction operates simultaneously on multiple data streams on multiple processors.

The information element, may be, for example, a single cell (a fixed-length packet which is the basic transmission unit on high-speed networks such as an asynchronous transfer mode ("ATM")), or the entire packet (a packet is a bundle of data, usually in binary form, organized in a specific way for transmission). The size of the information element can be fixed or variable. The information element also includes units of information other than packets or cells. The information element may be comprised of data, voice and video. The information element can be, for example, an ATM cell, or an internet protocol ("IP") packet. Unlike the information element of a RISC processor which is either 32-bit or 64-bit data or operand, the size of the information element may be much larger than 64-bits.

In this embodiment, the MISD processor is a data flow machine that is triggered by the availability of data. The time of executing operational flow (e.g., incoming data) is not decided by instruction sequence, but rather, depends on the arrival and sequence of the data. In the prior art processor, the incoming data is stored in memory and the data is fetched from memory when an instruction references that data. This embodiment of the MISD processor, however, processes the incoming information element segment directly (i.e., it does not first store the data into memory). The arrival of the incoming segment triggers execution of that data (i.e., the arrival of the incoming segment causes it to be sent through the pipeline of the processor). The arrival of the information element segment causes the fetching of a very long instruction and registers corresponding to the flow to which the segment belongs.

In this embodiment, each of the MISD processors within the network processor supports up to 64K (i.e., 65,536) independent and distinct very long instructions. Each very long instruction is treated as a unique process to the MISD processor. Each MISD processor supports up to 64K simultaneous processes by providing an adequate number of registers to each process in order to completely eliminate space resource conflicts. Eliminating space resource conflicts reduces context-switching time to a minimum, in fact, reducing it so that the context-switching time is zero or substantially close to zero. Embedded dynamic random access memory ("DRAM") stores the distributed instructions and registers for each process.

FIG. 5 shows an embodiment of an ingress portion of the network processor 220 according to the present invention. The ingress portion 115 includes the I/O unit 223. Input and output ports of the I/O unit 223 may be coupled to either the line 229 or to a switch fabric. The switch fabric is a device that interconnects all the cards within a card shelf. The I/O unit 223 delivers the incoming information element received at one of its ports to a packet parsing unit ("PPU") 156. The PPU 156 identifies a flow to which the incoming information element belongs. The PPU 156 may access a content addressable memory ("CAM") 174 in order to identify the flow to which the incoming information element belongs. In this embodiment, the CAM 174 is external to the network processor 220. In another embodiment, the CAM 174 may reside within the network processor 220. The information element including the flow identifier of the flow to which that information element belongs is sent to the PCU 226. For further information, see U.S. patent application Ser. No. 10/251,946, filed May 20, 2002, entitled "Vertical Instruction and Data Processing in a Network Processor Architecture"; and U.S. patent application Ser. No. 10/035,571, filed Oct. 22, 2001, entitled "Memory Management System and Algorithm for Network Processor Architecture," both of which are incorporated by reference herein in their entirety. All patent applications and patents mentioned herein are incorporated by reference herein in their entirety.

The arrival of the information element at the PCU 226 triggers instruction and state fetches from storage. Using the flow identifier, a policy control instruction ("PCI") corresponding to that flow is fetched from storage. The PCI is a very long instruction that includes encoded machine codes. These very long instructions are compressed and specially coded to fit into a fixed length that is optimal for very-large scale integration ("VLSI") implementation. In this embodiment, that fixed length is 32-bytes but other embodiments of this invention are not limited to that specific length. The 32-byte very long instruction is composed of multiple smaller sets of basic instructions. A translator residing within the PCU 226 transforms the 32-byte very long instruction into simple high-level command language.

As dictated by the very long instruction fetched, the PCU 226 performs functions on the incoming information element. The functions performed include storing the information element into one or more information segment storage units (e.g., buffers); policing the information element to determine if it conforms to usage parameters; controlling and avoiding buffer congestion, some of which store the information element; parsing the information element to determine its type; encapsulating and removing the information element header in order to, for example, change the information element's protocol; and reassembling any segmented information elements.

A policer unit within an execution stage of the PCU 226 uses a metering unit to perform policing functions. The policing functions check the conformance of the flow to which the incoming information element belongs to its traffic agreement. For example, the incoming information element can be checked to determine whether it conforms to a peak cell rate and a committed rate. For non-conforming cells, further actions such as tagging or dropping may be applied to the information element. The policer unit uses a storage congestion control unit to implement a Weighted Random Early Discard ("WRED") mechanism to control congestion and manage the information segment storage unit resources within the storage unit 171. The storage unit 171 is divided into some number of "classes", for example, 256 different classes. A group of flows are mapped to each of the classes. The number of different classes varies. For example, in another embodiment, the number of classes equals the number of flows and each flow is assigned to a different class. The WRED algorithm randomly discards information elements when the group of flows uses its assigned class above a certain threshold.

The register write back ("RWB") stage of the PCU pipeline includes a marking unit to mark the incoming information element based on the result of either the metering unit or the WRED unit. Marking allows devices outside the network processor to decide whether that information element should be discarded. The output of the metering function and the output of the WRED unit are input into the marking unit. The marking unit marks the information element with one of several levels to indicate the desirability of discarding the information element. For example, an information element may be marked green to indicate that its conformance is below a first threshold level and thus no action, such as discarding, should be performed. If the information element is between the first threshold level and a second threshold level, then it may be marked yellow to indicate that it is bordering on nonconformance. If the information element is above the second threshold level, then it may be marked red to indicate that its nonconforming and another device may want to consider discarding it.

When the network processor is in a cell-to-packet ("C-P") mode, the storage of the incoming cells into information segment storage units involves reassembling the interleaved cells arriving from the I/O unit 223 to packets before informing a TPU 162 and a FPU 165 for scheduling and forwarding, or before informing an internal control-path processing unit ("iCPU") or an external control-path processing unit ("eCPU") using a host interface unit ("HIF") 229 if the packet is intended for either of those two CPUs. A link management unit within the PCU 226 performs the reassembly to packets as instructed by the PCI. In the C-P mode, the incoming information elements that are cells are stored in the information segment storage units and when the last information element of the packet is received, then it is written to the information segment storage unit and the information segment storage unit's header signifies that its an end-of-packet. When the last information element of the packet is received, then the PCU 226 sends a packet ready queue command to the interface unit. In this embodiment, bit 63 of the information segment storage unit within its header field identifies the end-of-packet ("EOP"). If the incoming information element is to be further processed such as the case in which it produces an exception, then the information element is sent to the eCPU. In a cell-to-cell ("C-C") mode or a packet-to-cell ("P-C") mode, the incoming cells are stored without performing any reassembly. The PCU 226 may also remove the header from the information element and encapsulate another header in order to convert the protocol from one type to another. If the information element successfully completes the policing and congestion avoidance functions, then the information element is stored within a storage unit 171 using a data buffer unit ("DBU") 168 or sent to the iCPU or the eCPU for further processing.

If the information element is a control type or the information element is a data type that produces an exception, then the PCU 226 may either store this information element within the storage unit 171 and then notify the external processor or directly send the information element to the external processor. If the information element is to be stored, then the PCU 226 stores the incoming information element within the storage unit 171 using the DBU 168. By using the PCI corresponding to the incoming information element, the PCU 226 determines whether to notify a forwarding processing unit ("FPU") or the external processor that the incoming information element was stored. In the case where the incoming information element is a data type then the traffic processing unit ("TPU") and the FPU are notified, and in the case where the incoming information element is a control type or it is a data type but further processing is to be done by the external processor before storing it, then the external processor is notified.

The PCU 226 aligns the incoming information element into a information segment storage unit. The information segment storage unit may be of any length such as 64-byte or 128-byte. The DBU 168 interfaces with the storage unit 171. In this embodiment, the storage unit 171 includes multiple banks of dynamic random access memory ("DRAM").

The PCU 226 includes a link management system that produces for each of the flows currently managed by the network processor 115 a chain of information segment storage units. The link management system allocates buffers for the chain representing the flow but the actual writing of the data to the storage unit 171 is performed by a register write back stage and the alignment unit of the PCU. FIG. 6 shows an example of information element chains according to the present invention. The one or more information elements belonging to a flow are stored in a chain of information segment storage units. In FIG. 6, the information elements belonging to a flow 500 are stored in a chain of 128-byte information segment storage units and include the information segment storage units 502-510. The information elements belonging to a flow 512 are stored in a chain of 64-byte information segment storage units and include the information segment storage units 514-518. For flow 500, the information segment storage unit 502 and the information segment storage unit 504 together comprise the first packet, and the information segment storage unit 506, the information segment storage unit 508 and the information segment storage unit 510 comprise the second packet. For flow 512, the information segment storage unit 514 and the information segment storage unit 516 together comprise the first packet and the information segment storage unit 518 comprises the second packet.

Each of the information segment storage units has a packet header 520 and a buffer header 522. The packet header 520 is valid only at the beginning of the packet and includes information about the packet. Other buffers that comprise the packet have the space allocated for the packet header but such packet headers are not valid. The buffer header 522 keeps the buffer pointer of the next buffer when building the chain. The buffer may be of any size. The buffer header 520 includes a "next flow-id" field that is the flow-id of the next packet. This is used for the unassigned bit rate ("UBR") chains since they do not have a flow-id associated with them when they are being scheduled. These UBR chains are linked on a per-packet basis, therefore, packet link information is provided. This is only valid in the EOP buffer. The buffer header 520 also includes a "number of buffer" field that is the number of buffers in the packet. This field let the FPU knows how many buffers needed to be discarded if a "packet discard" bit is set. The "CI" field is a congestion indication field. The "PDIS" field indicates that this packet is to be discarded. When this bit is set, the FPU discards all the buffers belonging to this packet (using the "number of buffer" field.

The buffer header 522 includes an "ATM Header" field which is the ATM header of a cell within this buffer. This ATM Header is attached to the front of the cell when the FPU forwards this cell. The "next buffer pointer" field is the pointer to the next buffer address of the packet. The "valid length" field is the valid number of bytes within this buffer. The "last buffer" field indicates whether this buffer is the last buffer of the packet. The FPU can do appropriate EOP processing when this is encountered. The next buffer in this chain is a start-of-packet ("SOP"). The FPU uses the SOP to do appropriate processing.

When the information element arrives at the PCU 226, a flow-id identifying the flow to which the incoming information element belongs is determined by a packet parsing unit ("PPU") as described in greater detail below. Using the flow-id, the PCU 226 fetches a policy control state ("PCS") corresponding to that flow. The PCS includes a "current buffer pointer" field to indicate the address of the information segment storage unit within the storage unit 171 at which the incoming information element is to be stored. When the information element arrives, this field is used as the address of the buffer to store the new information element. This address pointer always points to one of the four memory channels as explained in U.S. patent application Ser. No. 10/035,571, filed Oct. 22, 2001, entitled "Memory Management System and Algorithm for Network Processor Architecture," which is incorporated by reference herein in its entirety. If the flow is in the C-C mode or the P-C mode, the PCU 226 within the register write back ("RWB") stage writes the information element to the information segment storage unit having the address "current buffer pointer". If the flow is in the P-C mode or the P-P, then the alignment engine within the PCU writes the incoming information element to the information segment storage unit having the address "current buffer pointer".

FIG. 7 shows an embodiment of an ingress-to-egress interface 448 according to the present invention. In FIG. 7, a storage unit 171 stores data (e.g., information elements) within information segment storage units. The storage unit 171 includes a "region 2" memory and a "region 4" memory. The "region 2" memory stores information elements that are, for example, to be shaped and later output by the network processor 220. The "region 4" memory is used to store information elements that are destined for or received from an outside processor 425. The "region 4" memory is used by the network processor 220 to communicate with the outside processor 425. The functions performed by the outside processor 425 include handling exceptions produced by the network processor, initializing the instructions and states for the PCU 226, the TPU 162, and the FPU 165 (e.g., the PCI and the PCS), shaper programming, and shaper probing. The HIF 229 is the interface between the network processor 220 and the outside processor 425. The PCU 226 stores an incoming information element into information segment storage units within the storage unit 171. Upon receiving all of the information element (e.g., upon receiving the cell or all of the packet), the PCU 226 sends a packet ready queue command ("PRQ command") corresponding to this information element to an interface unit 455 via a multiplexer 450. The interface unit 455 interfaces the PCU 226 with the egress portion of the network processor (e.g., the TPU and the FPU). The egress queuing unit 456 fetches one of the PRQ commands from the interface unit 455. The egress queuing unit 456 updates, for example, an active flow table 162 with information from the fetched PRQ command. Each entry of the active flow table corresponds to a flow supported by the network processor. An entry may be set to indicate that a corresponding flow is active, i.e., has at least one information element segment ready for forwarding. The active flow table 162 may be, for example, a bitmap with each bit representing a flow, wherein a bit set to "one" indicates that the corresponding flow is active.

In addition, the egress queuing unit 456 updates the FPS 166 from the information provided by the PRQ command 465 so that the FPU has updated flow information. For example, the "current buffer pointer" field of the FPS 166 is updated with the "first buffer pointer" field of the packet ready queue command 465. In addition, the "last buffer pointer" field of the FPS 166 is updated with the "last buffer pointer" field of the packet ready queue command 465. The egress queuing unit 456 also updates an unassigned bit rate ("UBR") chain 459 if the flow to which the packet ready queue command belongs is a UBR flow. In the UBR mode, the egress queuing unit 456 links the one or more information segment storage units belonging to the information element to the appropriate one of the chains belonging to the physical output port assigned to the flow to which the information element belongs. The physical output port of the flow to which the information element belongs is specified by the "physical port" field of the packet ready queue command 465.

Each of the packet ready queue commands 465 stored within the interface unit 455 includes the flow-id for the information element (the "flow id" field); the particular one of the 2048 shapers to which the flow associated with this information element is assigned (the "shaper number" field); the one of 32 queues within (i.e., associated with) the particular one of the shapers that stores the flow to which the information element belongs (the "shaper offset" field); the size of the payload to be transmitted (the "size" field); the physical I/O port number at which this information element is to be transmitted (the "physical port" field); the type of data being passed to the FPU 165 for forwarding (the "DT" field); the source of information element, that is, where the FPU retrieves the information element in order to output if through the appropriate I/O port (the "DS" field); the information segment storage unit pointer of the last information segment storage unit in the list for this information element (the "last buffer pointer" field); the information segment storage unit pointer of the first buffer in the list for this information element (the "first buffer pointer" field); whether the "first buffer pointer" field contains the last information segment storage unit for this information element (the "LBUF" field); whether the "first buffer pointer" field contains the first pointer of the list for this information element (the "first buffer pointer" field); and the payload channel sequence number of the first or last buffer of this information element used to determine the last information segment storage unit for this information element (the "CSN" field). The "shaper number" field and the "shaper offset" field are provided by the PCI.

If the information element generates an exception or the information element belongs to a control flow and depending on the exception path configured for the flow to which the information element belongs, the PCU 226 may send the information element to the outside processor 425 using the HIF 229, or the PCU 226 may store the information element in the "region 4" memory within the storage unit 171 using the HIF 229. If the information element generating the exception is configured to be sent to the outside processor, then the HIF 229 stores the information element into the "region 4" memory and the outside processor 425 fetches this information element from memory. The outside processor 425 processes the information element and if appropriate, modifies the information element to remove errors in the information element. Upon modifying the information element that generated the exception, depending on the exception path configured for the flow to which the information element belongs, the outside processor 425 may store the modified information element within "region 4" memory of the storage unit 171 so that the PCU 226 can process it and if it does not generate an exception again within the PCU, the PCU stores the modified information element within the "region 2" memory of the storage unit 171. The outside processor 425 may also send a PRQ command corresponding to the information element that produced the exception so that it can be processed by the egress portion of the network processor.

FIG. 8 shows an embodiment of an egress portion 550 according to the present invention. The egress queuing unit 456 fetches one of the PRQ commands from the interface unit 455. The egress quelling unit 456 updates the FPS 166 with the information provided by the fetched PRQ command. If the fetched PRQ command represents a UBR flow, then the information element represented by the PRQ command is added to the appropriate one of the UBR chains. The UBR chain assigned to the information element depends on the physical output port to which the flow of the information element belongs. For example, a first UBR chain is associated with a first physical output port, a second UBR chain is associated with a second output port, and a third UBR chain is associated with a third physical output port. The UBR chains receive a best effort scheduling so it does not use the TPU 162 for scheduling. The UBR chains are scheduled on a first-in-first-out basis. Each physical port has its own UBR chain to prevent head-of-line blocking. All flows destined to the same output port are linked to the same chain in the arriving order. The FPU 165 de-queues the chain in the first-in-first-out order. The FPU 165 process the UBR chains associated with output ports if there are no other flows scheduled to be output on that port. The PCU 226 creates this output port based chain (e.g., the chain may be in the form of a linked list) for the UBR mode.

An upper layer software stack which may reside within the embedded processor 550 performs functions such as initializing the group weights, the shaper rate counters, and the shaper weights. The HIF 229 is the interface between the network processor and an external processor and allows the external processor to, for example, directly access the FPU 165 in order to output a modified information element without first scheduling it using the FPU 165. The shaper parameters 564 are, for example, the weights (e.g., priorities) assigned to each shaper and group of shapers. Each shaper has a shaper counter.

The TPU 162 of the invention employs a sophisticated traffic management scheme for optimizing bandwidth while ensuring different QoS and CoS objectives. The TPU 162 includes a shaper arbiter 568, a group arbiter 566, a CBR flow identifier bitmap 572, a storage space such as a backpressure lookup table ("BPLUT") 575, and a scheduler 161.

FIG. 8A shows a simplified diagram of the TPU 162. As shown in FIG. 8A, the Traffic Processing Unit 162 includes the following three major components. Shapers 800 perform rate shaping, as is generally known in the art. Arbiters 802 prioritize traffic. The arbiters 802 of the invention include group arbiters 566 and shaper arbiters 568, as shown in FIG. 8. A scheduler 161 schedules different classes of traffic (e.g., CBR and VBR) for egress to an egress port, and performs flow control and congestion management.

According to one embodiment, the TPU 162 includes 2048 shapers with each shaper 800 supporting 32 flows 801 of information elements. Thus, the TPU 162 can process traffic for 2048×32=64K flows. (Those skilled in the art will recognize that the processing by the invention of a "flow" is equally applicable to a "virtual channel" ("VC") in the appropriate context, e.g., an ATM protocol. Accordingly, in most circumstances herein as would be understood by one of ordinary skill in the art, the term "flow" also refers to a virtual channel.) An associated rate parameter (e.g., peak cell rate ("PCR")) may be common to the flows associated with a shaper. Each shaper is associated with a physical egress port. In this example, there are 16 physical egress ports. The flows assigned to a port may all be governed by a service quality parameter (e.g., quality of service ("QoS") parameter) associated with the port.

In one embodiment, the 2048 shapers are allocated among 64 shaper groups (32 shapers per group). A physical port is assigned to every eight shapers within a group. Each set of shapers within a group that corresponds to a particular physical port will be denoted a "subgroup" herein. Each group may be assigned to four physical ports. Accordingly, instead of each group having 16 sets of attributes, one set for each physical egress port, each group has only four sets of attributes, one set for each physical egress port and associated subgroup. Each set of attributes is used during the arbitration of the corresponding physical port. Because, in this example, a priority is assigned to each port, all eight shapers associated with a particular port are associated with the same priority as the port. Those skilled in the art will recognize that the terms "priority" and "class" are effectively synonymous, with the former applying to ATM protocol and the latter applying to IP protocol. Thus, use of the term "priority" herein encompasses "class," where appropriate, as would be understood by one skilled in the art.

FIG. 8B summarizes the data structure for shaper arbitration. Please note that each row of the Shaper Group Information may also include a "Type" field indicating the dequeuing (i.e., egress arbitration) algorithm to be used for the associated shaper group. As shown in FIG. 8B, the following are static attributes for all shapers associated with a port in the group. The attributes are initialized at the beginning of arbitration and do not change while in operation.

Initial Weight for each subgroup—corresponds to the CoS objectives (e.g., priority).
Weight Control Option for each subgroup—this controls how the weights of the un-selected shapers are processed. Several options include:
Decrement by one every arbitration cycle until a subgroup is selected or the current weight value for the subgroup reaches zero
Decrement by one until the most significant bit of the weight reaches zero
No decrement
Physical Port Number—indicates the physical port number with which this set of attributes is associated.

The shaper group also maintains dynamic information including:
Valid—indicates that at least one shaper within the subgroup is valid
Current Weight—current weight of the subgroup for arbitration. It is loaded with the initial weight at the beginning and reloaded when the subgroup is selected (wins arbitration) and all the flows within the group's shapers are processed by the scheduler.

The group arbitration happens first. After a subgroup is selected, another level of arbitration is performed on the shapers within the selected subgroup. Each shaper is associated with the following static information:
VBR/GFR—when this bit is set, this indicates that at least one of the flows within the shaper is a VBR or a GFR flow. When this bit is set, this shaper needs to join the arbitration regardless of whether any of the queues within this shaper has data to send. This is because the VBR and GFR flows require processing even if they are not active.
Initial weight—corresponds to the CoS objectives (e.g., priority)

The following are dynamic parameters for each shaper:
Valid—indicates that the shaper counter has elapsed and [at least one flow within the shaper is active (has data queued for forwarding) or is a non-CBR (e.g., VBR or GFR) flow]. If there are no active flows within the shaper but if one of the flows is a VBR or GFR flow, this shaper needs to join arbitration so that the VBR or GFR flow can be processed correctly.
Current Weight—current weight of the shaper for arbitration. It is loaded with the initial weight at the beginning and reloaded when the shaper is selected and all the flows within the shaper are processed.
Shaper elapsed—indicates that the shaper counter has elapsed FIG. 8C illustrates the organization of the shapers, including the group arbitration counters 820 and 823 and shaper counters 822. The TPU employs a hierarchical counter scheme to implement counters for a large number of shapers while achieving substantial savings in chip real estate because fewer bits are needed than would be required otherwise if only one counter were employed. A hierarchical counter includes a plurality of subcounters, e.g., first, second and one or more third subcounters. The second subcounter counts only when at least one enable digit of the first subcounter is set to a first count enable value. The at least one enable digit of the first subcounter may be, for example, the most significant bit of a binary counter, and the first count enable value may be the binary digit "one."

The hierarchical counter may be employed to control the count rate of the one or more third subcounters. The one or more third subcounters count only when at least one enable digit of the second subcounter is set to a second count enable value. The at least one enable digit of the second subcounter may be, for example, all the digits of the second subcounter, and the second count enable value may be zero. The counting may be decrement counting or increment counting. In one embodiment, the first subcounter may be an incrementing counter, whereas the second and third subcounters may be decrementing counters. The first and second subcounters may be first and second group arbitration counters. The third subcounters may be shaper counters.

In particular, each group of shapers 800 includes the following subcounters for controlling the rate at which the shaper can join the arbitration:

A group counter 820—each with its own initial counter and priority values

A group fraction denominator counter 823 and

Thirty-two shaper counters 822—each with its own initial counter and priority values The group fraction counter 823 is a free-running counter running at the system clock rate. It is enabled when at least one flow belonging to a shaper 800 within the group associated with the counter is active. In one embodiment the fraction counter 823 is programmed as an accumulator to increment each clock cycle by the initial count value of the fraction counter. The initial value is programmable. In one embodiment, the group counter is enabled to decrement each clock cycle only when the most significant bit of the fraction counter 823 is set to one. When the group counter 820 counts down to zero, then all shaper counters within the group are decremented by one. After running down to zero, the group counter is reset to its initial value to reinitialize the counting process as long as the counter is enabled. When a shaper counter 822 counts down to zero, it will remain at zero until the shaper wins arbitration, at which point the value of the shaper counter 822 will be reinitialized to its initial value.

In this example, if subcounters were not employed, then the TPU 162 would require 2048 shaper counters 822 each using (9+15+7)=31 bits for counting, i.e., 63,488 bits. Instead, the hierarchical counter only requires [(9+15)=24] bits×64 groups+2048×7 bits, i.e., 15,872 bits for all shaper counters 822.

The hierarchical counter attributes (such as initial value) are set so that when a shaper counter 822 elapses (reaches zero), a peak cell rate period has elapsed. In this manner, the counter controls the rate of each associated flow after shaping. Because delays due to subsequent arbitration and scheduling are usually negligible compared to the period set by the shaper, the counter thus effectively controls the rate of egress of each flow from an egress port. The peak cell rate ("PCR") in cell/s is calculated as follows:

$$1/(\text{group counter}*(256/\text{group denominator})* \text{shaper counter}*\text{system clock period}).$$

Once the group counter 820 is programmed, the shapers 800 within that group will fall within a range of rates. The following Table 1 is an exemplary list of the ranges of rates that can be programmed using 5-bits of a group counter and 7-bits of a shaper counter and a fixed fraction.

TABLE 1

| Grp Counter | Shp Counter | Denominator | Max Rate | Shp Counter | Denominator | Min Rate |
|---|---|---|---|---|---|---|
| 1 | 1 | 256 | 70.67E+9 | 127 | 256 | 556.43E+6 |
| 2 | 1 | 256 | 35.33E+9 | 127 | 256 | 278.22E+6 |
| 3 | 1 | 256 | 23.56E+9 | 127 | 256 | 185.48E+6 |
| 4 | 1 | 256 | 17.67E+9 | 127 | 256 | 139.11E+6 |
| 5 | 1 | 256 | 14.13E+9 | 127 | 256 | 111.29E+6 |
| 6 | 1 | 256 | 11.78E+9 | 127 | 256 | 92.74E+6 |
| 7 | 1 | 256 | 10.10E+9 | 127 | 256 | 79.49E+6 |
| 8 | 1 | 256 | 8.83E+9 | 127 | 256 | 69.55E+6 |
| 9 | 1 | 256 | 7.85E+9 | 127 | 256 | 61.83E+6 |
| 10 | 1 | 256 | 7.07E+9 | 127 | 256 | 55.64E+6 |
| 11 | 1 | 256 | 6.42E+9 | 127 | 256 | 50.58E+6 |
| 12 | 1 | 256 | 5.89E+9 | 127 | 256 | 46.37E+6 |
| 13 | 1 | 256 | 5.44E+9 | 127 | 256 | 42.80E+6 |
| 14 | 1 | 256 | 5.05E+9 | 127 | 256 | 39.75E+6 |
| 15 | 1 | 256 | 4.71E+9 | 127 | 256 | 37.10E+6 |
| 16 | 1 | 256 | 4.42E+9 | 127 | 256 | 34.78E+6 |
| 17 | 1 | 256 | 4.16E+9 | 127 | 256 | 32.73E+6 |
| 18 | 1 | 256 | 3.93E+9 | 127 | 256 | 30.91E+6 |
| 19 | 1 | 256 | 3.72E+9 | 127 | 256 | 29.29E+6 |
| 20 | 1 | 256 | 3.53E+9 | 127 | 256 | 27.82E+6 |
| 21 | 1 | 256 | 3.37E+9 | 127 | 256 | 26.50E+6 |
| 22 | 1 | 256 | 3.21E+9 | 127 | 256 | 25.29E+6 |
| 23 | 1 | 256 | 3.07E+9 | 127 | 256 | 24.19E+6 |
| 24 | 1 | 256 | 2.94E+9 | 127 | 256 | 23.18E+6 |
| 25 | 1 | 256 | 2.83E+9 | 127 | 256 | 22.26E+6 |
| 26 | 1 | 256 | 2.72E+9 | 127 | 256 | 21.40E+6 |
| 27 | 1 | 256 | 2.62E+9 | 127 | 256 | 20.61E+6 |
| 28 | 1 | 256 | 2.52E+9 | 127 | 256 | 19.87E+6 |
| 29 | 1 | 256 | 2.44E+9 | 127 | 256 | 19.19E+6 |
| 30 | 1 | 256 | 2.36E+9 | 127 | 256 | 18.55E+6 |

TABLE 1-continued

| Grp Counter | Shp Counter | Denominator | Max Rate | Shp Counter | Denominator | Min Rate |
|---|---|---|---|---|---|---|
| 31 | 1 | 256 | 2.28E+9 | 127 | 256 | 17.95E+6 |
| 32 | 1 | 256 | 2.21E+9 | 127 | 256 | 17.39E+6 |

FIG. 8D summarizes the hierarchy of arbitration and an example of what algorithms may be supported at each level. The network processor supports at least two kinds of arbiters:

Rate-based arbiter—arbitrates among shapers that contains both rate and weight information. A shaper in this group only joins arbitration when its counter has elapsed (reaches zero). This is a non-work conserving scheduler, meaning that even if the queue within the shaper has data queued, it does not select the shaper if the shaper is not elapsed. In one embodiment, rate-based arbitration also relies on priority.

Priority-based arbiter—arbitrates among shapers that contain only weight information. A shaper in this group always has its counter elapsed; thus it always joins arbitration. This is a work conserving scheduler meaning it will always schedule if any of the queues have data queued.

The left side of FIG. 8D illustrates queue arbitration and scheduling based on both rate and priority (weight), whereas the right side illustrates queue arbitration and scheduling based on priority alone.

The rate-based or priority-based property is configurable on a per-port basis. If a port is configured to be rate-based, all the shapers configured to use this port are rate-based shapers, which, as described above, may also rely on priority. Similarly, if a port is configured to be priority-based, all the shapers configured to use this port are priority-based.

There are differences between these two arbiters. The rate-based arbiter uses a "snap shot" approach when arbitrating the shapers within a group. After the group arbitration, a group is selected and passed to the shaper arbiter 568. The shaper arbiter 568 takes a figurative "snap shot" of all the valid shapers and arbitrates among these shapers. Only after all shapers within a group are processed does the group arbitration take place again. This is to guarantee that the elapsed shapers are processed in order to preserve the rate. It is possible when processing elapsed shapers, another shaper elapses and has a higher priority then the other shapers that elapsed earlier. If the snap shot approach were not used, the newly elapsed shaper would win the arbitration and would be processed next, which would add more jitter delay to the other shapers. The priority-based arbiter, however, does not need to implement this snap shot approach since it only tries to determine which valid shaper has the highest priority or which shaper is the next shaper in order if round robin is used.

The traffic processor 162 includes arbiters, as mentioned above, that perform arbitration among groups and shapers. The arbitration may occur on a per port basis. In a multiple port configuration, each group effectively can join at least four arbitrations at the same time (one arbitration for each port-specific subgroup). In one example, the arbiter processes one physical port at a time in a time slot (i.e., time division multiplex) fashion. For example, in a 16-port configuration, the first slot is assigned to port 0 and the second slot is assigned to port 1, etc. The first time around, the arbiter will arbitrate the groups (i.e., subgroups) that have valid shapers assigned to port 0. Next time, it will arbitrate the groups that have valid shapers assigned to port 1, etc.

The group arbiter 566 arbitrates among the groups to select a group. The shaper arbiter 568 arbitrates among the shapers 800 within (i.e., associated with) the selected group to select a shaper. The scheduler 161 schedules the flows within a selected shaper 800, in part according to service category type (e.g., CBR and VBR). In one embodiment, the scheduling may depend on factors such as egress port congestion, and whether the selected flow is active and/or valid.

A shaper 800 can service flows of different service categories during the same arbitration cycle. The group and shaper arbitrations can all use the same or different algorithms during each arbitration, e.g., strict priority, round robin, weighted round robin, weighted fair queuing or a mixture thereof.

The arbiters only arbitrate among groups and shapers that are valid. Each shaper 800 is associated with a priority and optionally a rate. If the shaper arbitration depends at least in part on rate, the shaper joins the shaper arbitration based at least in part on a shaper counter elapsing. In one embodiment of that case, the shaper joins arbitration if the shaper counter elapses, and (a) at least one flow in the shaper is a first type of flow (e.g., a non-CBR flow such as a VBR flow) (even if no such flow is active), or (b) if all flows within the shaper are second-type flows (e.g., CBR flows) and at least one such flow is active. In sum, a shaper can become valid based on the following logical expression: (Shaper elapsed) and ((one of the flows within the shaper is active) or (one of the flows within the shaper is a non-CBR (e.g., VBR or GFR) flow)).

In the case in which arbitration depends on both rate and priority, the shaper joining the arbitration and having the highest priority among all shapers having elapsed counters will win the arbitration. In case (a), if no first-type flow is active, then a credit is assigned to all first-type flows associated with the shaper, so that when one of such first-type flows becomes active during a subsequent scheduling cycle it will be more favored than otherwise to be scheduled for egress.

Each group is associated with a priority and optionally a rate. If the group arbitration depends on rate and priority, the group joins in arbitration based at least in part on one or more group arbitration counters of the group elapsing. (Those skilled in the art will recognize that, for arbitration occurring on a per port basis, references to "group" herein denote a subgroup, as will be apparent from the context.) The group also must be valid to join in arbitration, as indicated by the group valid bit. The group valid bit is defined as follows: (One of the shapers within the group is valid) and ((port congestion checking not enabled) or ((port congestion checking enabled) and (port not congested))). Note that the group arbitration counter must have elapsed for a shaper within the group to be valid.

The one or more group arbitration counters may include a group counter and a group fraction counter. If rate is a factor, then the group having the highest priority among the groups having an elapsed group counter will win the arbitration.

The TPU keeps a command count for each physical port in a multiple port configuration. An occupancy threshold for each physical port is set by the user. If the command count value is greater than the occupancy threshold of a port, then the physical port is considered to be congested.

The above conditions are valid only after the shaper has been initialized and started with a first packet queued to any of the flows within the shaper.

The network processor architecture provides several arbitration algorithms for serving the 64K queues (holding the flows):

Strict Priority
Round Robin
Weighted Round Robin
Weighted Fair Queuing
Mixed mode The network processor can support all of the above arbitration algorithms, which are generally known in the art, using the combination of the shaper counters and the weights. The network processor architecture supports up to 8-bits of weight (256 priorities) for scheduling. Each shaper subgroup has a 4-bit weight and each shaper has a 4-bit weight for a combined weight of 8-bits. Note that the above algorithms can be used for group and/or shaper arbitration in different combinations. These algorithms are described in more detail below in an example of their application to shaper arbitration (e.g., arbitrating among shapers assigned to a particular port). Based on the disclosure herein, one skilled in the art would know the specifics of implementing these algorithms for group arbitration, as well.

Strict Priority

The Strict Priority arbitration method can be supported with the shaper counter and the weight programmed as follows:

Shaper always elapsed (counters programmed always to be elapsed)
Weight does not decrement after each arbitration cycle In this setting, the valid shaper with the lowest weight (highest priority) wins arbitration. If there are multiple valid shapers with the same weight, then the shaper arbiter arbitrates these shapers in round robin order. It only schedules the next priority shaper when all higher priority shapers are not valid. This can result in starvation for the queues in the lower priority shapers.

Round Robin

The Round Robin method is a subset of the Strict Priority arbitration. In this case, all the weights are the same and the TPU schedules the valid shapers in round robin (i.e., the shapers joining arbitration win arbitration in round robin. There is no starvation in this scheme but no priority is achieved.

Weighted Round Robin

The Weighted Round Robin ("WRR") arbitration method can be supported with the shaper counter and the weight having the following conditions:

Shaper counter elapsed (i.e., wait for the shaper counter to elapse)
Weights are all the same and do not decrement In this setting, the TPU processes all the shapers at the same priority, and arbitration is based solely on the rate. In other words, among the shapers that have elapsed, WRR selects the winning shaper in round robin fashion.

Weighted Fair Queuing

The Weighted Fair Queuing ("WFQ") method can be supported with the shaper counter and the weight having the following conditions:

Shaper counter elapsed (i.e., wait for the shaper counter to elapse)
Weight decrements after each arbitration cycle—the lowest weight has the highest priority In this setting, the lowest weight (highest priority) shaper (with elapsed counter) wins. All other valid shapers that lost the arbitration have their weight decremented and rejoin arbitration in the next arbitration cycle. This takes care of the fairness, of the queues (and their associated shapers). No queue can be starved because eventually the shaper associated with the queue will have the highest priority. The bandwidth is allocated to the queues using the group/shaper counter.

Mixed Mode

A mixture of the shaper arbitration methods can also be supported since each mode is programmed on a subgroup basis. Different subgroups of shapers can be programmed according to different arbitration algorithms. For example, to support the mixture of strict priority arbitration and weighted fair queuing, the subgroup can be programmed to decrement the weight down to a certain value. All the values lower than this programmed value can be arbitrated according to strict priority. This means that the fixed-priority will always have higher priority than the WFQ because it has smaller weight values. Or vice versa, the strict priority can be of lower priority with the WFQ having higher priority.

FIG. 8E shows an example of arbitration for a single-port configuration. In the multiple-port configuration, the same arbitration is done on the basis of time-slot assignment, one port per time slot.

In the example, there are three groups (x, y and z) of shapers (for a particular port) with at least one shaper that is valid. These groups join arbitration with the weights $W_x <= W_y <= W_z$. Group x will win the arbitration since its weight $W_x$ is the smallest. A snap shot of the bitmap of the valid shapers within the group x is taken. At this time, there are 4 shapers (a, b, c, and d) elapsed. These shapers join arbitration with the weights of $W_x a <= W_x b <= W_x c <= W_x d$. The following will be the order of the shapers that win the arbitration: a, b, c, and d.

After a shaper has won arbitration, the scheduler 161 schedules flows within the shaper for egress to an egress port, as illustrated in FIG. 8F. FIG. 8F illustrates at least two inventive aspects of the invention:

1. A single shaper can service flows or virtual channels falling into different service categories. In other words, the 32 flows belonging to a single shaper can be of various service categories such, as CBR, VBR or GFR. (For the sake of convenience, arbitration/scheduling of GFR flows is not discussed in detail in sections of this application.)
2. The scheduler 161 includes a backpressure mechanism that is capable of temporarily parking the data in the payload memory. This invention utilizes the payload memory as a large buffer when the network is congested. With this invention, the network processor can tolerate a congested network for a much longer time period without losing or dropping any information elements.

The scheduling flowchart is triggered by one of two events:

1. When a particular shaper has won arbitration among the shapers. (There can be up to 2048 valid shapers at any time. Each shaper is assigned a unique physical port.); or
2. When a particular physical port transitions from a congested state to non-congested state (as indicated by the command count value) and a valid shaper associated with the port has won arbitration in a previous arbitration cycle.

When one of the conditions mentioned above occurs, the TPU scheduler 161 selects a valid physical port. In a multiple port configuration, the ports are selected in a round robin fashion. The scheduler 161 reads from the active flow table 162 a 32 bit value corresponding to the 32 flows associated with the shaper 800 that won arbitration for the selected physical port (with each set bit corresponding to an active flow). The scheduler 161 updates an active(pport) value in temporary storage with that 32-bit value (step 860).

The TPU scheduler 161 keeps a command count for each physical port in a multiple port configuration. An occupancy threshold for each physical port is set by the user. If the command count value is greater than the occupancy threshold of a port, then the physical port is considered to be congested. Port congestion checking by the TPU may be enabled or disabled. If enabled, then information elements are blocked from being sent to the congested physical port until it becomes uncongested.

If the port is congested or no valid shaper for that port has won arbitration, then the scheduler 161 selects a next port in a round robin fashion, until an uncongested port having a valid arbitration-winning shaper is found (if not, then the scheduler will wait until this condition is satisfied during a subsequent arbitration cycle) (step 860). Note that the invention employs pipelined processing, which allows multiple arbitrations to occur simultaneously in parallel.

When a shaper and a port are selected, the TPU scheduler 161 also fetches the CBR flow identifier bitmap 572. The CBR flow identifier is another bitmap structure having one bit for each flow. When a bit is set, the corresponding flow is a CBR flow, otherwise, it is of another service category.

The TPU scheduler 161 selects a flow to determine whether it should be scheduled. The flows can be selected for this determination based on simply stepping sequentially from bit 0 to bit 32 (corresponding to the flows) in the active(pport) register, or by other means (step 862). When a flow is selected, the command count for the selected port is incremented by one, under the assumption that a command to the FPU will be issued to send an information element from the selected flow to the selected egress port for egress (step 864). The scheduler 161 then determines the service category of the selected flow (step 866). If the selected flow is not in the CBR service category (CBR Flow=0), e.g., is a VBR flow, the TPU scheduler 161 fetches the Traffic Processing Instruction (TPI) and Traffic Processing State (TPS) (step 868). The TPI resides in an external SSRAM. The TPS resides within an internal DRAM embedded within the TPU.

FIG. 8G illustrates the TPI. The TPI is a per-flow traffic descriptor for the TPU 162. The TPU uses the TPI to shape and schedule the flow according to the traffic contract between a service provider and a customer. The upper layer software stack residing within the external processor 425 or the embedded processor 550 initializes all fields within the instruction when the flow is created. The network processor internal hardware does not modify or alter any of these fields. The fields of the TPI are described below, with the bits occupied by each field preceding the name of the field.

Double Word 0

[63] VALID (1) Valid

This field indicates that the flow is valid. The upper layer software stack initializes this field to 1 when the flow is created. Network processor internal hardware does not alter this field. The upper layer software can close down this flow by clearing this bit.

[62:61]SVC (2) Service Category

This field contains the service category of the flow. It is decoded as follows:

| 00 | CBR |
| 01 | VBR |
| 10 | Reserved |
| 11 | Reserved |

[60] RSVD (1) Reserved

[59] PKT (1) Packet

When set, this bit indicates that the flow is a packet flow. Even if the physical port indicates that the port is a cell flow, the TPU can overwrite this configuration with this field set to 1. In this case, the FPU will forward the entire packet per command, instead of one cell of the packet per command.

[58] MCAST (1) Multicast

This bit, when set, indicates that the flow is a Multicast flow. This information is passed to the FPU along with the FlowID and other information for the FPU to forward the data.

[57:46]EGRESS PORT (12) Egress Port

This field identifies the egress port for this flow. The TPU uses this field to determine the per-physical-port command queue to use when passing the command to the FPU for forwarding. The TPU passes this information along to the switch fabric interface via the FPU.

[45:38]PRIORITY (8) Priority

This field contains the priority of the shaper to which this flow is attached. It is further divided into two 4-bit priorities. The most significant 4-bit field is used as the group priority, and the least significant 4-bit field is used as the individual shaper priority. The TPU passes this priority along with the FlowID to the FPU when scheduling a cell from that flow. The FPU can pass the priority of this flow to the switch fabric in a tag.

[57:54]RSVD (4) Reserved

[53:43]RSVD (11) Reserved

[42:38]RSVD (5) Reserved

[37:19]SUSTAINED CELL RATE (19) Sustained Cell Rate

This field contains the Sustained Cell Rate for VBR flow. This field's unit is a cell slot. The TPU uses this to determine the increment to the bucket each time it schedules a cell for transmission.

[18:0] PEAK CELL RATE (19) Peak Cell Rate

This field contains the Peak Cell Rate of the VBR flow. The unit of this field is a cell slot. The TPU uses this field to determine the decrement value for the bucket each time the PCR (hierarchical) counter elapses.

Double Word 1

[63:59]RSVD (5) Reserved

[58:36]BURST TOLERANCE (23) Burst Tolerance

This field contains the Burst Tolerance for VBR flow. The TPU uses this field to check against the bucket for scheduling cells for this flow.

[35:34]RSVD (2) Reserved

[33:18]CURRENT FLOW ID (16) Current FlowID

This field contains the FlowID of this flow. This is used to issue the command to the FPU for forwarding. The FlowID is required since the TPU uses the flow's location within the shaper as the index to the Instruction and the State instead of using the actual FlowID.

[17:16]RSVD (2) Reserved

[16:0] RSVD (16) Reserved

FIG. 8H illustrates the TPS. The Traffic Processing State is a per-flow state for the Traffic Processing Unit. The TPU uses this to keep the current state of the flow in order to process multiple active flows simultaneously. The upper layer software stack initializes all fields within the state when the flow is created and does not alter them afterwards. The TPU maintains and controls these fields during normal operation. The fields of the TPS are described below.

[63:24]RESERVED (40) Reserved

[23] INVAL (1) Invalidate

This bit indicates that this flow is already scheduled to go to the FPU for clean up before being reused. When the Valid bit in the TPI is cleared, the TPU sends a command to the FPU for buffer recycling. The TPU sets this field after sending a buffer recycle command to the FPU; this avoids sending more than one command to the FPU for the same flow. The upper layer software is responsible for clearing this bit when creating a new flow. The following are the actions for various combinations of the Valid and Invalidate bits:

| TPI Valid | TPS Invalidate | Action |
| --- | --- | --- |
| 0 | 0 | Send buffer recycle command. |
| 0 | 1 | Skip. |
| 1 | 0 | Send forwarding command. |
| 1 | 1 | Invalid. |

[22:0] BUCKET (23) Bucket
Valid for VBR Flow Only.

This field contains the current bucket count of the VBR flow. The TPU uses this field to compare against the Burst Tolerance field within the TPI to determine whether or not to schedule a command from this flow to the FPU for transmission.

After fetching the TPS and TPI, the scheduling algorithm checks if the selected flow has enough credit to send a command to the FPU to send out an information element or segment. The algorithm uses a bucket variable to determine the credit. The bucket variable occupies bit zero through twenty-two of the TPS. The first check is to see if the value of the bucket Bs(f) is less than the period of the Peak Cell Rate (PCR or Ip(f)) of the flow (step 870). If the value of the bucket is less than the period of the PCR, then the algorithm clears a temporary register bucket value Bs'(f) to zero (step 872). If the value of the bucket is larger than the period of the PCR, then the temporary register is used to hold the value of the bucket minus the period of the PCR (step 874).

As described above, the group and shaper counters are set up to meet a PCR constraint. For example, an information element (e.g., a cell or packet) or an information segment (if forwarding, e.g., to a switch fabric) must be sent out (or, more accurately, be ready to join arbitration) every PCR period. Also, the egress rate must be within the burst tolerance for the flow. Non-CBR flows, such as VBR flows, may be bursty, however. That is, there may be no information elements in the flow ready for egress for a number of scheduling cycles, and then such an inactive period may be followed by a burst of information elements. As shown in the above example, if an information element is not sent out during a PCR period, the corresponding flow receives a credit equal to the PCR period. By awarding credit to such flows during inactive periods, the TPU 162 uses the credit during active periods to schedule for egress a sufficient number of information elements from such flows to meet the PCR parameter for the flow, while maintaining flow egress within the burst tolerance (as described in further detail below).

In the next pipeline stage, after the TPI and TPS are fetched, the TPU scheduler 161 also reads a status within the backpressure lookup table (BPLUT) 575 (step 876). The backpressure lookup table is stored in an internal SSRAM. The backpressure look up table contains the congestion status of the 4096 logical ports. Each logical port is associated with a CoS (e.g., priority) of a corresponding physical port. Therefore, since the network processor of the example herein has up to 256 priorities (8 weight bits) for 16 physical ports, there are 256×16=4096 logical ports. If a bit within the backpressure table is set to one, the corresponding logical port is congested. Otherwise, the corresponding port is not congested. Each entry of the BPLUT may be set by a congestion message from the corresponding logical port.

The next checkpoint determines whether this flow is a valid flow (step 878). The TPU scheduler 161 performs this check by examining at bit 63 of double word zero of the TPI. If this bit is set to one, then the flow is valid. Otherwise when bit 63 of double word zero is zero, the flow is invalid. Valid flows are those flows that have had bit 63 set by the upper layer software. In other words, the flow's instructions and states are all initialized and configured properly. If the flow is invalid, the next checkpoint is the invalidate bit within the TPS (step 880). If this bit is set to one, then this flow is already invalidated. In this case, the algorithm decrements the command count value by one since the VBR command to the FPU will not issue during this scheduling cycle (step 882).

The scheduler 161 algorithm next determines whether this is the last flow within the selected shaper (step 884). If it is the last flow within the selected shaper then the algorithm requests shaper arbitration by the priority arbitration block ("PAB")(i.e., the arbiters) to select another shaper assigned to the same physical port (step 886), if another valid shaper assigned to that port exists. The algorithm holds the newly selected shaper for later scheduling. If there are no more valid shapers assigned to any port that are left to be scheduled (step 888), the scheduling algorithm ends (step 890), and the TPU returns to arbitrating among the shapers. Otherwise, if there are more valid shapers, the algorithm goes back to the beginning and selects the next port and a shaper for that port (step 860). Note that even if the current flow is not the last flow in a currently selected, valid shaper, the algorithm still selects a new port and shaper if other valid shapers are available. In this manner, the scheduler 161 schedules one information element (or segment) for one port, and then moves on to schedule another information element (or segment) for another port to maintain fairness among the ports. For example, to achieve a 10 G rate for four ports, 2.5 G may be allocated to each port. The network processor rotates scheduling in the above manner to ensure that each port receives its allocated bandwidth.

If the invalidate bit within the TPS is not set to one, the TPU will issue a recycle command for the FPU by setting the invalidate bit within the TPS to one (step 892). After the TPS is set to one, the command count for the port is decremented by one since a VBR command will not issue during this scheduling cycle (step 894). The algorithm then proceeds to update the TPS value by writing into the TPS the new bucket value from the temporary register (step 896) to award a credit to this flow to be used during the next scheduling cycle.

The algorithm then proceeds to step 884 to determine whether this is the last flow within the selected shaper, followed by steps 886 and 888, eventually determining whether to return to the beginning of the algorithm (step 860) or proceed to the end (step 890).

If this is a valid flow (double word zero bit 63 of the TPI is set to one), then the algorithm checks the active bit of the selected flow (step 898). The active bit resides within the active bitmap described previously. If the bit for this flow within the active bitmap is zero, then this flow is inactive. This means that at this time, there are no packets or cells in the payload memory for this flow. In this case, the command count is decremented by one (step 894) since the VBR command will not issue during this scheduling cycle and the algorithm proceeds to update the TPS by writing the new bucket value from the temporary bucket register (step 896) to award a credit to this flow to be used during the next scheduling cycle.

The algorithm then proceeds to step 884 to determine whether this is the last flow within the selected shaper, followed by steps 886 and 888, eventually determining whether to return to the beginning of the algorithm (step 860) or proceed to the end (step 890).

If during the flow active check the bit within the active bitmap indicates that the flow is active, the algorithm checks the backpressure status of the logical port to which this packet or cell is destined (step 900). If the destination logical port is congested, the algorithm will not issue a VBR command to the FPU. In this case the command count is decremented by one (step 894) since the VBR command will not issue during this scheduling cycle and the algorithm proceeds to update the TPS by writing the new bucket value from the temporary bucket register (step 896) to award a credit to the flow to be used during the next scheduling cycle.

The algorithm then proceeds to step 884 to determine whether this is the last flow within the selected shaper, followed by steps 886 and 888, eventually determining whether to return to the beginning of the algorithm (step 860) or proceed to the end (step 890).

If the backpressure status of the logical port indicates that the port is not congested, the algorithm performs a comparison between the new bucket value within the temporary register and the value Bt(f) (step 902). The burst tolerance value is within the TPI. The burst tolerance is a measure of the number of consecutive PCR periods for which the network processor is permitted to send out one information element or segment per flow (each PCR period). This check determines whether there is enough credit to send a VBR command to the FPU. If the new bucket value is less than or equal to the burst tolerance then this VBR flow has enough credit at this time to send a VBR command to the FPU (i.e., that the FPU should send out for egress an information element or segment from a VBR flow). Otherwise, this flow needs to earn more credit before it can send a VBR command. If this flow does not have enough credit at this time, the algorithm decrements the command count port by one (step 894) since the VBR command will not issue during this scheduling cycle and updates the TPS value by writing the new bucket value within the temporary register into the bucket field within the TPS (step 896) to award a credit to the flow to be used during the next scheduling cycle.

The algorithm then proceeds to step 884 to determine whether this is the last flow within the selected shaper, followed by steps 886 and 888, eventually determining whether to return to the beginning of the algorithm (step 860) or proceed to the end (step 890).

Otherwise, if there is enough credit to send a command at this time, a second temporary bucket storage register Bs"(f) is used to store the value of the addition of the period of the sustain cell rate ("SCR") value Is(f) and the new bucket value Bs'(f) within the first temporary register (step 904). This discredits the flow for subsequent scheduling cycles to govern the rate of the flow in accordance with the SCR parameter. After the addition, the TPU issues a VBR command to the FPU command queue and updates the TPS (step 906).

The algorithm then proceeds to step 884 to determine whether this is the last flow within the selected shaper, followed by steps 886 and 888, eventually determining whether to return to the beginning of the algorithm (step 860) or proceed to the end (step 890).

If the service category check for this flow indicates that this is a CBR flow, the scheduling algorithm next checks the active bit within the active bitmap (step 908). If the bit within the active bitmap indicates that this CBR flow is inactive, then the algorithm decrements the command count for the selected port by one (step 910).

The algorithm then proceeds to step 884 to determine whether this is the last flow within the selected shaper, followed by steps 886 and 888, eventually determining whether to return to the beginning of the algorithm (step 860) or proceed to the end (step 890).

If the CBR flow is active, then at least one cell is in payload memory and the algorithm fetches the TPS and TPI (step 912). The algorithm next determines whether this flow is a valid flow (step 914). The TPU performs this check by examining bit 63 of double word zero of the TPI. If this bit is set to one, then the flow is valid. Otherwise when hit 63 of double word zero is zero, the flow is invalid. Valid flows are those flows that have been set-up by upper layer software. In other words, a flow is valid if its instructions and states are all initialized and configured properly. If the flow is invalid, the algorithm next checks the invalidate bit within the TPS (step 916). If this bit is set to one, then this flow is already invalidated. In that case, the algorithm decrements the command count by one since the CBR command will not issue during this scheduling cycle (step 910).

The algorithm then proceeds to step 884 to determine whether this is the last flow within the selected shaper, followed by steps 886 and 888, eventually determining whether to return to the beginning of the algorithm (step 860) or proceed to the end (step 890).

If the invalidate bit within the TPS is not set to one, the algorithm decrements the command count by one since the CBR command will not issue during this scheduling cycle (step 918). Instead, the algorithm issues a recycle command for the FPU and sets the invalidate bit within the TPS to one (step 920). The algorithm proceeds to update the TPS in the memory storage with this new value (step 896).

The algorithm then proceeds to step 884 to determine whether this is the last flow within the selected shaper, followed by steps 886 and 888, eventually determining whether to return to the beginning of the algorithm (step 860) or proceed to the end (step 890).

If the flow is a valid CBR flow, then the algorithm proceeds to the backpressure check (step 922). If the destination logical port is congested, the algorithm will not issue a CBR command to the FPU. In that case the algorithm decrements the command count by one (step 910).

The algorithm then proceeds to step 884 to determine whether this is the last flow within the selected shaper, followed by steps 886 and 888, eventually determining whether to return to the beginning of the algorithm (step 860) or proceed to the end (step 890).

If the backpressure status of the logical port indicated that the port is not busy or congested, the algorithm issues a CBR command to the FPU command queue (step 924).

The algorithm then proceeds to step 884 to determine whether this is the last flow within the selected shaper, followed by steps 886 and 888, eventually determining whether to return to the beginning of the algorithm (step 860) or proceed to the end (step 890).

Please note that the algorithms described above for arbitration and scheduling are merely exemplary, and are not intended to limited the scope of the invention as defined by the claims.

The TPU 162 uses a combination of a shaper number and a shaper location as the index to the TPI. For example, the shaper number and the shaper offset together provide the flow-id and this flow-id is used to obtain the TPI and TPS from the TPI & TPS 574. The TPU 162 uses the TPI and TPS to shape and schedule the flow according to the traffic contract. An external processor can create and modify the TPI. A traffic processing state ("TPS") is a flow specific state fetched from the TPI & TPS 574. In this embodiment, there is one TPI and TPS for each of the flows. The TPU 162 uses the TPS to keep the current state of the flow in order to process multiple active flows simultaneously. An external processor initializes all fields within the TPS when the flow is created and after initialization, the TPU 162 maintains and controls the fields within the TPS. In this embodiment, the TPI resides in external SSRAM and the TPS resides within the internal embedded DRAM.

The TPU 162 checks a BPLUT 575 before scheduling a command to the FPU 165 to forward the contents of one or more information segment storage units of a certain flow. A bit within the BPLUT 575 represents a logical port. The logical port represents the combination of a destination physical output port number and a priority of the flow. The priority of the flow and the physical output port assigned to the flow are programmable within the network processor. The TPU 162 uses the "Egress Port" and the "Priority" fields within the "TPI" to form the logical port to check against the BPLUT 575. If the backpressure bit is set for the logical port, the TPU 162 does not schedule a forwarding command to the FPU 165. The interprocessor communication unit ("IPU") 576 receives information from another network processor to stop sending data to a logical port. The IPU 576 decodes the backpressure information and accordingly sets the particular one of the entries within the BPLUT 575. The IPU 576 also notifies the I/O unit 223 about the backpressure.

The TPU 162 sends the flow-id of the selected flow and other information within a forwarding command to the FPU command storage. The FPU 165, in general, sends a portion or all of the information element belonging to the selected flow to one of the input/output ports of the I/O Unit 223. The functions performed by the FPU 165 include: information element de-queuing from the DBU 168, UBR traffic processing, encapsulation, unicast, multicast, buffer recycling, packet/cell tagging, packet header insertion, and IP header checksum regeneration. The FPU 165 includes the egress queuing unit 456, the active flow table 162, and a FPU control unit 361. The FPU control unit 361 retrieves data and control information (e.g., the FPI and the FPS) and prepares the data for forwarding to the I/O Unit 223. For further information, see U.S. patent application Ser. No. 10/413,859, now issued U.S. Pat. No. 8,010,751, filed concurrently herewith, entitled "Data Forwarding Engine," and incorporated by reference herein in its entirety. The FPU 165 uses the forward processing instruction ("FPI") and a forward processing state ("FPS") to control and manage its operation. Various execution units with the FPU 165 are enabled or disabled based on the FPI. The forward processing state ("FPS") is a flow specific state fetched by the FPU. In this embodiment, the number of FPIs and FPSs correspond to the number of different flows supported by the network processor 220. The FPU 165 uses the FPS to keep the current state of the flow. An external processor initializes the fields within the FPS when the flow is created and after initialization, the FPU 165 maintains and controls the fields within the FPS. The location within the storage unit 171 of the selected flow is provided by the FPS corresponding to this flow. The FPS uses the "current buffer pointer" field and the "current channel sequence number" field to access the storage unit 171 using the DBU 168. A channel sequence unit is accessed in order to obtain the sequence of data retrievals used to fetch the contents of an information segment storage unit. The FPU 165 fetches one or more information segments of an information element from the selected flow using the DBU 168 and sends these one or more information segments to the I/O unit 223 for forwarding through the physical output port specified by the FPI. Using the flow-id as provided by the TPU 162, the FPU 165 fetches the FPI corresponding to this flow. The FPI specifies within the "egress port" field the particular one of the physical output ports that the one or more information segments from this flow should be forwarded.

FIG. 9 shows an embodiment of the I/O unit 223 according to the present invention. In this embodiment, the I/O unit 223 includes an I/O port unit 347 that includes sixteen ports. Each of the sixteen ports transmit and receive information elements. In another configuration, the I/O port unit 347 includes a greater number or a fewer number than the sixteen ports. The I/O port unit 347 is coupled to an I/O error checking unit 350. The I/O error checking unit 350 checks for errors in the incoming information element such as parity and header error control errors. The I/O error checking unit 350 is coupled to the I/O scheduler unit 353. The I/O scheduler unit 353 controls the partitioning and storage of information elements within an I/O storage unit 356. In this embodiment, the I/O storage unit 356 is partitioned into 192 different buffers. In another configuration, the I/O storage unit 356 is partitioned to a greater number or a fewer number than the 192 buffers. Each of the buffers stores a portion of the information element or all of the information element. Each of the buffers are of a fixed-size length such as, for example, 64 bytes. The I/O scheduler unit 353 configurably assigns the buffers in the I/O storage unit 356 to support anywhere from one to sixteen of the input/output ports. In this embodiment, the I/O storage unit 356 is a first-in, first-out ("FIFO") buffer unit, i.e., the I/O scheduler unit 353 stores the information element into one of the buffers and retrieves the contents of that buffer in the first-in, first-out order.

The number of buffers assigned to a port depends on the number of ports configured. For example, if only one port is configured (e.g., this port is configured in a simplex OC-192 mode), then the 192 buffers are assigned to this one port. If four ports are configured (e.g., the four ports are configured in the simplex OC-48 mode), then 48 buffers are assigned to each of the ports. If eight ports are configured (e.g., the eight ports are configured in the duplex OC-12 mode), then 24 buffers are assigned to each of the ports. If 10 ports are configured (e.g., the ten ports are configured in the simplex 1 Gb/s mode), then 24 buffers are assigned to four of the ports and 16 buffers are assigned to six of the ports. If 16 ports are configured (e.g., the sixteen ports are configured in the simplex OC-12 mode), then 12 buffers are assigned to each of the ports.

The I/O scheduler unit 353 stores an information element into one or more of the buffers and retrieves the contents of the buffers in the FIFO order. For example, if four ports are configured, then 48 buffers are assigned to each of the ports. When an information element arrives at a certain port, that information element or a portion of that information element is stored in a buffer in one of the four regions of the I/O storage unit 356 corresponding to that certain port at which the information element arrived. When the I/O scheduler unit 353 retrieves the contents of a buffer from the I/O storage unit 356, it retrieves the contents of the buffer that have been in the I/O storage unit 356 for the longest time period. The retrieved buffer contents are forwarded to the PPU.

In addition to processing incoming information elements, the I/O scheduler unit 353 also receives information elements from the FPU that are to be transmitted to the line or the switch fabric. These outgoing information elements are processed by the I/O scheduler unit 353 and sent to the buffers assigned to the input/output port to which that information element is destined. When the input/output port to which the information element is destined is available, then the I/O scheduler unit 353 fetches the information element from the appropriate one of the buffers of the I/O storage unit 356 at which it was stored and forwards it to the particular one of the ports of the I/O port unit 347 to which the information element is destined.

The PPU 156 identifies the flow to which the incoming information element belongs, i.e., the PPU 156 determines the "flow-id" of the incoming information element. FIG. 10 shows an embodiment of the PPU 156 according to the present invention. In order to determine the flow-id, the PPU 156 forms the first lookup key, either directly or indirectly, and then performs one or more memory searches. The memory searched may be, for example, content addressable memory ("CAM"). The first lookup key is formed using an indirect first key formation system 365 or a direct first key formation system 366. Whether the indirect first key formation system 365 or the direct first key formation system 366 is used is determined by the configuration of the I/O port at which the information element arrived. An indirect lookup is used if the protocol type of the arriving information element is not known. If the I/O port is configured to perform the indirect lookup, the indirect first key formation system 365 performs the internal CAM lookup using an internal lookup key that is formed based on the I/O port at which the information element arrived.

The direct first key formation system 366 forms the first external CAM lookup key using fields from the incoming information element. The fields used to form that lookup key are determined by the I/O port at which the information element arrived. The external CAM lookup system 368 determines the flow-id of the information element by using the first external CAM lookup key to perform an external CAM lookup and if the result of this lookup does not produce the flow-id, then performing one or more additional CAM lookups until the flow-id is retrieved. In this embodiment, the CAM 174 is located outside the PPU 156 and also outside the network processor 220. In this embodiment, the number of CAMs used by the external CAM lookup system 368 depends on the number of stages within the external CAM lookup system 368 and within each stage, the number of CAMs that can be searched within the time to complete that stage.

FIG. 11 shows an embodiment of the indirect first key formation system 365 according to the present invention. The indirect first key formation system 365 is used to identify the protocol type of the incoming information element and use certain fields from the incoming information element to form some or all of a first external CAM lookup key 384. In this embodiment, the first external CAM lookup key 384 and a second external CAM lookup key 412 have either a length of 144-bits (in this case, nine fields are concatenated together to form the external CAM lookup key where each of the fields are two bytes), 72-bits, or 36-bits (in the case of 72-bits or 36-bits, the least 72 or 108 significant bits of the nine consecutive fields are discarded). In order to provide concrete examples, each of the keys in the following description is assumed to have 144 bits. If the I/O port at which an information element 374 arrives is configured for indirect lookup, then upon arrival, an indirect first key processing unit 376 extracts an internal lookup key from the information element 374. The starting point (i.e., the offset) at which the internal lookup key is extracted from the information element 374 is a value configured depending on the I/O port at which the information element 374 arrived. For each of the I/O ports configured for indirect lookup, the user can program the offset from which the extraction of the internal lookup key begins. In one configuration of this embodiment, the internal lookup key is 32-bits but in other configurations, the internal lookup key may have other lengths. The indirect first key processing unit 376 compares the internal lookup key with the entries of an internal CAM 379 to determine if there is a match. In one configuration, the internal CAM 379 has eight entries and each of the entries is 32-bits. In this configuration, the values of the entries in the internal CAM 379 are set by a user. If there is a match, then a particular one of the payload parsing instructions within a first lookup key formation table 380 corresponding to the matching entry is used to form some or all of the first external CAM lookup key 384. Each of the payload parsing instructions specifies the locations of the fields within the information element 374 that are to be used to form some or all of the first external CAM lookup key 384. Different fields of the information element 374 are used to form the first eight fields (i.e., field 0 to field 7) of the first external CAM lookup key 384.

Since the first external CAM lookup key 384 and the second external CAM lookup key 412 are generated on a per port basis, two ports could inadvertently generate identical keys. This condition can be resolved by providing a "unique key index" for every key on a per physical port basis. As configured by upper layer software within an external processor, the ninth field (i.e., field 8) can be taken from the information element or from one or more of the following: the physical port at which the information element arrived, the logical port at which the information element arrived, and the "unique key index".

FIG. 12 shows an embodiment of a payload parsing instruction 390 according to the present invention. The payload parsing instruction 390 specifies the fields of the information element 374 that should be concatenated together to form external CAM lookup keys (e.g., the first external CAM lookup key 384 and a second external CAM lookup key 412). In this embodiment, the payload parsing instruction 390 has a length of 64-bits. The payload parsing instruction 390 specifies the offset for up to nine fields within the information element 374. The offsets specified are from the beginning of the information element to the starting point of the two-byte field. An "offset 0" specifies the first two-byte field of the external CAM lookup key, an "offset 1" specifies the second two-byte field, a possible "offset 2" specifies a possible third two-byte field of that lookup key, and continuing in this manner until a possible "offset 8" specifies a possible ninth two-byte field of the lookup key. A "key size" field specifies the size of the resulting external CAM lookup key when the specified number of fields are concatenated together. The "global mask register" is used for the learn operation.

Referring again to FIG. 11, the indirect first key processing unit 376 uses a particular one of the payload parsing instructions that matches the internal lookup key to determine which fields of the information element 374 should be concatenated together to form the first external CAM lookup key 384. The resulting first external CAM lookup key 384 is sent to the external CAM lookup system 368 in order to determine the flow-id of the information element 374.

If the I/O port at which the incoming information element 374 arrives is configured to directly form the external CAM lookup key, then a payload parsing instruction corresponding to the I/O port at which the information element arrives specifies some or all of the fields from the information element that are to be used to form the external CAM lookup key. The assignment of a particular one of the payload parsing instructions to a particular one of the I/O ports is programmably configured by the user. FIG. 13 shows an embodiment of the direct first key formation system 366 according to the present invention. Depending on the I/O port at which the information element 374 arrived, a direct first key processing unit 371 selects a particular one of the payload parsing instructions from a first lookup key formation table 380 in order to form some or all of the first external CAM lookup key 384. Each of the payload parsing instructions specifies the locations of the fields within the information element 374 that are to be used to form some or all of the first external CAM lookup key 384. Different fields of the information element 374 are used to form the first eight fields (i.e., field 0 to field 7) of the first external CAM lookup key 384. As specified by an external processor, the ninth field (i.e., field 8) can be taken from the information element or from one or more of the following: the physical port at which the information element arrived, the logical port at which the information element arrived, and the "unique key index". The first external CAM lookup key 384 is sent to the external CAM lookup system 368 to be used for the first external CAM lookup.

Figure 14B:
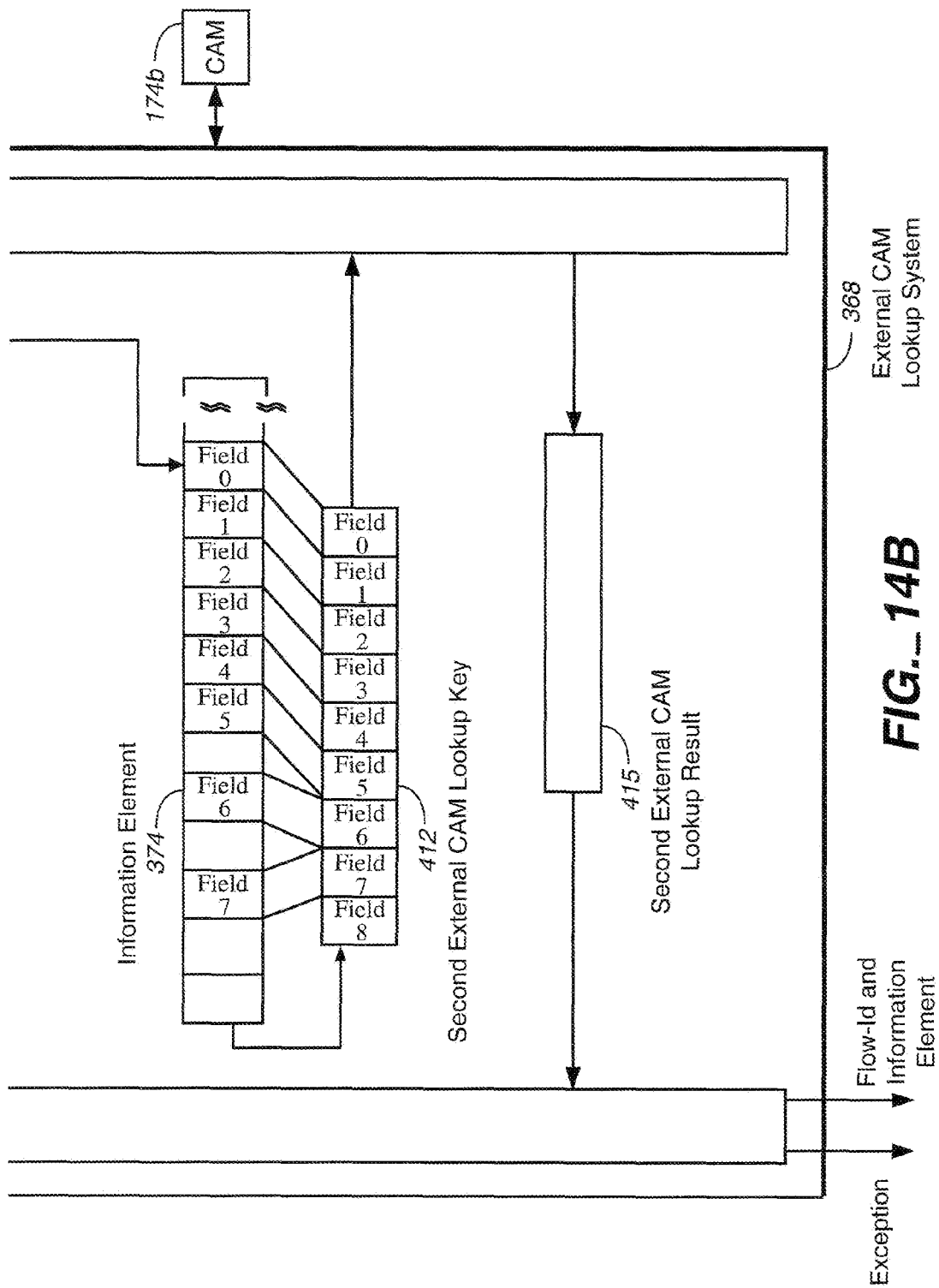
FIG. 14 shows a first embodiment of the external CAM lookup system according to the present invention.

FIG. 14 shows a first embodiment of the external CAM lookup system 368 according to the present invention. A flow-id determination unit 418 receives a first external CAM lookup key 384. The first external CAM lookup key 384 is sent to a memory fetch unit 421 that interfaces with a memory unit in order to search the memory unit using the first external CAM lookup key 384. In this embodiment, the memory unit is a CAM 174a and a CAM 174b and these CAMs are located outside the PPU 156 and outside the network processor. The entries within the CAM 174a and the CAM 174b are accessed by analysis of their content. After searching the CAM 174a, the memory fetch unit 421 returns a first external CAM lookup result 406. If the first external CAM lookup key 384 matches one of the entries of the CAM 174a, then the first external CAM lookup result 406 is either an instruction or a flow-id corresponding to that matching entry. If the first external CAM lookup key 384 does not match any of the entries of the CAM 174a, then the first external CAM lookup result 406 is a default flow-id or an exception is produced.

The flow-id determination unit 418 determines if the first external CAM lookup result 406 is an instruction, a flow-id, or a default exception flow-id. If the first external CAM lookup result 406 is a flow-id, then the flow-id determination unit 418 sends the flow-id and the information element to the PCU 226. If the first external CAM lookup result 406 is the default exception flow-id, then the flow-id determination unit 418 generates an exception that is to be processed by an external processor. If the first external CAM lookup result 406 is an instruction, then the flow-id determination unit 418 uses portions of the first external CAM lookup result 406 to select a particular one of the payload parsing instructions from a second lookup key formation table 409. In this embodiment, the portion of the first external CAM lookup result 406 used to select a payload parsing instruction are bits 16-18. Also, in this embodiment, the second lookup key formation table 409 has eight entries; the three bits are used to select one of these eight entries. The selected one of the payload parsing instructions from the second lookup key formation table 409 specifies which fields and the location of the fields within the information element 374 that are to be used to form part or all of the second external CAM lookup key 412. Different fields of the information element 374 are used to form the first eight fields (i.e., field 0 to field 7) of the second external CAM lookup key 412. As specified by an external processor, the ninth field (i.e., field 8) can be taken from the information element 374 or from one or more of the following: the "unique key index" and some portion of the first external CAM lookup result 406.

The second external CAM lookup key 412 is sent to the memory fetch unit 421 to search the CAM 174b using this key. The memory fetch unit 421 sends the result of this search back to the flow-id determination unit 418 using a second external CAM lookup result 415. The flow-id determination unit 418 determines if the second external CAM lookup result 415 is a flow-id, or a default exception flow-id. If the second external CAM lookup result 415 is a flow-id, then the flow-id determination unit 418 sends the flow-id and the information element to the PCU 226 for further processing. If the second external CAM lookup result 415 is the default exception flow-id, then the flow-id determination unit 418 outputs an exception to be processed by an external processor. If the second external CAM lookup result 415 is an instruction, then the flow-id determination unit 418 also outputs an exception.

FIG. 15 shows a second embodiment of the PPU 156 according to the present invention. In this embodiment, the external CAM lookup system 368 is pipelined and has N different pipeline stages where N is two or greater. Each stage of the pipeline performs two external CAM lookups. In FIG. 15, within stage 1, a lookup to CAM 431a is performed and if this CAM lookup produces an instruction, then a lookup to a CAM 431b is performed. If either of these two CAM lookups produces the flow-id, then the flow-id and the information element are passed to the PCU 226 for further processing. If the second CAM lookup produces an instruction, then the resulting lookup key is passed to stage 2. In stage 2, a lookup to CAM 436a is performed using the resulting lookup key from stage 1. If this CAM lookup produces an instruction, then a lookup to a CAM 436b is performed. If either of these two CAM lookups produces the flow-id, then the flow-id and the information element are passed to the PCU 226 for further processing. Continuing in this manner, assuming that the stage N−1 does not produce the flow-id, in the pipeline stage N, a lookup to CAM 441a is performed using the resulting lookup key from stage N−1. If this CAM lookup produces an instruction, then a lookup to a CAM 441b is performed. If either of these two CAM lookups produces the flow-id, then the flow-id and the information element are passed to the PCU 226 for further processing. If stage N does not produce the flow-id of the information element or if a CAM miss occurs in any of the stages, then a default flow-id is assigned or an exception is sent to the external processor.

FIGS. 16a-b show a second embodiment of the external CAM lookup system 368 according to the present invention. FIG. 16a shows stage 1 of the second embodiment of the external CAM lookup system 368. In FIG. 16a, a flow-id determination unit 444 receives the first external CAM lookup key 384. The first external CAM lookup key 384 is sent to a memory fetch unit 450 that interfaces with a memory unit in order to search the memory unit using the first external CAM lookup key 384. In this embodiment, the memory unit is a CAM 431a and a CAM 431b and these CAMs are located outside the PPU 156 and outside the network processor. After searching the CAM 431a, the memory fetch unit 450 returns a first external CAM lookup result 453. If the first external CAM lookup key 384 matches one of the entries of the CAM 431a, then the first external CAM lookup result 453 is either an instruction or a flow-id corresponding to that matching entry. If the first external CAM lookup key 384 does not match any of the entries of the CAM 431a, then the first external CAM lookup result 406 is a default flow-id for exception processing.

The flow-id determination unit 444 determines if the first external CAM lookup result 453 is an instruction, a flow-id, or a default exception flow-id. If the first external CAM lookup result 453 is a flow-id, then the flow-id determination unit 444 sends the flow-id and the information element to the PCU 226. If the first external CAM lookup result 453 is the default exception flow-id, then the flow-id determination unit 418 outputs an exception to be processed by an external processor. If the first external CAM lookup result 406 is an instruction, then the flow-id determination unit 444 uses portions of the first external CAM lookup result 453 to select a particular one of the payload parsing instructions from a second lookup key formation table 456. The selected one of the payload parsing instructions from the second lookup key formation table 456 specifies which fields and the location of the fields within the information element 374 that are to be used to form some or all of the second external CAM lookup key 462. Some of the second external CAM lookup key 462 can be formed using fields from the first external CAM lookup result 453.

The second external CAM lookup key 462 is sent to the memory fetch unit 450 to search the CAM 431b using this key. The result of the search is included in a second external CAM lookup result 465. The memory fetch unit 450 sends the second external CAM lookup result 465 from the memory fetch unit 450 to the flow-id determination unit 444. The flow-id determination unit 444 determines if the second external CAM lookup result 465 is an instruction, a flow-id, or a default exception flow-id. If the second external CAM lookup result 465 is a flow-id, then the flow-id determination unit 444 sends the flow-id and the information element to the PCU 226 for further processing. If the second external CAM lookup result 465 is the default exception flow-id, then the flow-id determination unit 444 outputs an exception to be processed by an external processor. If the second external CAM lookup result 465 is an instruction, then the flow-id determination unit 444 uses portions of the second external CAM lookup result 465 to select a particular one of the payload parsing instructions from a third lookup key formation table 468. The selected one of the payload parsing instructions from the third lookup key formation table 468 specifies which fields and the location of the fields within the information element 374 that are to be used to form some or all of a third external CAM lookup key 471. Some fields of the third external CAM lookup key 471 can be formed using fields from the second external CAM lookup result 465. The third external CAM lookup key 471 is sent to the next stage of the pipelined external CAM lookup system 368.

FIG. 16b shows the last stage, stage N, of the second embodiment of the external CAM lookup system 368. In FIG. 16b, a flow-id determination unit 474 receives a "2*N−1" external CAM lookup key 477 from the previous stage. The "2*N−1" external CAM lookup key 477 is sent to a memory fetch unit 480 that interfaces with a memory unit in order to search the memory unit using the "2*N−1" external CAM lookup key 477. In this embodiment, that memory unit is a CAM 441a and a CAM 441b. After searching the CAM 441a, the memory fetch unit 480 returns a "2*N" external CAM lookup result 483. If the "2*N−1" external CAM lookup key 477 matches one of the entries of the CAM 441a, then the "2*N" external CAM lookup result 483 is either an instruction or a flow-id corresponding to that matching entry. If the "2*N−1" external CAM lookup key 477 does not match any of the entries of the CAM 441a, then the "2*N" external CAM lookup result 483 is a default flow-id set for exception processing.

The flow-id determination unit 474 determines if the "2*N" external CAM lookup result 483 is an instruction, a flow-id, or a default exception flow-id. If the "2*N" external CAM lookup result 483 is a flow-id, then the flow-id determination unit 474 sends the flow-id and the information element to the PCU 226. If the "2*N" external CAM lookup result 483 is the default exception flow-id, then the flow-id determination unit 474 outputs an exception to be processed by an external processor. If the "2*N" external CAM lookup result 483 is an instruction, then the flow-id determination unit 474 uses portions of the "2*N" external CAM lookup result 483 to select a particular one of the payload parsing instructions from a "2*N" lookup key formation table 486. In this embodiment, the "2*N" lookup key formation table 486 has eight entries. The selected one of the payload parsing instructions from the "2*N" lookup key formation table 486 specifies which fields and the location of the fields within the information element 374 that are to be used to form some or all of the "2*N" external CAM lookup key 489.

The "2*N" external CAM lookup key 489 is sent to the memory fetch unit 480 to search the CAM 441b using this key. The result of the search is included in a "2*N" external CAM lookup result 492. The flow-id determination unit 474 determines if the "2*N" external CAM lookup result 492 is an instruction, a flow-id, or a default exception flow-id. If the "2*N" external CAM lookup result 492 is a flow-id, then the flow-id determination unit 474 sends the flow-id and the information element to the PCU 226 for further processing. If the "2*N" external CAM lookup result 492 is an instruction or the default exception flow-id, then the flow-id determination unit 474 outputs an exception to be processed by an external processor.

The network processor 115 uses four different exception paths to service an exception. An exception is generated, for example, when a flow-id cannot be determined for the incoming information element, the incoming information element belongs to an out-of-band control flow, or the PCI for the incoming information element specifies that the flow is a control flow. A flow can be configured to use any of the four paths to process an exception. All four of the exception paths can be active within the network processor 115 at the same time. FIG. 17 shows a prior art exception processing system 430. If an exception is detected in the PCU 226, the PCU 226 forwards the information element to the outside processor 425, using the HIF 229, for further processing. After the outside processor 425 processes the exception, the outside processor 425 sends the processed information element, along with its flow-id information, to the FPU 165. This information element is given high priority and the FPU 165, using a bypass unit, outputs it through an output port as soon as the output port becomes available.

FIG. 18 shows a first embodiment of an exception processing system 433 according to the present invention. The PCU 226, upon receiving the information element, detects an exception and sends it to the outside processor 425 using the HIF 229. After the outside processor 425 handles the exception and modifies the information element, the outside processor 425 sends that information element back to the PCU 226, using the HIF 229, to perform functions, such as the policing functions, on the modified information element. After the modified information element successfully goes through the PCU 226, the PCU 226 generates a PRQ command for this information element. The PCU 226 stores the modified information element into one or more information segment storage units within the storage unit 171. The PCU 226 accesses the storage unit 171 using the DBU 168. The egress queuing unit 456 updates the active flow table 162 to notify the TPU 162 that the flow to which the information element belongs should be included in the scheduling. The egress queuing unit 456 also updates the FPS for the flow to which this information element belongs so that the FPS is modified to account for this information element (e.g., the "current buffer pointer" field within the FPS is updated). Upon being selected by a scheduler within the TPU 162, the TPU 162 sends the flow-id for the selected flow to the FPU 165. The FPU 165 fetches from the DBU 168 an information segment belonging to an information element of the selected flow and outputs it through one of the output ports.

FIG. 19 shows a second embodiment of an exception processing system 440 according to the present invention. The PCU 226, upon detecting an exception, sends the information element to the outside processor 425 using the HIF 229. After processing the information element, the outside processor 425 stores the information element into one or more information segment storage units within the storage unit 171 using the DBU 168 and the HIF 229. After storing the information element, the outside processor 425 notifies the TPU 162, using the interface unit 455, that the flow to which the information element belongs should be included in the scheduling. The egress queuing unit 456 also updates the FPS for the flow to which this information element belongs so that the FPS is modified to account for this information element. Upon being selected by a scheduler within the TPU 162, the TPU 162 sends the flow-id for the selected flow to the FPU 165. The FPU 165 fetches from the DBU 168 an information segment belonging to an information element of the selected flow and outputs it through one of the output ports.

FIG. 20 shows a third embodiment of an exception processing system 444 according to the present invention. This embodiment is particularly useful when the incoming information element has a large data size. The PCU 226, upon detecting an exception, stores the information element into one or more information segment storage units within the storage unit 171 using the DBU 168. The PCU 226 notifies the external processor 425, using the HIF 229, that an exception has been produced and the location of the stored information element. The external processor, via the HIF 229, reads the information element stored within the storage unit 171 and modifies it and then writes it back to the storage unit 171 using the HIF 229 and the DBU 168. After modifying the information element, the outside processor 425 notifies the TPU 162, using the interface unit 455, that the flow to which the information element belongs should be included in the scheduling. The egress queuing unit 456 also updates the FPS for the flow to which this information element belongs so that the FPS is modified to account for this information element. Upon being selected by a scheduler within the TPU 162, the TPU 162 sends the flow-id for the selected flow to the FPU 165. The FPU 165 fetches from the DBU 168 an information segment belonging to an information element of the selected flow and outputs it through one of the output ports.

FIG. 21 shows an embodiment of a switch fabric interface 618 according to the present invention. The switch fabric interface 618 includes a card 646, a card 648, a card 650, a card 652, and a switch fabric 620. Each of the cards 646, 648, 650, and 652 includes two network processors (e.g., an ingress network processor 622 and an egress network processor 624, an ingress network processor 628 and an egress network processor 630, an ingress network processor 636 and an egress network processor 638, and an ingress network processor 640 and an egress network processor 642) operating in a simplex mode (i.e., traffic travels in one direction). Each of the cards 646, 648, 650, and 652 also includes a corresponding one of the framers 626, 632, 634, and 644 to interface the two network processors in that card to one of the lines. The switch fabric 620 interconnects the cards 646, 648, 650, and 652. The two processors in each of the cards 646, 648, 650, and 652 communicate with each other so that when flow control information is passed from the switch fabric to one of the egress network processors to notify the corresponding one of the ingress network processors to stop sending data to a certain logical output port, the particular one of the egress network processors uses the inter-processor communication to inform the corresponding one of the network processors about the backpressure information. The inter-processor communication can occur, for example, by using a 4-bit streaming bus.

FIG. 22 shows an embodiment of a back-pressure management system 640 according to the present invention. The back-pressure management system 640 includes components from the ingress network processor 622 and the egress network processor 624. The switch fabric 620 sends flow-control information to the egress network processor 624 so that it can inform the ingress network processor 622 not to send data to a particular one of the logical output ports. An I/O unit 626 of the egress network processor 624 forwards the control portion of the flow-control information to a control input storage 630. The data portion is forwarded to the data input storage 628. An IPU 632 fetches the flow-control information from the control input storage 630 and decodes it and sends to an IPU 576 a back-pressure message that includes the logical port number to which data should not be sent. The IPU 576 sets a value within the BPLUT 575 corresponding to the logical port so that it indicates that data should not be sent to that logical port number specified by the flow-control information. Note that the IPU 576 can also specify that the ingress network processor 622 should not send data to a set of ports (e.g., all ports having the same priority/class, all traffic classes going to a particular port). In this embodiment, the BPLUT 575 is a bitmap with one bit for each of the logical ports that the network processor 220 supports.

The TPU 162 checks the BPLUT 575 before scheduling a flow for forwarding by the FPU 165. The TPU 162 uses the "Egress Port" and the "Priority" fields within the "TPI" to form the logical port to check against the BPLUT 575. If the BPLUT 575 indicates that data should not be sent to this logical port, the TPU 162 does not schedule a forwarding command for this flow to the FPU 165. When this logical port is again available, the TPU 162 may then schedule a selected flow that uses the logical port by sending a forwarding command corresponding to this flow to the FPU command storage. Using the scheduling command, the FPU 165 fetches from the storage unit 171 an information segment belonging to the selected flow and sends it to a switch fabric control unit ("SFC") 634 for framing before sending to the I/O unit 223 to forward to the switch fabric 620.

While the present invention has been particularly described with respect to the illustrated embodiments, it will be appreciated that various alterations, modifications and adaptations may be based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the claims.

What is claimed is:

1. A traffic processor for scheduling information elements for forwarding, wherein each information element is associated with a flow and comprises at least one information element segment, the traffic processor comprising:
multiple shapers, each shaper associated with an egress port and at least one flow of information elements, wherein each shaper is governed by at least one quality of service ("QoS") parameter;
multiple groups, wherein each group includes multiple shapers;
a group arbiter for arbitrating among the multiple groups to select a group;
a shaper arbiter for arbitrating among the multiple shapers within the selected group to select a shaper; and
a scheduler for scheduling for forwarding an information element segment associated with the selected shaper;

wherein each port is associated with only a subgroup of shapers within a group, and the shapers within the subgroup are arbitrated together during shaper arbitration.

2. The traffic processor of claim 1, wherein the at least one QoS parameter is priority.

3. The traffic processor of claim 1, wherein the at least one QoS parameter includes priority and rate.

4. The traffic processor of claim 1, wherein the scheduling is based upon service category.

5. The traffic processor of claim 4, wherein the service categories include variable bit rate and constant bit rate.

6. The traffic processor of claim 1, wherein an information element segment is not scheduled for forwarding from the corresponding port if the port is congested.

7. The traffic processor of claim 6, wherein the port is a physical egress port, the port being congested if the number of information element segments already scheduled for forwarding from the port exceeds an occupancy threshold for the port.

8. The traffic processor of claim 6, wherein the port is a logical egress port, the logical port assignment to a flow being based upon the corresponding physical egress port and a priority.

9. The traffic processor of claim 1, wherein the shaper arbitration employs one of the following algorithms: strict priority; round robin; weighted round robin; weighted fair queuing; or an arbitration algorithm based on one or more the foregoing.

10. The traffic processor of claim 1, wherein a shaper can service flows of different service categories during an arbitration cycle.

11. The traffic processor of claim 1, wherein an information element segment is not scheduled for forwarding if, for the corresponding flow, a credit value associated with the number of information element segments scheduled for forwarding from the corresponding port does not satisfy a burst tolerance for the flow.

12. The traffic processor of claim 11, wherein, if the burst tolerance is not satisfied, the credit value is adjusted to make it more likely than otherwise that the burst tolerance for the flow will be satisfied during a next scheduling cycle.

13. The traffic processor of claim 1, wherein a credit value is used to ensure that scheduling of an information element segment for forwarding meets a sustained cell rate ("SCR") constraint, and, if the information element segment is not scheduled for forwarding during a current scheduling cycle, the information element segment is awarded a credit to make it more likely than otherwise that the SCR constraint will be satisfied during a next scheduling cycle.

14. The traffic processor of claim 13, wherein, if the information element segment is scheduled for forwarding during a current scheduling cycle, the information element segment is discredited for purposes of the next scheduling cycle.

15. The traffic processor of claim 3, further comprising a shaper counter associated with each shaper, wherein a shaper joins shaper arbitration if it is valid, a shaper being valid based in part on its shaper counter elapsing.

16. The traffic processor of claim 15, wherein the validity of the shaper is also based upon at least one flow associated with the shaper being in a first service category (even if no such flow is active), or all flows associated with the shaper being in a second service category and at least one such flow being active.

17. The traffic processor of claim 16, wherein the first service category is variable bit rate, and the second service category is constant bit rate.

18. The traffic processor of claim 16, wherein the valid shaper having a highest priority will win the arbitration.

19. The traffic processor of claim 18, wherein, if no flow in the first service category is active, then a credit is awarded to all such flows associated with the valid shaper, so that when one of such flows subsequently becomes active and valid, it will be more favored than otherwise to be scheduled for forwarding.

20. The traffic processor of claim 15, further comprising a group arbitration counter associated with each group, wherein a group joins group arbitration if it is valid, a group being valid based in part on one of the shapers within the group being valid and the group arbitration counter having elapsed.

21. The traffic processor of claim 20, wherein the group arbitration counter includes:
a group fraction counter; and
a group counter for counting in response to at least one enable digit of the fraction counter being set to a first count enable value,
wherein at least one shaper counter counts in response to at least one enable digit of the group counter being set to a second count enable value.

22. The traffic processor of claim 21, wherein the fraction counter is an incrementing counter, the at least one enable digit of the fraction counter is a most significant bit, and the first count enable value is a binary one.

23. The traffic processor of claim 22, wherein the group counter and the at least one shaper counter are decrementing counters, the at least one enable digit of the group counter are all digits of the group counter, and the second count enable value is binary zero.

24. The traffic processor of claim 23, wherein initial values, increment values and decrement values of the counters are set so that when the at least one shaper counter elapses, a peak cell rate period has elapsed.

25. The traffic processor of claim 1 wherein the information element segment is the entire information element.

26. A method for scheduling information elements for forwarding, wherein each information element is associated with a flow and comprises at least one information element segment, the method comprising:
arbitrating among multiple groups of shapers to select a group, wherein each shaper is associated with an egress port and at least one flow of information elements, and each shaper is governed by at least one quality of service ("QoS") parameter;
arbitrating among multiple shapers within the selected group to select a shaper; and
scheduling for forwarding an information element segment associated with the selected shaper;
wherein each port is associated with only a subgroup of shapers within a group, the method further comprising arbitrating the shapers within the subgroup together during shaper arbitration.

27. The method of claim 26, wherein the at least one QoS parameter is priority.

28. The method of claim 26, wherein the at least one QoS parameter includes priority and rate.

29. The method of claim 26, wherein the scheduling is based upon service category.

30. The method of claim 29, wherein the service categories include variable bit rate and constant bit rate.

31. The method of claim 26, wherein an information element segment is not scheduled for forwarding from the corresponding port if the port is congested.

32. The method of claim 31, wherein the port is a physical egress port, the port being congested if the number of information element segments already scheduled for forwarding from the port exceeds an occupancy threshold for the port.

33. The method of claim 31, wherein the port is a logical egress port, the logical port assignment to a flow being based upon the corresponding physical egress port and a priority.

34. The method of claim 26, wherein the shaper arbitration employs one of the following algorithms:
   strict priority;
   round robin;
   weighted round robin;
   weighted fair queuing; or
   an arbitration algorithm based on one or more the foregoing.

35. The method of claim 26, further comprising servicing flows of different service categories during an arbitration cycle.

36. The method of claim 26, wherein an information element segment is not scheduled for forwarding if, for the corresponding flow, a credit value associated with the number of information element segments scheduled for forwarding from the corresponding port does not satisfy a burst tolerance for the flow.

37. The method of claim 36, wherein, if the burst tolerance is not satisfied, the credit value is adjusted to make it more likely than otherwise that the burst tolerance for the flow will be satisfied during a next scheduling cycle.

38. The method of claim 26, wherein a credit value is used to ensure that scheduling of an information element segment for forwarding meets a sustained cell rate ("SCR") constraint, and, if the information element segment is not scheduled for forwarding during a current scheduling cycle, the information element segment is awarded a credit to make it more likely than otherwise that the SCR constraint will be satisfied during a next scheduling cycle.

39. The method of claim 38, wherein, if the information element segment is scheduled for forwarding during a current scheduling cycle, the information element segment is discredited for purposes of the next scheduling cycle.

40. The method of claim 28, further comprising a shaper joining shaper arbitration if it is valid, a shaper being valid based in part on an associated shaper counter elapsing.

41. The method of claim 40, wherein the validity of the shaper is also based upon at least one flow associated with the shaper being in a first service category (even if no such flow is active), or all flows associated with the shaper being in a second service category and at least one such flow being active.

42. The method of claim 41, wherein the first service category is variable bit rate, and the second service category is constant bit rate.

43. The method of claim 41, further comprising a valid shaper winning the arbitration if it has a highest priority.

44. The method of claim 43, wherein, if no flow in the first service category is active, then a credit is awarded to all such flows associated with the valid shaper, so that when one of such flows subsequently becomes active and valid, it will be more favored than otherwise to be scheduled for forwarding.

45. The method of claim 40, further comprising a group joining group arbitration if it is valid, a group being valid based in part on one of the shapers within the group being valid and an associated group arbitration counter having elapsed.

46. The method of claim 45, further comprising a group counter counting in response to at least one enable digit of a group fraction counter being set to a first count enable value; and at least one shaper counter counting in response to at least one enable digit of the group counter being set to a second count enable value.

47. The method of claim 46, wherein the fraction counter is an incrementing counter, the at least one enable digit of the fraction counter is a most significant bit, and the first count enable value is a binary one.

48. The method of claim 47, wherein the group counter and the at least one shaper counter are decrementing counters, the at least one enable digit of the group counter are all digits of the group counter, and the second count enable value is binary zero.

49. The method of claim 48, wherein initial values, increment values and decrement values of the counters are set so that when the at least one shaper counter elapses, a peak cell rate period has elapsed.

50. The method of claim 26 wherein the information element segment is the entire information element.

51. The traffic processor of claim 1, wherein a priority is assigned to each port and all the shapers associated with a particular port are associated with the same priority as the port.

52. The method of claim 26, wherein a priority is assigned to each port and all the shapers associated with a particular port are associated with the same priority as the port.

* * * * *